(12) United States Patent
Asai et al.

(10) Patent No.: US 12,215,258 B2
(45) Date of Patent: Feb. 4, 2025

(54) PRESSURE-SENSITIVE ADHESIVE SHEET AND USE THEREOF

(71) Applicant: NITTO DENKO CORPORATION, Ibaraki (JP)

(72) Inventors: Ryoko Asai, Ibaraki (JP); Naofumi Kosaka, Ibaraki (JP); Yosuke Shimizu, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 199 days.

(21) Appl. No.: 17/632,192

(22) PCT Filed: Jul. 28, 2020

(86) PCT No.: PCT/JP2020/028918
§ 371 (c)(1),
(2) Date: Feb. 1, 2022

(87) PCT Pub. No.: WO2021/024863
PCT Pub. Date: Feb. 11, 2021

(65) Prior Publication Data
US 2022/0275254 A1    Sep. 1, 2022

(30) Foreign Application Priority Data
Aug. 2, 2019 (JP) ................... 2019-143393

(51) Int. Cl.
*C09J 7/38* (2018.01)
*C09J 4/06* (2006.01)
*C09J 11/06* (2006.01)

(52) U.S. Cl.
CPC ............... *C09J 7/385* (2018.01); *C09J 4/06* (2013.01); *C09J 11/06* (2013.01); *C09J 2301/12* (2020.08);
(Continued)

(58) Field of Classification Search
CPC ......... B32B 27/00; C08F 2/24; C08G 18/246; C09D 4/06; C09J 11/06; C09J 133/066;
(Continued)

(56) References Cited

U.S. PATENT DOCUMENTS

2004/0170826 A1\* 9/2004 Shibano ................ C09J 175/16
156/355
2010/0215947 A1\* 8/2010 Yamanaka ............ C09J 7/385
428/323
(Continued)

FOREIGN PATENT DOCUMENTS

| CN | 101802264 A | 8/2010 |
|---|---|---|
| CN | 103717692 A | 4/2014 |

(Continued)

OTHER PUBLICATIONS

Decision of Refusal issued on Feb. 22, 2024 for corresponding Japanese Patent Application No. 2019-143393, along with an English machine translation (9 pages).

(Continued)

*Primary Examiner* — Philip C Tucker
*Assistant Examiner* — Brian R Slawski
(74) *Attorney, Agent, or Firm* — Hauptman Ham, LLP

(57) ABSTRACT

Provided is a PSA sheet having a PSA layer. The PSA layer has a multilayer structure comprising a layer A forming one face of the PSA layer and a layer B placed on the backside of the layer A. The layer B is a photo-crosslinkable PSA layer comprising a photo-crosslinkable polymer.

10 Claims, 1 Drawing Sheet

(52) U.S. Cl.
CPC .... *C09J 2301/208* (2020.08); *C09J 2301/416* (2020.08); *C09J 2301/50* (2020.08); *C09J 2433/00* (2013.01); *C09J 2451/00* (2013.01)

(58) Field of Classification Search
CPC ...... C09J 143/04; C09J 175/04; C09J 201/02; C09J 2301/12
USPC .. 156/60, 272.2, 272.8, 275.5, 275.7, 307.1, 156/307.7, 324, 332; 428/355 AC, 343, 428/345, 355 R
See application file for complete search history.

(56) References Cited

U.S. PATENT DOCUMENTS

| | | | |
|---|---|---|---|
| 2010/0279109 A1* | 11/2010 | Ootake | H01L 21/67011 428/339 |
| 2013/0321991 A1 | 12/2013 | Lee et al. | |
| 2014/0234562 A1* | 8/2014 | Traser | C09J 7/10 156/60 |
| 2017/0283661 A1 | 10/2017 | Yonezaki et al. | |
| 2021/0214587 A1 | 7/2021 | Kosaka et al. | |
| 2021/0230455 A1 | 7/2021 | Kosaka et al. | |

FOREIGN PATENT DOCUMENTS

| | | | |
|---|---|---|---|
| CN | 103827237 A | | 5/2014 |
| CN | 107267080 A | | 10/2017 |
| EP | 0 942 054 A1 | | 9/1999 |
| JP | H7-173445 A | | 7/1995 |
| JP | 2012-140497 A | | 7/2012 |
| JP | 2013-40256 A | | 2/2013 |
| JP | 2013185023 A | * | 9/2013 |
| JP | 2018-168291 A | | 11/2018 |
| TW | 201311855 A1 | | 3/2013 |
| WO | 2009/031892 A1 | | 3/2009 |
| WO | 2013/025443 A2 | | 2/2013 |
| WO | 2013/048985 A2 | | 4/2013 |
| WO | 2019/151192 A1 | | 8/2019 |
| WO | 2019/151194 A1 | | 8/2019 |

OTHER PUBLICATIONS

Office Action issued on Jan. 20, 2024 for corresponding Chinese Patent Application No. 202080052442.4, along with an English machine translation (24 pages).

Office Action issued on Aug. 24, 2023 for corresponding Japanese Patent Application No. 2019-143393, along with an English machine translation (14 pages).

International Search Report issued for corresponding International Patent Application No. PCT/JP2020/028918 on Oct. 20, 2020, along with an English translation.

Written Opinion issued for corresponding International Patent Application No. PCT/JP2020/028918 on Oct. 20, 2020.

English translation of International Preliminary Report on Patentability issued on Feb. 17, 2022, for corresponding International Patent Application No. PCT/JP2020/028918.

Office Action issued on May 14, 2024 for corresponding Taiwanese Patent Application No. 109125997, along with an English translation (12 pages).

Office Action issued on Sep. 20, 2024 for corresponding Chinese Patent Application No. 202080052442.4, along with an English machine translation (19 pages).

Office Action issued on Oct. 22, 2024 for corresponding Korean Patent Application No. 10-2022-7006413, along with an English machine translation (13 pages).

\* cited by examiner

PRESSURE-SENSITIVE ADHESIVE SHEET AND USE THEREOF

CROSS REFERENCE TO RELATED APPLICATION

This application is a National Stage of International Application No. PCT/JP2020/028918, filed on Jul. 28, 2020, which designates the United States and was published in Japan, and which claims priority to Japanese Patent Application No. 2019-143393, filed on Aug. 2, 2019 in the Japan Patent Office. All of the aforementioned applications are hereby incorporated by reference in their entireties.

TECHNICAL FIELD

The present invention relates to a pressure-sensitive adhesive sheet and a method for producing a laminate using the pressure-sensitive adhesive sheet.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields. Published technical documents related to PSA include Patent Document 1.

CITATION LIST

Patent Literature

[Patent Document 1] Japanese Patent Application Publication No. 2012-140497

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is a property to deform in conformity to the surface structure of an adherend (or "surface conformity" hereinafter) and a property to resist deformation against stress (or "deformation resistance" hereinafter).

An objective of this invention is thus to provide a PSA capable of conforming well to the adherend surface and forming a bond with high deformation resistance.

Solution to Problem

This Description provides a PSA sheet having a PSA layer. The PSA layer has a multilayer structure comprising a layer A forming one face of the PSA layer and a layer B placed on the backside of the layer A. The layer B is a photo-crosslinkable PSA layer comprising a photo-crosslinkable polymer. The PSA sheet can obtain higher deformation resistance by photo-crosslinking of the layer B. By this, when being applied to an adherend, the PSA layer shows good surface conformity; and after applied, the layer B can be photo-crosslinked to form a highly deformation-resistant bond. The PSA layer having good surface conformity can deform along possible contours (absorb the contours) on an adherend surface to achieve suitably tight adhesion to the adherend surface. The PSA layer has a multilayer body and one face thereof is formed of a layer A. Thus, a desirably functionality can be provided to the one face by the layer A.

Favorable examples of the photo-crosslinkable polymer include a polymer (PB) having side-chain benzophenone structures (i.e. a polymer having benzophenone structures in side chains). The layer B comprising a polymer (PB) can be photo-crosslinked, using the benzophenone structures.

Another favorable example of the photo-crosslinkable polymer is a polymer (PD) having carbon-carbon double bonds (C=C). The layer B comprising a polymer (PD) can be photo-crosslinked when the carbon-carbon double bonds are allowed to react.

In some embodiments of the art disclosed herein (including a PSA sheet having a PSA layer, the PSA layer, a PSA composition used for forming the PSA layer, and a method for producing a laminate using the PSA sheet; the same applies, hereinafter), the layer B preferably comprises 40 µmol/g or less of a polyfunctional monomer having two or more ethylenically unsaturated groups (or simply a "polyfunctional monomer" hereinafter). By so limiting the layer B's polyfunctional monomer content, the PSA sheet can have greater performance stability in storage.

In some embodiments, the layer A can include a hydrophilicity enhancer. This can increase the water-peeling properties of the layer A-side adhesive face of the PSA layer. The PSA sheet having a highly water-peelable adhesive face can be easily removed using aqueous liquid such as water even after the layer B is photo-crosslinked. This is preferable in view of reworking the PSA sheet.

The PSA sheet according to some preferable embodiments has a 40% or higher reduction rate of water-peel force, determined from peel strength N0 and N2 by the next equation:

$$\text{Reduction rate of water-peel force (\%)} = (1-(N2/N0)) \times 100$$

Here, the peel strength N0 and N2 are determined by the procedures shown below. The PSA sheet having an adhesive face with such a high water-peel force reduction rate is preferable because even after the layer B is photo-crosslinked, it can be easily peeled by using aqueous liquid such as water.

Procedure for Measuring Peel Strength N0

The layer A side of the PSA sheet is press-bonded to a corona-treated polarizing plate with a 2 kg rubber roller moved back and forth once. The resultant is autoclaved (50° C., 0.5 MPa, 15 min) and then UV-irradiated using a high-pressure mercury lamp. Subsequently, in the atmosphere at 25° C., at a tensile speed of 300 mm/min at a peel angle of 180°, the PSA sheet is peeled from the polarizing plate; and the peel strength during this is recorded as peel strength N0.

Procedure for Measuring Peel Strength N2

In the peel strength N0 measurement, in the process of peeling the PSA sheet from the polarizing plate, 20 µL of distilled water is supplied to where the PSA sheet starts to separate from the polarizing plate. The peel strength after the distilled water supply is recorded as peel strength N2.

The PSA sheet according to some preferable embodiments has a peel strength N0 of 1.5 N/10 mm or greater, determined by the procedure shown above. Such a PSA sheet can form a highly reliable bond with the photo-crosslinked PSA layer.

In some embodiments, the PSA layer may have a thickness of 10 μm or greater and 500 μm or less. The PSA sheet having a PSA layer of such a thickness is preferable from the standpoint of the surface conformity and handling properties (the ease of processing, e.g. punching) of the PSA sheet.

In some embodiments, the layer A may have a thickness of 2 μm or greater and less than 10 μm. The PSA sheet having a layer A of such a thickness can favorably combine the effect (e.g. greater water-peeling properties) provided by the layer A and the deformation resistance-enhancing effect by photo-crosslinking of the layer B.

This Description provides a method for producing a laminate, the method including a step of laminating the layer A side of a PSA sheet disclosed herein to a member, and a step of causing photo-crosslinking of the layer B of the PSA layer. According to such a method, when the PSA sheet is layered on (laminated to) the member, the PSA layer can conform well to the surface structure of the member; and after layer, the layer B can be photo-crosslinked to enhance the deformation resistance. Thus, a laminate can be obtained, with the photo-crosslinked PSA layer and the member bonded together with good reliability.

The scope of the invention for which the present international patent application seeks patent protection includes a suitable combination of the respective features described above.

DESCRIPTION OF EMBODIMENTS

Figure 1:
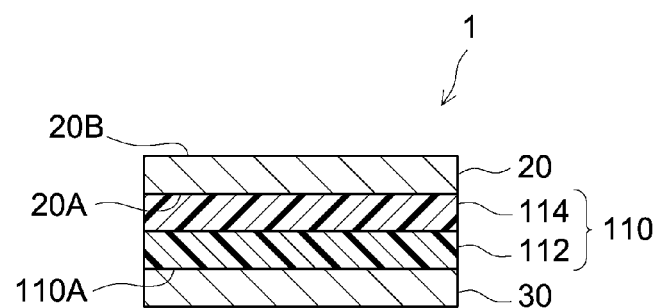
FIG. 1 shows a cross-sectional diagram schematically illustrating the PSA sheet according to an embodiment.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer derived from a starting monomer mixture including more than 50% (preferably more than 70%, e.g., more than 90%) acrylic monomer by weight. The acrylic monomer refers to a monomer having at least one (meth)acryloyl group per molecule. As used herein, the term "(meth) acryloyl" comprehensively refers to acryloyl and methacryloyl. Similarly, the term "(meth)acrylate" comprehensively refers to acrylate and methacrylate, and the term "(meth) acryl" comprehensively refers to acryl and methacryl.

As used herein, the term "ethylenically unsaturated compound" refers to a compound having at least one ethylenically unsaturated group per molecule. Examples of the ethylenically unsaturated group include (meth)acryloyl group, vinyl group and allyl group. Hereinafter, a compound having one ethylenically unsaturated group may be referred to as a "monofunctional monomer" and a compound having two or more ethylenically unsaturated groups as a "polyfunctional monomer." Among polyfunctional monomers, a compound having X number of ethylenically unsaturated groups may be written as a "X-functional monomer."

As used herein, the term "multilayer PSA layer" refers to a PSA layer formed with two or more laminated PSA sublayers having different compositions. The number of PSA sublayers forming the multilayer structure is, for instance, 10 or lower. From the standpoint of the PSA layer's transparency, it is preferably 5 or lower, possibly 4 or lower, or even 3 or lower. One favorable example of the multilayer PSA layer is a two-layer PSA layer formed of a layer A and a layer B. The PSA sublayers forming the multilayer PSA layer are laminated, at least partially in direct contact. Between the two faces (first and second faces) of the multilayer PSA layer, the PSA layer is typically free of a separator layer (e.g. resin film such as polyester film) that completely separates adjacent PSA sublayers.

As used herein, that a PSA composition comprises an ethylenically unsaturated compound means that it comprises the ethylenically unsaturated compound as a partial polymer, unless otherwise noted. Such a partial polymer is typically a mixture comprising the ethylenically unsaturated compound (unreacted monomer) whose ethylenically unsaturated group is unreacted and the ethylenically unsaturated compound whose ethylenically unsaturated group has polymerized.

As used herein, the entire monomers forming a PSA composition refers to the total quantity of monomers forming the polymer in the PSA composition and monomers included as unreacted monomers in the PSA composition. In typical, the composition of monomers forming the PSA composition generally corresponds to the composition of monomers in the photo-crosslinkable PSA formed from the PSA composition and the composition of monomers forming the photo-crosslinked product.

As used herein, the concept of "active energy ray" encompasses light such as UV rays, visible rays and infrared rays as well as radioactive rays such as α rays, β rays, γ rays, electron rays, neutron rays and X rays.

Examples of Constitution of PSA Sheet

FIG. 1 shows an example of the constitution of the PSA sheet disclosed herein. PSA sheet 1 is formed as an adhesively single-faced PSA sheet comprising a PSA layer 110 whose first surface 110A is an adhesive face applied to adherend, and a substrate 20 laminated on the second surface of PSA layer 110. PSA layer 110 is permanently bonded to a first face 20A of substrate 20. As substrate 20, for instance, plastic film such as polyester film can be preferably used. PSA layer 110 has a two-layer structure formed of a layer A 112 forming the first surface (adhesive face) 110A and a layer B 114 laminated on the backside of layer A 112. Layer B 114 is a photo-crosslinkable PSA layer comprising a photo-crosslinkable polymer.

PSA sheet 1 prior to use (before applied to adherend) may be stored, distributed, etc., for instance as shown in FIG. 1, as a release-linered PSA sheet in which adhesive face 110A is protected with release liner 30 having a releasable surface (release face) at least on the PSA layer side. Alternatively, it may have a form where the second face 20B (the reverse side of the first face 20A, or the backside) of substrate 20 is a release face and adhesive face 110A is protected, wound or layered with the second face 20B in contact with adhesive face 110A.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

Figure 2:
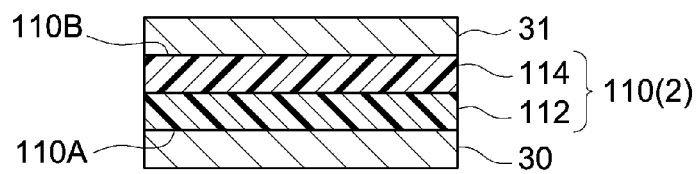
FIG. 2 shows a cross-sectional diagram schematically illustrating the PSA sheet according to another embodiment.

The PSA sheet disclosed herein may have a form of substrate-free double-faced PSA sheet formed of a PSA layer. For instance, as shown in FIG. 2, the substrate-free double-faced PSA sheet can be PSA sheet 2 formed of a PSA layer 110 (i.e. PSA layer 110 having a two-layer structure formed of a layer 112 and a layer B 114 laminated with direct contact to the backside thereof) in PSA sheet 1 shown in FIG. 1. Before used, substrate-free double-faced PSA sheet 2 can be in a protected state where the release faces of release liners 30 and 31 are in contact with adhesive face 110A forming the layer A side surface and adhesive face 110B forming the layer B side surface, respectively. Alternatively, it can be in a protected state where with release liner 30 having a release face on the backside (the surface opposite to the PSA side), it is rolled or layered to bring adhesive face 110B in contact with the backside of release liner 30 to protect adhesive faces 110A and 110B. The substrate-free double-faced PSA sheet can be used, for instance, by bonding a substrate to the second face of the PSA layer.

Figure 3:
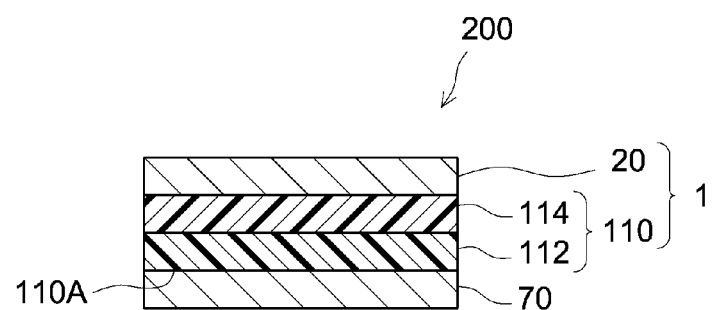
FIG. 3 shows a cross-sectional diagram schematically illustrating a PSA sheet-bearing optical member wherein the PSA sheet according to an embodiment is adhered to an optical member.

The PSA sheet disclosed herein can be a component of a PSA sheet-bearing optical member in which the optical member is bonded to the PSA layer's first surface. For instance, as shown in FIG. 3, PSA sheet 1 shown in FIG. 1 can be a component of a PSA sheet-bearing optical member 200 in which an optical member 70 is bonded to the first face 110A of PSA layer 110. The optical member can be, for instance, a glass plate, resin film, a metal plate, etc.

Layer B

The photo-crosslinkable polymer in the layer B of the PSA layer forming the PSA sheet disclosed herein is not particularly limited as long as the polymer has a structural moiety capable of forming a crosslinked structure by light such as UV rays (or a "photo-crosslinkable moiety" hereinafter). For instance, the layer B can be a layer B formed of a photo-crosslinkable PSA that comprises, as the photo-crosslinkable polymer, a polymer (PB) having side-chain benzophenone structures (or a "type-B layer B" hereinafter); or a layer B formed of a photo-crosslinkable PSA that comprises, as the photo-crosslinkable polymer, a polymer (PD) having carbon-carbon double bonds (or a "type-D layer B" hereinafter). In the following description, when the term "layer B" is simply used, the type-B layer B, type-D layer B and other types of layer B are included.

(1) Layer B Comprising Polymer (PB)

A favorable example of the photo-crosslinkable polymer-containing layer B is a layer B (type-B layer B) formed of a photo-crosslinkable PSA that comprises, as the photo-crosslinkable polymer, a polymer (PB) having side-chain benzophenone structures. The polymer (PB) is preferably essentially free of ethylenically unsaturated groups. The polymer (PB) is preferably a rubber-like polymer that shows rubber elasticity in a temperature range near room temperature. In some embodiments, the type-B layer B can be a photo-crosslinkable PSA sublayer comprising the polymer (PB) as base polymer.

The term "base polymer" of a PSA layer refers to the primary component among the polymers in the PSA layer. Likewise, the term "base polymers" of layer A and layer B refer to the respective primary components in the layer A and layer B. As used herein, the term "primary component" refers to a component accounting for more than 50% by weight unless otherwise noted.

As used herein, the term "benzophenone structure" (or "BP") refers to a diaryl ketone structure represented by the general formula $Ar^1$—(C=O)—$Ar^2$— or —$Ar^3$—(C=O)—$Ar^2$—. Here, $Ar^1$ in the general formula is selected among phenyl groups that may have substituents. In the general formulas, $Ar^2$ and $Ar^3$ are individually selected among phenylene groups that may have substituents. $Ar^2$ and $Ar^3$ can be the same or different. The BP-containing component refers to a compound having at least one benzophenone structure in the molecule. The benzophenone structure can be excited by UV irradiation; and when excited, it can abstract a hydrogen radical from another molecule or other part(s) of the molecule.

In the type-B layer B, by exciting the benzophenone structures of the polymer (PB), a crosslinked structure can be formed utilizing the hydrogen radical abstraction reaction. The polymer (PB) is preferably a polymer having side-chain benzophenone structures with general formula $Ar^1$—(C=O)—$Ar^2$— wherein $Ar^1$ is a phenyl group that may have a substituent and $Ar^2$ is a phenylene group that may have a substituent in. When at least one between $Ar^1$ and $Ar^2$ has one or more substituents, the substituents can be individually selected from the group consisting of alkoxy groups (e.g. alkoxy groups with one to three carbon atoms, preferably a methoxy group), halogen atoms (e.g. F, Cl, Br, etc., preferably Cl or Br), hydroxy group, amino group and carboxy group while not limited to these.

The polymer (PB) in the art disclosed herein may have side chains whose benzophenone structures as described above are bonded to the main chain directly or via one, two or more structures such as an ester bond and oxyalkylene structures. A favorable example of the polymer (PB) is a polymer comprising a repeat unit derived from a compound whose molecule has an ethylenically unsaturated group and a benzophenone structure (or an "ethylenically unsaturated BP" hereinafter). The repeat unit can be a polymer residue resulting from reaction of the ethylenically unsaturated group of the corresponding ethylenically unsaturated BP.

Examples of the ethylenically unsaturated BP include, but are not limited to, acryloyloxybenzophenones that may have substituents, such as 4-acryloyloxybenzophenone, 4-acryloyloxy-4'-methoxybenzophenone, 4-acryloyloxyethoxy-4'-methoxybenzophenone, 4-acryloyloxy-4'-bromobenzophenone and 2-hydroxy-4-acryloyloxybenzophenone; acryloyloxyalkoxybenzophenones that may have substituents, such as 4-[(2-acryloyloxy)ethoxy]benzophenone and 4-[(2-acryloyloxy)ethoxy]-4'-bromobenzophenone; methacryloyloxybenzophenones that may have substituents, such as 4-methacryloyloxybenzophenone, 4-methacryloyloxy-4'-methoxybenzophenone, 4-methacryloyloxy-4'-bromobenzophenone, 4-methacryloyloxyethoxy-4'-bromobenzophenone and 2-hydroxy-4-methacryloyloxybenzophenone; methacryloyloxyalkoxybenzophenones that may have substituents, such as 4-[(2-methacryloyloxy)ethoxy]benzophenone and 4-[(2-methacryloyloxy)ethoxy]-4'-methoxybenzophenone; vinylbenzophenones that may have substituents, such as 4-vinylbenzophenone, 4'-bromo-3-vinylbenzophenone, 2-hydroxy4-methoxy-4'-vinylbenzophenone. As the ethylenically unsaturated BP, solely one species or a combination of two or more species can be used to prepare a polymer (PB). As for the ethylenically unsaturated BP, a commercial product can be used or it can be synthesized by a known method. From the standpoint of the reactivity, etc., it is preferable to use an ethylenically unsaturated BP having a (meth)acryloyl group, that is, an ethylenically unsaturated BP that is an acrylic monomer.

The polymer (PB) can be a copolymer having the repeat unit derived from the ethylenically unsaturated BP and a repeat unit derived from an ethylenically unsaturated compound (or "other monomer" hereinafter) that is not an ethylenically unsaturated BP. Such a polymer (PB) can be a copolymer of monomers comprising the ethylenically unsaturated BP and the other monomer. In some embodiments, as the other monomer, one, two or more species of acrylic monomers can be preferably used. Favorable examples of the polymer (PB) include an acrylic polymer (PB) in which an acrylic monomer accounts for more than 50% (preferably more than 70%, e.g. more than 90%) by weight of the monomers forming the polymer (PB).

In some embodiments, the polymer (PB)-forming monomers may include, as the other monomer, one, two or more species selected among alkyl (meth)acrylates having alkyl groups. Hereinafter, an alkyl (meth)acrylate having a ester-terminal linear or branched alkyl group with an X or higher and Y or lower number of carbon atoms may be referred to as a "$C_{X-Y}$ alkyl (meth)acrylate." The polymer (PB)-forming monomers preferably comprise, as the other monomer, at least a $C_{1-20}$ alkyl (meth)acrylate, more preferably a $C_{4-20}$ alkyl (meth)acrylate and yet more preferably a $C_{4-18}$ alkyl (meth)acrylate (e.g. $C_{4-9}$ alkyl acrylate).

Non-limiting specific examples of the $C_{1-20}$ alkyl (meth) acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate. Particularly preferable alkyl (meth)acrylates include n-butyl acrylate (BA), 2-ethylhexyl acrylate (2EHA) and isononyl acrylate. Other specific examples of alkyl (meth)acrylates that can be preferably used include n-butyl methacrylate (BMA), 2-ethylhexyl methacrylate (2EHMA) and isostearyl acrylate (iSTA). As the alkyl (meth)acrylate, solely one species or a combination of two or more species can be used. The polymer (PB)-forming monomers may include, as the other monomer, one, two or more species selected among the copolymerizable monomers described later.

The weight average molecular weight (Mw) of polymer (PB) is not particularly limited. For instance, it can be about $0.5 \times 10^4$ to $500 \times 10^4$. From the standpoint of the cohesion of the photo-crosslinkable PSA, the handling properties of the PSA sheet having the photo-crosslinkable PSA, etc., in some embodiments, the polymer (PB)'s Mw is usually suitably $1 \times 10^4$ or higher, preferably $5 \times 10^4$ or higher, possibly $10 \times 10^4$ or higher, $15 \times 10^4$ or higher, or even $20 \times 10^4$ or higher. From the standpoint of the photo-crosslinkable PSA's surface conformity to adherends (e.g. an optical member), the polymer (PB) in the photo-crosslinkable PSA usually has a Mw of suitably $200 \times 10^4$ or lower, preferably $150 \times 10^4$ or lower, possibly $100 \times 10^4$ or lower, $70 \times 10^4$ or lower, or even $50 \times 10^4$ or lower.

As used herein, the weight average molecular weight (Mw) of a polymer refers to a value based on polystyrene standards determined by gel permeation chromatography (GPC). As the GPC system, for instance, model name HLC-8320GPC (column: TSKgelGMH-H(S); available from Tosoh Corporation) can be used.

In the art disclosed herein, the glass transition temperature (Tg) of polymer (PB) is not particularly limited. The polymer (PB)'s Tg can be, for instance, $-80°$ C. or higher and $150°$ C. or lower, $-80°$ C. or higher and $50°$ C. or lower, or $-80°$ C. or higher and $10°$ C. or lower. From the standpoint of the surface conformity of the PSA layer, in some embodiments, the polymer (PB)'s Tg is suitably below $0°$ C., preferably $-10°$ C. or lower, possibly $-20°$ C. or lower, $-30°$ C. or lower, $-40°$ C. or lower, or even $-50°$ C. or lower. From the standpoint of the photo-crosslinkable PSA's cohesion and post-crosslinking deformation resistance (e.g. bond durability to adherends), the polymer (PB)'s Tg is usually advantageously $-75°$ C. or higher, or possibly $-70°$ C. or higher. In some embodiments, the polymer (PB)'s Tg can be $-55°$ C. or higher, or even $-45°$ C. or higher. The polymer (PB)'s Tg can be adjusted through the types of monomers forming the polymer (PB) and their amounts.

As used herein, the glass transition temperature (Tg) of a polymer refers to the glass transition temperature determined by the Fox equation based on the composition of monomers forming the polymer. The Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| 2-ethylhexyl acrylate | $-70°$ C. |
| n-butyl acrylate | $-55°$ C. |
| isostearyl acrylate | $-18°$ C. |
| methyl acrylate | $8°$ C. |
| cyclohexyl acrylate | $15°$ C. |
| N-vinyl-2-pyrrolidone | $54°$ C. |
| 2-hydroxyethyl acrylate | $-15°$ C. |
| 4-hydroxybutyl acrylate | $-40°$ C. |
| dicyclopentanyl methacrylate | $175°$ C. |
| isobornyl acrylate | $94°$ C. |
| acrylic acid | $106°$ C. |
| methacrylic acid | $228°$ C. |

With respect to the glass transition temperatures of homopolymers of monomers other than those listed above, values given in "Polymer Handbook" (3rd edition, John Wiley & Sons, Inc., Year 1989) are used. When the literature provides two or more values, the highest value is used. With respect to a monomer whose homopolymer glass transition temperature is not given in Polymer Handbook, the value obtained by the measurement method according to Japanese Patent Application Publication No. 2007-51271 is used. With respect to a polymer for which the nominal glass transition temperature value is provided by the manufacturer, etc., the nominal value can be used as well.

The polymer (PB) in the art disclosed herein preferably includes, for instance, about 0.5 mg or more of benzophenone structures per gram of polymer based on 4-benzoylphenyl acrylate standards. The amount based on 4-benzoylphenyl acrylate standards converted from the number of benzophenone structures included per gram of polymer (PB) may be referred to as the BP equivalent (unit: mg/g) of polymer (PB). For instance, when 40 μmol of benzophenone structures are included per gram, the polymer's BP equivalent is calculated to be 10 mg/g.

From the standpoint of obtaining greater effect of crosslinking (e.g. deformation resistance enhancement by crosslinking), in some embodiments, the polymer (PB) usually has a BP equivalent of suitably 1 mg/g or higher, possibly 5 mg/g or higher, 8 mg/g or higher, 10 mg/g or higher, 15 mg/g or higher, or even 20 mg/g or higher. In some embodiments, from the standpoint of increasing the impact resistance and peel strength of the joint formed of the photo-crosslinked product, the polymer (PB) usually has a BP equivalent of suitably 100 mg/g or lower, possibly 80 mg/g or lower, 60 mg/g or lower, 40 mg/g or lower, 25 mg/g or lower, or even 15 mg/g or lower. The polymer (PB)'s BP equivalent can be adjusted through the composition of monomers forming the polymer (PB).

The weight ratio of polymer (PB) in the type-B layer B (i.e. the weight fraction of polymer (PB) in the photo-crosslinkable PSA forming the type-B layer B) is not particularly limited. It can be selected to favorably balance the surface conformity of the photo-crosslinkable PSA and the deformation resistance of the photo-crosslinked product thereof. In some embodiments, the polymer (PB) has a weight fraction of, for instance, 1% by weight or higher, usually suitably 5% by weight or higher, possibly 10% by weight or higher, 15% by weight or higher, 25% by weight or higher, 35% by weight or higher, 45% by weight or higher, or even 55% by weight or higher. With increasing weight fraction of polymer (PB), ΔG' described later tends to increase. The art disclosed herein can also be implemented in an embodiment where the polymer (PB) in the photo-crosslinkable PSA has a weight fraction of essentially 100% by weight (e.g. 99.5% by weight or higher). From the standpoint of the ease of adjusting the adhesive properties and reducing VOC, in some embodiments, the polymer (PB) in the photo-crosslinkable PSA can have a weight fraction of, for instance, below 99% by weight, below 95% by weight, below 85% by weight, below 70% by weight, below 50% by weight, or even below 40% by weight.

The photo-crosslinkable PSA forming the type-B layer B preferably comprises, for instance, about 0.1 mg/g or more of benzophenone structures per gram of photo-crosslinkable PSA based on 4-benzoylphenyl acrylate standards. Hereinafter, the weight of benzophenone structures included per gram of photo-crosslinkable PSA determined based on 4-benzoylphenyl acrylate standards may be referred to as the BP equivalent (unit: mg/g) of photo-crosslinkable PSA.

From the standpoint of obtaining greater effect of crosslinking (e.g. deformation resistance enhancement by crosslinking), in some embodiments, the photo-crosslinkable PSA usually has a BP equivalent of suitably 0.3 mg/g or higher, possibly 0.5 mg/g or higher, 1 mg/g or higher, 5 mg/g or higher, 8 mg/g or higher, 10 mg/g or higher, or even 20 mg/g or higher. In some embodiments, from the standpoint of increasing the impact resistance of the joint formed of the photo-crosslinked product and reducing the internal distortion of the photo-crosslinked product, the photo-crosslinkable PSA usually has a BP equivalent of suitably 100 mg/g or lower, possibly 80 mg/g or lower, 60 mg/g or lower, 40 mg/g or lower, 25 mg/g or lower, or even 15 mg/g or lower.

The photo-crosslinkable PSA forming the type-B layer B may be a cured product of a PSA composition comprising a BP-containing component. The photo-crosslinkable PSA can be a cured product of a PSA composition comprising a BP-containing component and further comprising a benzophenone structure-free ethylenically unsaturated compound.

The PSA composition may include, as the BP-containing component, one, two or more species of monomers selected among ethylenically unsaturated BPs as those described above; may include a pre-synthesized polymer (PB); or may include both of these. The polymer (PB) in the photo-crosslinkable PSA forming the type-B layer B can be, for instance, the polymer (PB) or a modified product thereof in the PSA composition, or a species formed by copolymerization of the ethylenically unsaturated BP and other monomer(s) in the PSA composition.

The photo-crosslinkable PSA may comprise two or more species of polymers having varying monomer compositions among which at least one species of polymer is the polymer (PB). The photo-crosslinkable PSA may include, as the two or more species of polymer, solely two or more species of polymers (PB) or a combination of a polymer (PB) and a benzophenone structure-free polymer (or "polymer PNB" hereinafter). The polymer (PNB) can be formed by using a PSA composition comprising a benzophenone structure-free ethylenically unsaturated compound and polymerizing the ethylenically unsaturated compound. From the standpoint of the compatibility, etc., the polymers (PB) and (PNB) are preferably both acrylic polymers.

The polymer (PNB) can be an acrylic oligomer described later. The photo-crosslinkable PSA comprising an acrylic oligomer can be a cured product of a PSA composition comprising the acrylic oligomer.

The two or more species of polymers may or may not be chemically bonded. The photo-crosslinkable PSA according to some embodiments may include at least one species of polymer (PB) not chemically bonded to other polymer(s) besides the polymer (PB). By photo-crosslinking the benzophenone structures of the polymer (PB), the photo-crosslinkable PSA can form a photo-crosslinked product in which the polymer (PB) and other polymer besides the polymer (PB) are chemically bonded.

The photo-crosslinkable PSA disclosed herein can include other components usable in PSA as necessary. The photo-crosslinkable PSA comprising such optional components can be formed using a PSA composition having the corresponding composition.

(VOC Emissions)

The VOC emissions of the photo-crosslinkable PSA forming the type-B layer B is not particularly limited. The VOC emissions can be, for instance, 5000 μg/g or less, 3000 μg/g or less, or even 1000 μg/g or less. In some embodiments, the VOC emissions of the photo-crosslinkable PSA is preferably 500 μg/g or less, more preferably 300 μg/g or less, or yet more preferably 100 μg/g or less. The photo-crosslinkable PSA with less VOC emissions has less odor and is preferable from the standpoint of the environmental hygiene. The low VOC emissions of the photo-crosslinkable PSA is also preferable from the standpoint of inhibiting foaming caused by volatile organic compounds (VOC) in the photo-crosslinkable PSA and causing less contamination. The VOC emissions of a photo-crosslinkable PSA is determined by the method described below, using a suitable amount (e.g. about 1 mg to 2 mg) of the photo-crosslinkable PSA as a measurement sample. The measurement sample preferably has a thickness of 1 mm or less.

[VOC Test]

A test sample is placed and sealed in a 20 mL vial. The vial is then heated at 80° C. for 30 minutes and 1.0 mL of the heated gas (sample gas) is injected into a gas chromatograph (GC), using a head space autosampler (HSS). Based on the resulting gas chromatogram, the amount of gas emitted from the test sample is determined as an n-decane equivalent amount. From the resulting value, the VOC emission is determined per gram of test sample (μg/g). The n-decane equivalent amount is determined by applying a calibration curve prepared in advance for n-decane, with the intensities of emission gas obtained by GC Mass seen as equivalent to the intensities of n-decane. The HSS and GC settings are as follows:
  HSS: model 7694 available from Agilent Technologies
    Heating time: 30 min
    Pressurization time: 0.12 min
    Loop filling time: 0.12 min
    Loop equilibration time: 0.05 min
    Injection time: 3 min
    Sample loop temperature: 160° C.
    Transfer line temperature: 200° C.
  GC: model 6890 available from Agilent Technologies
    Column: J&W capillary column, product name DB-ffAP, available from GL Science (0.533 mm inner diameter×30 m length, 1.0 μm thick membrane)
    Column temperature: 250° C. (temperature raised at 10° C./min from 40° C. to 90° C., followed at 20° C./min to 250° C. and maintained there for 5 min)
    Column pressure: 24.3 kPa (constant flow mode)
    Carrier gas: helium (5.0 mL/min)
    Injection port: split (split ratio 12:1)
    Injection port temperature: 250° C.
    Detector: FID
    Detector temperature: 250° C.

The unreacted ethylenically unsaturated compound (e.g. unpolymerized acrylic monomer or "residual monomer" hereinafter) may increase the VOC emissions of the PSA. In the photo-crosslinkable PSA disclosed herein, the residual monomer content can be reduced to a level that satisfies the aforementioned VOC emission level. The photo-crosslinkable PSA disclosed herein can form new crosslinks in the matrix using the benzophenone structures of the polymer (BP) while having such a limited residual monomer content, thereby enhancing the deformation resistance of the PSA layer.

As for the VOC emissions of the photo-crosslinkable PSA disclosed herein, the lower the more preferable in principle. From the standpoint of the practicality including productivity and costs, in some embodiment, the VOC emissions can be, for instance, 10 μg/g or higher, 30 μg/g or higher, 80 μg/g or higher, 150 μg/g or higher, or even 200 μg/g or higher.

Gel Fraction

The gel fraction of the photo-crosslinkable PSA forming the type-B layer B is not particularly limited. From the standpoint of the cohesion of the photo-crosslinkable PSA and the handling properties of the PSA sheet, it is usually suitably 5% or higher, preferably 15% or higher, possibly 25% or higher, or even 35% or higher. The photo-crosslinkable PSA theoretically has a gel fraction of 100% or lower. From the standpoint of the conformity to the adherend surface, the gel fraction of the photo-crosslinkable PSA is preferably below 85%, possibly below 70%, below 55%, or even below 40%.

The gel fraction is determined by the following method: In particular, an approximately 0.5 g measurement sample is accurately weighed and the weight is recorded as W1. The measurement sample is wrapped in a porous PTFE (polytetrafluoroethylene) sheet and suspended in ethyl acetate at room temperature for one week. Subsequently, the measurement sample is allowed to dry and the weight W2 of the ethyl acetate-insoluble portion is determined. W1 and W2 are substituted into the next equation to determine the gel fraction:

$$\text{Gel fraction (\%)} = W2/W1 \times 100$$

As the porous PTFE sheet, trade name NITOFLON® NTF 1122 available from Nitto Denko Corporation or a similar product can be used.

In some embodiments, the photo-crosslinked product obtained by subjecting the photocurable PSA forming the type-B layer B to UV irradiation (e.g. at a dose of 300 mW/cm$^2$ to a cumulative dose of 3000 mJ/cm$^2$) using a high-pressure mercury lamp has a gel fraction of, for instance, possibly 70% or higher, preferably 90% or higher, also possibly 95% or higher, or even 98% or higher. The gel fraction of the photo-crosslinked product is theoretically 100% or lower. The gel fraction is determined by the method described above.

The polymer (PB)-containing photo-crosslinkable PSA can be photo-crosslinked by irradiation of UV rays comprising a wavelength component capable of exciting benzophenone structures (or a "BP-excitation wavelength component" hereinafter). A preferable light source can radiate UV rays comprising a component with a wavelength below 300 nm (or a "<300 nm wavelength component" hereinafter). Examples of the light source include, but are not limited to, a high-pressure mercury lamp, low-pressure mercury lamp, metal halide lamp and super UV lamp. The light irradiated from the light source may comprise a component with 300 nm or longer wavelength (or a "≥300 nm wavelength component" hereinafter).

Light sources capable of radiating UV rays that are free of a BP-excitation wavelength component (e.g. a <300 nm wavelength component) or low in amount thereof include blacklight and UV-LED lamp. These light sources can be preferably used to allow reaction (polymerization or curing) of ethylenically unsaturated groups by photoirradiation carried out in the presence of benzophenone structures. In UV irradiation to carry out the reaction of ethylenically unsaturated groups, a photoinitiator described later can be used to accelerate the reaction.

The photo-crosslinkable PSA forming the type-B layer B may have a composition essentially free of a photoinitiator that absorbs ≥300 nm wavelength light to generate radicals.

For instance, it may have a composition essentially free of a photoinitiator that absorbs ≥380 nm (especially ≥400 nm) visible light to generate radicals. This can be advantageous from the standpoint of the optical properties of the photo-crosslinkable PSA. Being free of a photoinitiator that absorbs ≥300 nm wavelength light to generate radicals refers to being free of the photoinitiator in the state capable of generating radicals (a state having sites cleavable by the light), allowing the inclusion of cleaved residue of the photoinitiator. The photo-crosslinkable PSA according to a preferable embodiment is essentially free of a photoinitiator comprising a phosphorous atom in the molecule (or a "P-containing photoinitiator" hereinafter). The photo-crosslinkable PSA disclosed herein can be essentially free of a P-containing photoinitiator and cleaved residue of the photoinitiator.

PSA Composition for Forming Type-B Layer B

This Description provides a PSA composition comprising a BP-containing component. Such a PSA composition can be preferably used for forming a type-B layer B. The PSA composition can be in various embodiments such as an active energy ray-curable PSA composition, solvent-based PSA composition, aqueous PSA composition and hot-melt PSA composition. In some embodiments, an active energy ray-curable PSA composition can be preferably used.

As used herein, the aqueous PSA composition refers to a PSA composition comprising PSA in a solvent (aqueous solvent) whose primary component is water. The concept of aqueous PSA composition here may encompass a water-dispersed PSA composition (having PSA dispersed in water) and a water-soluble PSA composition (having PSA dissolved in water). The solvent-based PSA composition refers to a PSA composition comprising PSA in an organic solvent. The active energy ray-curable PSA composition refers to a composition prepared to cure by active energy rays including UV rays and radioactive rays to form a PSA (viscoelastic body). The hot-melt PSA composition refers to a PSA composition prepared to be applied in a molten state to form a PSA when cooled to near room temperature.

The type-B layer B-forming PSA composition may include, as the BP-containing component, a polymer (PB), ethylenically unsaturated BP, or both of these. When the polymer (PB) is used as a component of the PSA composition, as the polymer (PB), it is possible to use the same species as the polymer (PB) in the layer B-forming photo-crosslinkable PSA. Thus, redundant details are omitted.

In some embodiments, the PSA composition can be an acrylic PSA composition in which an acrylic monomer accounts for more than 50% (preferably more than 70%, e.g., more than 90%) by weight of the entire monomers forming the PSA composition. The acrylic PSA composition can be, for instance, a PSA composition (preferably an active energy ray-curable PSA composition) comprising a polymer (PB) and an ethylenically unsaturated compound (B); a solvent-based PSA composition comprising a polymer (PB) (preferably an acrylic polymer) in an organic solvent and possibly further comprising an ethylenically unsaturated compound (B); a hot-melt PSA composition comprising an acrylic polymer (PB) as the primary component; etc.

Ethylenically Unsaturated Compound (B)

Examples of the compound usable as the ethylenically unsaturated compound (B) include the alkyl (meth)acrylate and the ethylenically unsaturated BP described above. Among these, it is preferable to use at least an alkyl (meth)acrylate (e.g. a $C_{1-20}$ alkyl (meth)acrylate, more preferably a $C_{4-18}$ alkyl (meth)acrylate, or yet more preferably a $C_{4-9}$ alkyl acrylate). Particularly preferable alkyl (meth)acrylates include n-butyl acrylate (BA) and 2-ethylhexyl acrylate (2EHA). Other specific examples of alkyl (meth)acrylates that can be preferably used include isononyl acrylate, n-butyl methacrylate (BMA), 2ethylhexyl methacrylate (2EHMA) and isostearyl acrylate (iSTA). As the alkyl (meth)acrylate, solely one species or a combination of two or more species can be used. In some embodiments, the ethylenically unsaturated compound (B) preferably comprises one or each between n-butyl acrylate (BA) and 2-ethylhexyl acrylate (2EHA), or more preferably at least 2EHA.

In some embodiments, the ethylenically unsaturated compound (B) may include at least 40% (by weight) $C_{4-9}$ alkyl acrylate. The ratio of alkyl $C_{4-9}$ acrylate in the ethylenically unsaturated compound (B) can be, for instance, 50% by weight or higher, 60% by weight or higher, or even 65% by weight or higher. From the standpoint of enhancing the cohesion of the photo-crosslinkable PSA, the ratio of $C_{4-9}$ alkyl acrylate in the ethylenically unsaturated compound (B) is usually suitably 99.5% by weight or lower, 95% by weight or lower, 85% by weight or lower, 70% by weight or lower, or even 60% by weight or lower.

Other examples of the compound usable as the ethylenically unsaturated compound (B) include an ethylenically unsaturated compound (copolymerizable monomer) that can be copolymerized with an alkyl (meth)acrylate. As the copolymerizable monomer, it is suitable to use a monomer having a polar group (e.g. carboxy group, hydroxy group, nitrogen atom-containing ring, etc.). For instance, the polar group-containing monomer can be useful in introducing crosslinking points into the polymer comprising a repeat unit derived from the monomer or in increasing the cohesive strength of the photo-crosslinkable PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride.

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate.

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate.

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether.

Cyano group-containing monomers: for example, acrylonitrile and methacrylonitrile.

Isocyanato group-containing monomers: for example, 2-(meth)acryloyloxyethyl isocyanate, (meth)acryloyl isocyanate and m-isopropenyl-α,α-dimethylbenzyl isocyanate.

Amido group-containing monomers: for example, (meth)acrylamide; (meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide and N,N-di(t-butyl) (meth) acrylamide; N-alkyl (meth)acrylamides such as N-ethyl (meth)acrylamide, N-isopropyl(meth)acrylamide, N-butyl (meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl(meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam).

Monomers having a succinimide backbone: for example, N-(meth)acryloyloxy methylene succinimide, N-(meth)acryloyl-6-oxy hexamethylene succinimide and N-(meth)acryloyl-8-oxy hexamethylene succinimide.

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide.

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate.

Alkoxy group-containing monomers: for example, an alkoxyalkyl (meth)acrylate such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate (e.g. alkoxy poly (alkylene glycol) (meth)acrylate) such as methoxy ethylene glycol (meth)acrylate, methoxy propylene glycol (meth)acrylate, methoxy poly(ethylene glycol) (meth)acrylate, methoxy poly(ethylene glycol) (meth)acrylate and methoxy poly(propylene glycol) (meth)acrylate.

Alkoxysilyl group-containing monomers; for example, an alkoxysilyl group-containing (meth)acrylate such as (3-(meth)acryloxypropyl)trimethoxysilane, (3-(meth)acryloxypropyl)triethoxysilane, (3-(meth)acryloxypropyl)methyldimethoxysilane and (3-(meth)acryloxypropyl)methyldiethoxysilane; and an alkoxysilyl group-containing vinyl compound such as vinyltrimethoxysilane and vinyltriethoxysilane.

Vinyl esters: for example, vinyl acetate and vinyl propionate.

Vinyl ethers: for example, vinyl alkyl ethers such as methyl vinyl ether and ethyl vinyl ether.

Aromatic vinyl compounds: for example, styrene, α-methylstyrene and vinyl toluene.

Olefins: for example, ethylene, butadiene, isoprene and isobutylene.

(Meth)acrylic esters having an alicyclic hydrocarbon group: for example, cyclopentyl (meth)acrylate, cyclohexyl (meth)acrylate, isobornyl (meth)acrylate, dicyclopentanyl (meth)acrylate, and adamantyl (meth)acrylate.

(Meth)acrylic esters having an aromatic hydrocarbon group: for example, an aromatic hydrocarbon group-containing (meth)acrylate such as phenyl (meth)acrylate, phenoxyethyl (meth)acrylate and benzyl (meth)acrylate.

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, (meth)acrylic esters obtained from terpene compound derivative alcohols and the like.

When using such a copolymerizable monomer, its amount used is not particularly limited. It is usually suitably at least 0.01% by weight of the entire monomers forming the PSA composition. From the standpoint of obtaining greater effect of the use of the copolymerizable monomer, the amount of copolymerizable monomer used (i.e. the weight fraction of the copolymerizable monomer in the entire monomers) can be 0.1% by weight or more of the entire monomers, or even 0.5% by weight or more. For easy balancing of adhesive properties, the amount of copolymerizable monomer used is suitably 50% by weight or less of the entire monomers, or preferably 40% by weight or less.

In some embodiments, the copolymerizable monomer may include a monomer having a nitrogen atom (N-containing monomer). The use of N-containing monomer may preferably increase the cohesive strength of photo-curable PSA and the post-photo-crosslinking peel strength. A favorable example of the N-containing monomer is a monomer having a nitrogen atom-containing ring. As the monomer having a nitrogen atom-containing ring, the examples listed earlier and the like can be used. For instance, it is possible to use a cyclic N-vinyl amide represented by a general formula (1):

[Chem 1]

(1)

Here, in the general formula (1), $R^1$ is a divalent organic group, specifically $-(CH_2)_n-$; n is an integer between 2 and 7 (preferably 2, 3 or 4). In particular, N-vinyl-2-pyrrolidone can be preferably used. Other favorable examples of the nitrogen atom-containing monomer include (meth)acrylamides.

When using a N-containing monomer (preferably a monomer having a nitrogen atom-containing ring such as N-vinyl cyclic amide and N-(meth)acryloyl amide), the amount used is not particularly limited. Of the entire monomers, it can be, for instance, 1% by weight or more, 2% by weight or more, 3% by weight or more, even 5% by weight or more, or even 7% by weight or more. In an embodiment, the amount of N-containing monomer used can be 10% by weight or more, 15% by weight or more, or even 20% by weight or more of all monomers. The amount of the nitrogen atom-containing monomer used is suitably, for instance, 40% by weight or less of all monomers, possibly 35% by weight or less, 30% by weight or less, or even 25% by weight or less. In another embodiment, the amount of the nitrogen atom-containing monomer used can be, for instance, 20% by weight or less, or 15% by weight or less of all monomers.

In some embodiments, the copolymerizable monomer may include a hydroxy group-containing monomer. With the use of hydroxy group-containing monomer, the photo-crosslinkable PSA's cohesive strength and crosslinking degree (e.g. crosslinking by an isocyanate crosslinking agent) can be favorably adjusted. When using a hydroxy group-containing monomer, its amount used can be, for instance, 0.01% by weight or more, 0.1% by weight or more, 0.5% by weight or more, 1% by weight or more, 5% by weight or more, or even 10% by weight or more of the entire monomers. From the standpoint of reducing the water absorption of the photo-crosslinkable PSA or photo-crosslinked product thereof, in some embodiments, the amount of hydroxy group-containing monomer used is, for instance, suitably 40% by weight or less of the entire monomers; it can be 30% by weight or less, 25% by weight or less, or even 20% by weight or less. In another embodiment, the amount of hydroxy group-containing monomer used can be, for instance, 15% by weight or less of all monomers, 10% by weight or less, or even 5% by weight or less. Alternatively, as the copolymerizable monomer, hydroxy group-containing monomers may not be used, either.

In some embodiments, the ratio of carboxy group-containing monomer in the entire monomers can be, for instance, 2% by weight or lower, 1% by weight or lower, or even 0.5% by weight or lower (e.g. below 0.1% by weight). The PSA composition may be essentially free of a carboxy group-containing monomer as a component thereof. Here, being essentially free of a carboxy group-containing monomer means that a carboxy group-containing monomer is not used at least intentionally. This may be advantageous from the standpoint of the anti-metal corrosion properties of the photo-crosslinkable PSA formed from the PSA composition and the photo-crosslinked product thereof.

In some embodiments, the copolymerizable monomer may include an alicyclic hydrocarbon group-containing (meth)acrylate. This can increase the PSA's cohesive strength and the post-photo-crosslinking peel strength. As the alicyclic hydrocarbon group-containing (meth)acrylate, the aforementioned examples and the like can be used. For instance, cyclohexyl acrylate and isobornyl acrylate can be preferably used. When using an alicyclic hydrocarbon group-containing (meth)acrylate, its amount used is not particularly limited. For instance, of the entire monomers, it can be 1% by weight or greater, 3% by weight or greater, or even 5% by weight or greater. In an embodiment, the amount of alicyclic hydrocarbon group-containing (meth)acrylate used can be 10% by weight or more, or even 15% by weight or more of the entire monomers. The maximum amount of alicyclic hydrocarbon group-containing (meth)acrylate used is suitably about 40% by weight or less, for instance, possibly 30% by weight or less, or also 25% by weight or less (e.g. 15% by weight or less, or even 10% by weight or less).

In some embodiments, the copolymerizable monomer may include an alkoxysilyl group-containing monomer. A typical example of the alkoxysilyl group-containing monomer is an ethylenically unsaturated compound having at least one (preferably two or more, e.g. two or three) alkoxysilyl group(s) per molecule. Specific examples thereof are as described earlier. For the alkoxysilyl group-containing monomer, solely one species or a combination of two or more species can be used. By using the alkoxysilyl group-containing monomer, a crosslinked structure formed by condensation reaction of silanol groups (silanol condensation) can be introduced into the photo-crosslinkable PSA.

When using an alkoxysilyl group-containing monomer, its amount used is not particularly limited. In some embodiments, of the entire monomers forming the PSA composition, the amount of alkoxysilyl group-containing monomer used can be, for instance, 0.005% by weight or higher, usually suitably 0.01% by weight or higher, possibly 0.03% by weight or higher, or even 0.05% by weight or higher. From the standpoint of the surface conformity of the photo-crosslinkable PSA, of the entire monomers, the amount of alkoxysilyl group-containing monomer used is usually suitably 1.0% by weight or lower, possibly 0.5% by weight or lower, or even 0.1% by weight or lower.

Yet other examples of the compound usable as the ethylenically unsaturated compound (B) include polyfunctional monomers. With the polyfunctional monomer-containing PSA composition, when curing the composition to prepare a photo-crosslinkable PSA, by allowing the polyfunctional monomer to react, it is possible to obtain a photo-crosslinkable PSA crosslinked with the polyfunctional monomer.

Examples of the polyfunctional monomer include bifunctional monomers such as 1,6-hexanediol di(meth)acrylate, 1,12-dodecanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, allyl (meth)acrylate, vinyl (meth)acrylate and divinylbenzene; trifunctional or higher polyfunctional monomers such as trimethylolpropane tri(meth)acrylate, pentaerythritol tri(meth)acrylate, tetramethylol methane tri (meth)acrylate and dipentaerythritol hexa(meth)acrylate; and others such as epoxy acrylate, polyester acrylate and urethane acrylate. Particularly preferable examples include 1,6-hexanediol di(meth)acrylate, trimethylolpropane tri (meth)acrylate and dipentaerythritol hexa(meth)acrylate. For the polyfunctional monomer, solely one species or a combination of two or more species can be used.

When using a polyfunctional monomer, its amount used is not particularly limited. It can be selected so that the resulting photo-crosslinkable PSA shows favorable properties. In some embodiments, the polyfunctional monomer can be used in an amount less than 5.0% by weight of the entire monomers forming the PSA composition. By this, formation of an excessively crosslinked structure can be avoided while the photo-crosslinkable PSA is being formed (i.e. in the pre-photo-crosslinking stage) and the surface conformity of the photo-crosslinkable PSA can be enhanced. Of the entire monomers, the amount of polyfunctional monomer used can be, for instance, 4.0% by weight or lower, 3.0% by weight or lower, 2.0% by weight or lower, 1.0% by weight or lower, 0.5% by weight or lower, or even 0.3% by weight or lower. Polyfunctional monomers may not be used, either. In some embodiments, from the standpoint of providing suitable cohesion to the photo-crosslinkable PSA, the amount of polyfunctional monomer used relative to the entire monomers can be, for instance, 0.001% by weight or higher, 0.005% by weight or higher, 0.01% by weight or higher, or even 0.03% by weight or higher.

From the standpoint of the photo-crosslinkable PSA's surface conformity, etc., in some embodiments, a bifunctional monomer can be preferably used as the polyfunctional monomer. The ratio of bifunctional monomer in the entire polyfunctional monomers used can be, for instance, 50% by weight or higher, 70% by weight or higher, 90% by weight or higher, or even 100% by weight.

The weight ratio of polymer (PB) in the combined amount of polymer (PB) and ethylenically unsaturated compound (B) in the PSA composition is not particularly limited. It can be selected to favorably balance the surface conformity of the photo-crosslinkable PSA formed from the PSA composition and the deformation resistance of the photo-crosslinked product thereof. In some embodiment, the polymer (PB) has a weight fraction of, for instance, possibly 1% by weight or higher, usually suitably 5% by weight or higher. From the standpoint of enhancing the effect of photo-crosslinking, it can be 10% by weight or higher, 15% by weight or higher, 25% by weight or higher, 35% by weight or higher, 45% by weight or higher, or even 55% by weight or higher. From the standpoint of the ease of preparing and applying the PSA composition, in some embodiments, the polymer (PB)'s weight fraction in the combined amount can be, for instance, below 99% by weight, below 95% by weight, below 85% by weight, below 70% by weight, below 50% by weight, or even below 40% by weight.

In the PSA composition disclosed herein, the weight ratio of organic solvent in the entire PSA composition is, for instance, possibly 30% by weight or lower, advantageously 20% by weight or lower, preferably 10% by weight or lower, or more preferably 5% by weight or lower. In some embodiments, the weight ratio of organic solvent can be 3% by weight or lower, 1% by weight or lower, 0.5% by weight or lower, 0.1% by weight or lower, or even 0.05% by weight or lower. It can also be essentially free of an organic solvent. It is preferable to lower the weight ratio of organic solvent in the PSA composition in view of reducing VOC of the photo-crosslinkable PSA formed from the PSA composition. The PSA composition disclosed herein comprises an ethylenically unsaturated compound (B) in addition to the polymer (PB) (A); and therefore, the ethylenically unsaturated compound (B) can be used as a diluent for the polymer (PB) (A). By this, even in the PSA composition in an embodiment comprising at least a certain amount of polymer (PB) (A) having at least a certain Mw value, an organic solvent may not be required to facilitate application of the PSA composition in a room temperature range (e.g. 20° C. to 40° C.) or the usage of the organic solvent can be reduced.

In some embodiments of the PSA composition disclosed herein, from the standpoint of the ease of application in the room temperature range, etc., the PSA composition has a viscosity (determined by a BH viscometer with a No. 5 rotor at 10 rpm at a measurement temperature of 30° C.; the same applies, hereinafter) of suitably 1000 Pa·s or less, preferably 100 Pa·s or less, or more preferably 50 Pa·s or less. The PSA composition can have a viscosity of, for instance, 30 Pa·s or less, 20 Pa·s or less, 10 Pa·s or less, or 5 Pa·s or less. The minimum viscosity of the PSA composition is not particularly limited. In view of making the PSA composition less repulsive in the applied area and reducing bleeding of the PSA composition at the periphery of the applied area, it is usually suitably 0.1 Pa·s or greater, 0.5 Pa·s or greater, or even 1 Pa·s or greater.

The PSA composition according to some embodiments comprises, as the ethylenically unsaturated compound (B), at least a monofunctional monomer (B1) (a monomer having one ethylenically unsaturated group). As the monofunctional monomer (B1), a corresponding compound can be selected for use among the aforementioned examples of the ethylenically unsaturated compound (B). For the monofunctional monomer (B1), solely one species or a combination of two or more species can be used.

Of the combined amount of polymer (PB) and ethylenically unsaturated compound (B), the weight ratio of monofunctional monomer (B1) can be, for instance, 1% by weight or higher, 5% by weight or higher, or even 15% by weight or higher. In some embodiments, from the standpoint of the ease of preparing and applying the PSA composition, the weight ratio of monofunctional monomer (B1) can be 25% by weight or higher, 35% by weight or higher, or even 45% by weight or higher. The weight ratio of monofunctional monomer (B1) in the combined amount is, for instance, possibly 99% by weight or lower, usually suitably 95% by weight or lower, 85% by weight or lower, 75% by weight or lower, 65% by weight or lower, 55% by weight or lower, or even 45% by weight or lower.

In an embodiment of the PSA composition comprising a monofunctional monomer (B1), the grass transition temperature (Tg) determined by the Fox equation based on the monofunctional monomer (B1) composition is not particularly limited. For instance, it can be −80° C. or higher and 250° C. or lower. From the standpoint of the compatibility between the polymer derived from the monofunctional monomer (B1) and other components, the Tg value based on the monofunctional monomer (B1) composition is usually preferably 150° C. or lower, possibly 100° C. or lower, 70° C. or lower, 50° C. or lower, or even 30° C. or lower. In some embodiments, from the standpoint of the surface conformity of the photo-crosslinkable PSA, the Tg value based on the monofunctional monomer (B1) composition is preferably below 0° C., more preferably −10° C. or lower, possibly −20° C. or lower, −30° C. or lower, or even −40° C. or lower. From the standpoint of the photo-crosslinkable PSA's cohesion and post-photo-crosslinking deformation resistance (e.g. bond durability to adherends), the Tg value based on the monofunctional monomer (B1) composition is usually advantageously −60° C. or higher, possibly −54° C. or higher, −50° C. or higher, −45° C. or higher, −35° C. or higher, or even −25° C. or higher. The Tg value can be adjusted by the compounds used as the monofunctional monomer (B1) and their relative amounts used.

In the PSA composition comprising a polymer (PB) and a monofunctional monomer (B1), the photo-crosslinkable PSA formed from the PSA composition and the photo-crosslinked product thereof, the polymer (PB) (A)'s Tg value (or "$Tg_A$" hereinafter) and the monofunctional monomer (B1)'s Tg (or "$Tg_{B1}$" hereinafter) based on its composition can be selected so that the difference in Tg (or $\Delta Tg$ hereinafter) determined by $Tg_{B1}-Tg_A$ (both in ° C.) is in the range of, for instance, −50° C. or greater and 70° C. or less. It may be advantageous that the absolute value of difference in Tg is not excessively large in view of the compatibility in the photo-crosslinkable PSA and photo-crosslinked product. In some embodiments, $\Delta Tg$ can be, for instance, −10° C. or greater, preferably 0° C. or greater, possibly 7° C. or greater, 10° C. or greater, 20° C. or greater, or even 30° C. or greater.

The PSA composition according to some embodiments includes, as the ethylenically unsaturated compound (B), at least a polyfunctional monomer (B2) (i.e. a compound having two or more ethylenically unsaturated groups). For the polyfunctional monomer (B2), solely one species or a combination of two or more species can be used. The amount of polyfunctional monomer (B2) used can be selected in the same manner as for the ratio of polyfunctional monomer in the entire monomers forming the PSA composition.

In an embodiment using both a monofunctional monomer (B1) and a polyfunctional monomer (B2) as the ethylenically unsaturated compound (B), the weight ratio of monofunctional monomer (B1) in the ethylenically unsaturated compound (B) is, for instance, possibly 1% by weight or higher, usually suitably 25% by weight or higher, possibly 50% by weight or higher, 75% by weight or higher, 95% by weight or higher, or even 99% by weight or higher. The weight ratio of monofunctional monomer (B1) in the ethylenically unsaturated compound (B) can be, for instance, 99.9% by weight or lower, or even 99.8% by weight or lower.

The PSA composition disclosed herein may include the ethylenically unsaturated compound (B) as a partial polymer or entirely as unreacted monomers. The PSA composition according to a preferable embodiment includes the ethylenically unsaturated compound (B) as a partial polymer. The polymerization method for partially polymerizing the ethylenically unsaturated compound (B) is not particularly limited. For instance, various heretofore known polymerization methods can be suitably selected and used, such as photopolymerization carried out by irradiation of light such as UV rays; radiation polymerization carried out by irradiation of radioactive rays such as β and γ rays; and thermal polymerization such as solution polymerization, emulsion polymerization and bulk polymerization. From the standpoint of the efficiency and convenience, photopolymerization can be preferably employed. According to photopolymerization, through polymerization conditions such as the amount of light irradiated (light dose), the monomer conversion can be easily controlled.

The monomer conversion of the ethylenically unsaturated compound (B) in the partial polymer is not particularly limited. From the standpoint of the ease of preparing and applying the PSA composition, the monomer conversion is usually suitably about 50% by weight or lower, or preferably about 40% by weight or lower (e.g. about 35% by weight or lower). The minimum monomer conversion is not particularly limited. It is typically about 1% by weight or higher, or usually suitably about 5% by weight or higher.

The PSA composition comprising the partial polymer of the ethylenically unsaturated compound (B) can be obtained, for instance, by partially polymerization a monomer mixture including the entire amount of the ethylenically unsaturated compound (B) used for preparation of the PSA composition according to a suitable polymerization method (e.g. photopolymerization). The PSA composition comprising the partial polymer of the ethylenically unsaturated compound (B) can be a mixture of a partial polymer of a monomer mixture including some of the ethylenically unsaturated compound (B) used for preparation of the PSA composition and the remaining ethylenically unsaturated compound (B) or a partial polymer thereof. As used herein, the term "complete polymer" indicates that the monomer conversion is above 95% by weight.

The partial polymer can be prepared, for instance, by UV-irradiating the ethylenically unsaturated monomers. In case that the partial polymer is prepared in the presence of a polymer (PB), when the reaction of ethylenically unsaturated groups is carried out with the UV irradiation conditions selected to not cause photoexcitation of benzophenone structures, a PSA composition comprising the polymer (PB) and a partial polymer of the ethylenically unsaturated monomer can be obtained. As the light source, it is preferable to use a light source capable of radiating UV rays that are free of a <300 nm wavelength component or low in amount thereof, such as the aforementioned blacklight and UV-LED lamp.

Alternatively, after a partial polymer of the ethylenically unsaturated compound (B) is prepared in advance, the partial polymer can be mixed with a polymer (PB) to prepare the PSA composition. When UV-irradiating the ethylenically unsaturated monomer in absence of benzophenone structures to prepare a partial polymer thereof, as the UV light source, it is possible to use either a non-BP-excitation light source or a BP-excitation light source.

In preparing the partial polymer of the ethylenically unsaturated compound (B), a photoinitiator can be used to accelerate the reaction of ethylenically unsaturated groups. Usable photoinitiators include ketal-based photoinitiators, acetophenone-based photoinitiators, benzoin ether-based photoinitiators, acylphosphine oxide-based photoinitiators, α-ketol-based photoinitiators, aromatic sulfonyl chloride-based photoinitiators, photoactive oxime-based photoinitiators, benzoin-based photoinitiators, benzil-based photoinitiators, benzophenone-based photoinitiators, alkylphenone-based photoinitiators and thioxanthone-based photoinitiators. It is preferable to use a photoinitiator that absorbs ≥300 nm wavelength light (e.g. ≥300 nm, ≤500 nm wavelength light) to generate radicals. For the photoinitiator, solely one species or a combination of two or more species can be used.

Photoinitiator (C)

The PSA composition used for forming the type-B layer B can include a photoinitiator (C) as necessary for enhancing or providing photo-curing properties, etc. Usable photoinitiators include ketal-based photoinitiators, acetophenone-based photoinitiators, benzoin ether-based photoinitiators, acylphosphine oxide-based photoinitiators, α-ketol-based photoinitiators, aromatic sulfonyl chloride-based photoinitiators, photoactive oxime-based photoinitiators, benzoin-based photoinitiators, benzil-based photoinitiators, benzophenone-based photoinitiators, alkylphenone-based photoinitiators and thioxanthone-based photoinitiators. For the photoinitiator, solely one species or a combination of two or more species can be used.

Specific examples of ketal-based photoinitiators include 2,2-dimethoxy-1,2-diphenylethane-1-one.

Specific examples of acetophenone-based photoinitiators include 1-hydroxycyclohexyl phenyl ketone, 4-phenoxydichloroacetophenone, 4-t-butyl-dichloroacetophenone, 1-[4-(2-hydroxyethoxy)-phenyl]-2-hydroxy-2-methyl-1-propane-1-one, 2-hydroxy-2-methyl-1-phenyl-propane-1-one and methoxyacetophenone Specific examples of benzoin ether-based photoinitiators include benzoin ethers such as benzoin methyl ether, benzoin ethyl ether, benzoin propyl ether, benzoin isopropyl ether and benzoin isobutyl ether as well as substituted benzoin ethers such as anisole methyl ether.

Specific examples of acylphosphine oxide-based photoinitiators include bis(2,4,6-trimethylbenzoyl)phenylphosphine oxide, bis(2,4,6-trimethylbenzoyl)-2,4-di-n-butoxyphenylphosphine oxide, 2,4,6-trimethylbenzoyldiphenylphosphine oxide and bis(2,6-dimethoxybenzoyl)-2,4,4-trimethylpentylphosphine oxide.

Specific examples of α-ketol-based photoinitiators include 2-methyl-2-hydroxypropiophenone and 1-[4-(2-hydroxyethyl)phenyl]-2-methylpropane-1-one. Specific examples of aromatic sulfonyl chloride-based photoinitiators include 2-naphthalenesulfonyl chloride. Specific examples of photoactive oxime-based photoinitiators include 1-phenyl-1,1-propanedione-2-(o-ethoxycarbonyl)-oxime. Specific examples of benzoin-based photoinitiators include benzoin. Specific examples of benzil-based photoinitiators include benzil.

Specific examples of benzophenone-based photoinitiators include benzophenone, benzoylbenzoic acid, 3,3'-dimethyl-4-methoxybenzophenone, polyvinylbenzophenone and α-hydroxycyclohexylphenylketone.

Specific examples of thioxanthone-based photoinitiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone and dodecylthioxanthone.

As the photoinitiator (C) included in the PSA composition, it is preferable to use a photoinitiator that absorbs ≥300 nm wavelength light (e.g. ≥300 nm, ≤500 nm wavelength light) to generate radicals. For the photoinitiator, solely one species or a combination of two or more species can be used. In some embodiments, a photoinitiator whose molecule is free of a phosphorous atom can be preferably used. The PSA composition disclosed herein can be essentially free of a P-containing photoinitiator.

The amount of photoinitiator in the PSA composition is not particularly limited and can be selected to suitably obtain desirable effects. In some embodiments, the photoinitiator content relative to 100 parts by weight of the monomers forming the PSA composition is, for instance, possibly about 0.005 part by weight or higher, usually suitably 0.01 part by weight or higher, preferably 0.05 part by weight or higher, also possibly 0.10 part by weight or higher, 0.15 part by weight or higher, or even 0.20 part by weight or higher. With increasing photoinitiator content, the photocuring ability of the PSA composition will increase. The photoinitiator content relative to 100 parts by weight of the monomers forming the PSA composition is usually suitably 5 parts by weight or lower, preferably 2 parts by weight or lower, possibly 1 part by weight or lower, 0.7 part by weight or lower, or even 0.5 part by weight or lower. It can be advantageous that the photoinitiator content is not excessively high in view of inhibiting gelation of the PSA composition, etc.

Crosslinking Agent

To the PSA composition, as necessary, a known crosslinking agent can be added, for instance, an isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agent, hydrazine-based crosslinking agent and amine-based crosslinking agent. As the crosslinking agent, a peroxide can also be used. Among these crosslinking agents, solely one species or a combination of two or more species can be used. The photo-crosslinkable PSA formed from a PSA composition comprising a crosslinking agent preferably includes the crosslinking agent primarily in the crosslinked form. The use of crosslinking agent enables suitable adjustment of the cohesive strength of the photo-crosslinkable PSA, etc.

Specific examples of the crosslinking agent usable in the PSA composition for forming the type-B layer B are generally the same as the specific examples of the crosslinking agent usable in the PSA composition for forming the type-D layer B described later. Thus, redundant details are omitted.

When using a crosslinking agent, its amount used (when using two or more kinds of crosslinking agents, their combined amount) is not particularly limited. From the standpoint of obtaining a PSA showing well-balanced adhesive properties such as adhesive strength and cohesive strength, the amount of crosslinking agent used to 100 parts by weight of the monomers forming the PSA composition is usually suitably about 5 parts by weight or lower, possibly 3 parts by weight or lower, 1 part by weight or lower, 0.50 part by weight or lower, 0.30 part by weight or lower, or even 0.20 part by weight or lower. The minimum amount of crosslinking agent used is not particularly limited as long as it is higher than 0 part by weight to 100 parts by weight of the monomers forming the PSA composition. In some embodiments, the amount of crosslinking agent used to 100 parts by weight of the monomers forming the PSA composition can be 0.001 part by weight or higher, 0.01 part by weight or higher, 0.05 part by weight or higher, or even 0.10 part by weight or higher.

Chain Transfer Agent

The PSA composition may comprise various kinds of heretofore known chain transfer agent. As the chain transfer agent, mercaptans can be used, such as n-dodecyl mercaptan, t-dodecyl mercaptan, thioglycolic acid and α-thioglycerol. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene. For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

Acrylic Oligomer

From the standpoint of increasing the cohesive strength and enhancing the adhesion to the adjacent surface (possibly a PSA sublayer (e.g. layer A) adjacent thereto, the substrate surface in a substrate-supported PSA sheet, etc.), the layer B-forming photo-crosslinkable PSA can include an acrylic oligomer. A layer B comprising an acrylic oligomer can be preferably formed, using a PSA composition comprising the acrylic oligomer. As the acrylic oligomer used in the type-B layer B, it is preferable to use a species having a higher Tg than the polymer (PB)'s Tg.

The acrylic oligomer's Tg is not particularly limited. It can be, for instance, about 20° C. or higher and 300° C. or lower. The Tg can also be, for instance, about 30° C. or higher, about 40° C. or higher, about 60° C. or higher, about 80° C. or higher, or even about 100° C. or higher. With increasing acrylic oligomer's Tg, the effect to increase the cohesive strength generally tends to increase. From the standpoint of the compatibility, etc., the acrylic oligomer's Tg can be, for instance, about 250° C. or lower, about 200° C. or lower, about 180° C. or lower, or even about 150° C. or lower. Similar to the glass transition temperature of the aforementioned polymer (PB), the acrylic oligomer's Tg value is determined based on the Fox equation.

The Mw of the acrylic oligomer is not particularly limited. For instance, it is possibly about 1000 or higher, usually suitably 1500 or higher, possibly about 2000 or higher, or even about 3000 or higher. The acrylic oligomer's Mw is, for instance, possibly below about 30000, usually suitably below about 10000, also possibly below about 7000, or even below about 5000. The Mw in these ranges is likely to favorably bring about the effect to enhance the layer B's cohesion and adhesion with the adjacent surface. The acrylic oligomer's Mw can be measured by gel permeation chromatography (GPC) and determined as a value based on polystyrene standards. In particular, for instance, using two TSKgel GMH-H (20) columns on HPLC8020 available from Tosoh Corporation, it can be measured with tetrahydrofuran solvent at a flow rate of about 0.5 mL/min.

Examples of the monomers forming the acrylic oligomer include (meth)acrylate monomers such as the aforementioned various $C_{1-20}$ alkyl (meth)acrylates; the aforementioned various alicyclic hydrocarbon group-containing (meth)acrylates; the aforementioned various aromatic hydrocarbon group-containing (meth)acrylates; and (meth)acrylates obtained from terpene-derived alcohols. These can be used solely as one species or in a combination of two or more species.

From the standpoint of enhancing the adhesion, the acrylic oligomer preferably includes, as a monomeric unit, an acrylic monomer having a relatively bulky structure, typified by an alkyl (meth)acrylate whose alkyl group has a branched structure such as isobutyl (meth)acrylate and t-butyl (meth) acrylate; an alicyclic hydrocarbon group-containing (meth) acrylate; and an aromatic hydrocarbon group-containing (meth)acrylate. When UV rays are used for the synthesis of the acrylic oligomer or for the preparation of the PSA layer, for being less likely to inhibit the polymerization, a monomer having a saturated hydrocarbon group at the ester terminus is preferable. For instance, an alkyl (meth)acrylate whose alkyl group has a branched structure and a saturated alicyclic hydrocarbon group-containing (meth)acrylate can be favorably used.

The ratio of (meth)acrylate monomer in the entire monomers forming the acrylic oligomer is typically above 50% by weight, preferably 60% by weight or higher, or more preferably 70% by weight or higher (e.g. 80% by weight or higher, or even 90% by weight or higher). In a preferable embodiment, the acrylic oligomer has a monomer composition essentially consisting of one, two or more species of (meth)acrylate monomer. When the monomers include an alicyclic hydrocarbon group-containing (meth)acrylate and a $C_{1-20}$ alkyl (meth)acrylate, their weight ratio is not particularly limited. In some embodiments, the alicyclic hydrocarbon group-containing (meth)acrylate to $C_{1-20}$ alkyl (meth)acrylate ratio can be in a range of, for instance, 10/90 or higher, 20/80 or higher, or 30/70 or higher; and 90/10 or lower, 80/20 or lower, or 70/30 or lower.

As the acrylic oligomer-forming monomers, in addition to the (meth)acrylate monomer described above, a functional group-containing monomer can be used as necessary. Examples of the functional group-containing monomer include monomers having nitrogen atom-containing heterocyclic rings such as N-vinyl-2-pyrrolidone and N-acryloylmorpholine; amino group-containing monomers such as N,N-dimethylaminoethyl (meth)acrylate; amide group-containing monomers such as N,N-diethyl (meth)acrylamide; carboxy group-containing monomers such as AA and MAA; and hydroxy group-containing monomers such as 2-hydroxyethyl (meth)acrylate. These functional group-containing monomers can be used solely as one species or in a combination of two or more species. When a functional group-containing monomer is used, the ratio of the functional group-containing monomer in the entire monomers forming the acrylic oligomer can be, for instance, 1% by weight or greater, 2% by weight or greater, or 3% by weight or greater. It can also be, for instance, 15% by weight or less, 10% by weight or less, or 7% by weight or less. The acrylic oligomer may be free of a functional group-containing monomer.

Examples of favorable acrylic oligomers include homopolymers of various monomers such as dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamantyl methacrylate (ADMA) and 1-adamantyl acrylate (ADA) as well as a copolymer of DCPMA and MMA, copolymer of DCPMA and IBXMA, copolymer of ADA and methyl methacrylate (MMA), copolymer of CHMA and isobutyl methacrylate (IBMA), copolymer of CHMA and IBXMA, copolymer of CHMA and acryloylmorpholine (ACMO), copolymer of CHMA and diethylacrylamide (DEAA), and copolymer of CHMA and AA.

The acrylic oligomer can be formed by polymerizing its constituent monomers. The polymerization method and the polymerization conditions are not particularly limited. Various heretofore known polymerization methods (e.g. solution polymerization, emulsion polymerization, bulk polymerization, photopolymerization, radiation polymerization, etc.) can be employed under suitable conditions. The types of polymerization initiator (e.g. azo polymerization initiator) that can be used as necessary are as exemplified for the polymerization to obtain the first acrylic polymer in the specification of polymer (PD) described later. The amount of polymerization initiator and the amount of chain transfer agent (e.g. a mercaptan) used optionally are suitably selected based on common technical knowledge so as to obtain a desirable molecular weight. Thus, details are omitted.

When including an acrylic oligomer in the layer B, its amount is not particularly limited and can be selected to obtain desirable effects. In some embodiments, the amount of acrylic oligomer used can be, for instance, 0.01% by weight or more of the entire monomers forming the layer B. From the standpoint of obtaining greater effects, it can be 0.05% by weight or more, 0.1% by weight or more, or even 0.2% by weight or more. From the standpoint of the PSA layer's transparency, etc., of the entire monomers forming the layer B, the amount of acrylic oligomer used is usually suitably below 50% by weight, preferably below 30% by weight, more preferably 25% by weight or lower, possibly 10% by weight or lower, 5% by weight or lower, 1% by weight or lower, or even 0.5% by weight or lower. Acrylic oligomers may not be used, either.

Where necessary, the PSA composition for forming the layer B may include, as other optional components, various additives generally used in the field of PSA, such as tackifier resin (e.g. rosin-based, petroleum-based, terpene-based, phenol-based, ketone-based kinds, etc.), viscosity-adjusting agent (e.g. thickener), leveling agent, plasticizer, filler, colorant including pigment and dye, stabilizing agent, preservative, antioxidant and anti-aging agent. As for these various additives, heretofore known species can be used by typical methods.

From the standpoint of the transparency of the PSA layer, of the layer B or the PSA composition used to form the layer B, the amount of tackifier resin included relative to 100 parts by weight of the layer B-forming monomers can be, for instance, less than 10 parts by weight, or even less than 5 parts by weight. The tackifier resin content can be less than 1 part by weight (e.g. less than 0.5 part by weight), or even less than 0.1 part by weight (0 part or greater and less than 0.1 part by weight). The layer B or the layer B-forming PSA composition may be free of a tackifier resin.

The PSA composition is formulated to be able to form a polymer (PB)-containing photo-crosslinkable PSA when cured. For instance, the PSA composition can be provided (e.g. applied) to a suitable surface and then suitably subjected to curing treatment such as active energy ray irradiation, drying (e.g. dried with heat), crosslinking (e.g. by reaction of crosslinking agent as described earlier) and cooling (e.g. cooling of the PSA composition applied in a hot-melt state) to form a PSA layer as a cured layer of the PSA composition. When performing two or more different curing treatments, these can be carried out simultaneously or stepwise.

With respect to the PSA composition comprising a polymer (PB) and an ethylenically unsaturated compound (B), the curing is preferably carried out to allow reaction of ethylenically unsaturated groups in the PSA composition while allowing the benzophenone structures in the PSA composition to remain. The curing can be more preferably carried out by irradiation of active energy rays. As the light source for curing the PSA composition to form a photo-crosslinkable PSA, it is preferable to use a light source capable of radiating UV rays that are free of a <300 nm wavelength component or low in amount thereof, such as the aforementioned blacklight and UV-LED lamp.

In some embodiments, in the PSA composition, the ethylenically unsaturated compound (B) may have a composition free of an ethylenically unsaturated BP. According to the PSA composition having such a composition, it is possible to produce a photo-crosslinkable PSA that comprises a polymer (PB) and a polymer (E) derived from an ethylenically unsaturated compound (B), wherein the polymer (E) is a polymer (PNB).

This Description provides a method for producing a photo-crosslinkable PSA that can be crosslinked by benzophenone structures. The production method comprises obtaining a PSA composition comprising ethylenically unsaturated groups and benzophenone structures, and irradiating the PSA composition with active energy rays (preferably UV rays). The PSA composition may include a photoinitiator. The irradiation of active energy rays for curing the PSA composition is preferably performed to allow reaction of the ethylenically unsaturated groups while allowing the benzophenone structures to remain (unreacted). As the PSA composition, it is preferable to use a PSA composition comprising a polymer (PB) and an ethylenically unsaturated compound (B). The photo-crosslinkable PSA production method can be preferably carried out, using a PSA composition disclosed herein. As the light source for curing the PSA composition to form a photo-crosslinkable PSA, it is preferable to use a light source capable of radiating UV rays that are free of a <300 nm wavelength component or low in amount thereof, such as the aforementioned blacklight and UV-LED lamp.

(2) Layer B Comprising Polymer (PD)

Another favorable example of the photo-crosslinkable polymer-containing layer B is a layer B (type-D layer B) formed from a photo-crosslinkable PSA comprising, as the photo-crosslinkable polymer, a polymer (PD) having carbon-carbon double bonds (C=C). The polymer (PD) is preferably essentially free of ethylenically unsaturated groups. The polymer (PD) is preferably a rubber-like polymer that shows rubber elasticity in a temperature range near room temperature. In some embodiments, the type-D layer B can be a photo-crosslinkable PSA sublayer comprising a polymer (PD) as base polymer.

Carbon-carbon double bonds are chemically stable, being unreactive towards the sort of moisture and oxygen in air under typical, industrially applicable storage conditions. On the other hand, for instance, the type-D layer B can be irradiated with active energy rays to allow reaction of the carbon-carbon double bonds of the polymer (PD) so as to form a crosslinked structure. When using UV rays as the active energy rays, the type-D layer B preferably includes a photoinitiator described later.

The form of C=C in the polymer (PD) is not particularly limited. In some preferable embodiments, the polymer (PD) has C=C as an ethylenically unsaturated group. The polymer (PD) may have C=C in side chains or the main chain. Here, having C=C in the main chain encompasses C=C present in the main chain backbone of the polymer (PD) and those present at the main chain termini. The method for including C=C in the polymer (PD) is not particularly limited. A suitable method can be selected among methods known to a skilled person. From the standpoint of the C=C reactivity, it is preferable to use a polymer (PD) having C=C in side chains.

As used herein, the main chain of a polymer refers to the linear structure constituting the backbone of the polymer. A side chain of a polymer refers to a group (pendant, side chain) bonded to the main chain or to a molecular chain considered a pendant.

The polymer (PD) is not particularly limited. A suitable polymer can be selected for use in view of the PSA layer's properties, etc. As the polymer (PD), it is preferable to use a species (second polymer) obtained by chemical modification or like method to incorporate C=C into a polymer (first polymer) having a lower C=C content than the target product.

In a specific example of the method for incorporating C=C bonds in the first polymer, the first polymer is obtained with a monomer having a functional group ("functional group A" hereinafter) copolymerized and the first polymer is allowed to react with a compound having a C=C and a functional group ("functional group B" hereinafter) reactive towards the functional group A without losing the C=C (while keeping the C=C intact). The reaction between functional groups A and B is preferably a reaction not accompanying radical formation, such as condensation and addition reaction.

Examples of the combination of functional groups A and B include a carboxy group and epoxy group combination, a carboxy group and aziridinyl group combination, and a hydroxy group and isocyanate group combination. In particular, from the standpoint of the ease of reaction tracing, the hydroxy group and isocyanate group combination is preferable. As long as a C=C-containing polymer can be obtained from the combination, in the combination of functional groups A and B, the first can be a functional group A and the second a functional group B, or the first can be a functional group B and the second a functional group A. For instance, with respect to the hydroxy group and isocyanate group combination, the functional group A can be the hydroxy group (in this case, the functional group B is the isocyanate group) or the isocyanate group (in this case, the functional group B is the hydroxy group). In particular, in a preferable combination, the first polymer has a hydroxy group and the compound has an isocyanate group. This combination is particularly preferable when the first polymer is an acrylic polymer.

When the first polymer is a vinyl alcohol-based polymer (typically polyvinyl alcohol), one favorable example is a method where the vinyl alcohol-based polymer (typically a C=C-free vinyl alcohol-based polymer) is allowed to react with a vinyl halide such as vinyl bromide or an allyl halide such as allyl bromide. In this method, the reaction is carried out under suitable basic conditions to obtain a vinyl alcohol-based polymer having vinyl groups in side chains. Alternatively, for instance, it is also possible to employ a C=C-containing polymer production method using a microorganism that produces a polymer as described in Japanese Patent No. 4502363. For various conditions in this method such as species of microorganism and microbial culturing conditions, the conditions according to the patent journal can be used or suitable modifications can be made within the bounds of technical common knowledge of a skilled person.

As for the molar ratio ($M_A/M_B$) of moles ($M_A$) of functional group A to moles ($M_B$) of functional group B can be, for instance, 0.2 or higher, 0.5 or higher, 0.7 or higher, or even 1.0 or higher. From the standpoint of increasing the opportunities of functional group B to make contact with functional group A, the molar ratio $M_A/M_B$ is preferably above 1. In some embodiments, the molar ratio $M_A/M_B$ can be, for instance, above 5, above 10, above 15, or even above 20. The minimum molar ratio $M_A/M_B$ is not particularly limited. For instance, it can be 100 or lower, or even 50 or lower.

While satisfying the aforementioned molar ratio $M_A/M_B$, the amount of a functional group B-containing unsaturated compound (a compound having a functional group B and a C=C bond) used to 100 parts by weight of the first polymer can be, for instance, 0.01 part by weight or higher, 0.05 part by weight or higher, 0.1 part by weight or higher, 0.2 part by weight or higher, or even 0.3 part by weight or higher. With increasing amount of the functional B-containing unsaturated compound, the photo-crosslinking of the type-D layer B tends to bring about greater enhancement of deformation resistance. From the standpoint of the optical properties (increased transparency, reduced optical distortion, etc.) of the photo-crosslinked layer B, the amount of functional group B-containing unsaturated compound used to 100 parts by weight of the functional group A-containing first polymer is usually suitably below 20 parts by weight, advantageously below 15 parts by weight, preferably below 10 parts by weight, or more preferably below 7 parts by weight. In some embodiments, the amount of functional group B-containing unsaturated compound used can be, for instance, below 5 parts by weight, below 3 parts by weight, below 2 parts by weight, or even below 1 part by weight. For instance, the molar ratio $M_A/M_B$ and the amount used of the functional group B-containing unsaturated compound can be preferably applied to, for instance, an embodiment using the acrylic polymer described later as the first polymer.

The C=C-containing polymer can also be, for instance, a diene-based polymer (typically a conjugated diene-based polymer). The diene-based polymer (typically a conjugated diene-based polymer) is obtainable typically by polymerization or copolymerization of a diene (typically a conjugated diene). Examples of the diene-based polymer (typically a conjugated diene-based polymer) include butadiene-based polymers such as polybutadiene and styrene-butadiene copolymer; isoprene-based polymers such as polyisoprene and styrene-isoprene copolymer; and chloroprene polymers such as polychloroprene.

The weight average molecular weight (Mw) of the polymer (PD) is not particularly limited. From the standpoint of the cohesion of the photo-crosslinkable PSA and the handling properties of the PSA sheet having the photo-crosslinkable PSA, etc., in some embodiments, the polymer (PB) has a Mw of suitably about $10 \times 10^4$ or higher, preferably about $20 \times 10^4$ or higher, or more preferably about $30 \times 10^4$ or higher. On the other hand, from the standpoint of the surface conformity of the PSA layer forming the PSA sheet (i.e. the PSA layer having a multilayer structure including the pre-photo-crosslinking layer B), the Mw is suitably about $500 \times 10^4$ or lower, preferably about $100 \times 10^4$ or lower, or more preferably about $70 \times 10^4$ or lower.

In the art disclosed herein, the glass transition temperature (Tg) of the polymer (PD) is not particularly limited. From the standpoint of the surface conformity of the PSA layer, the Tg of the polymer (PD) is usually suitably below 0° C., preferably below −10° C., or more preferably below −20° C. hi some embodiments, the polymer (PD)'s Tg can be below −25° C., or below −30° C. The polymer (PD)'s Tg is typically −80° C. or higher, for instance, possibly −70° C. or higher, −60° C. or higher, or even −55° C. or higher. From the standpoint of the photo-crosslinkable PSA's cohesion and post-photo-crosslinking deformation resistance (e.g. bond durability to adherends), in some embodiments, the polymer (PD)'s Tg is preferably −50° C. or higher, more preferably −45° C. or higher, possibly −40° C. or higher, −38° C. or higher, or even −35° C. or higher.

With respect to a polymer (PD) obtained by incorporating C=C in a first polymer, it is preferable that the first polymer has an aforementioned Tg value.

The polymer (PD) content of type-D layer B can be selected to obtain desirable properties before and after photo-crosslinked and is not limited to a particular range. In some embodiments, the polymer (PD) content of type-D layer B is for instance, possibly about 10% by weight or higher, usually suitably about 50% by weight or higher, also possibly about 70% by weight or higher, about 90% by weight or higher, preferably about 95% by weight or higher, also about 97% by weight or higher, or even about 99% by weight or higher (e.g. 99% to 100% by weight).

Acrylic Polymer as Polymer (PD)

In some embodiments, from the standpoint of the layer B's tendency of increasing elasticity by photo-crosslinking and optical properties, the polymer (PD) is preferably an acrylic polymer having C=C bonds. Favorable examples of the polymer (PD) include an acrylic polymer in which the acrylic monomer accounts for more than 50% by weight (preferably more than 65% by weight, e.g. more than 75% by weight) of the polymer (PD)-forming monomers. Favorable examples of the acrylic polymer include a polymer of starting monomers that comprises an alkyl (meth)acrylate and may further comprise other monomer(s) copolymerizable with the alkyl (meth)acrylate (copolymerizable monomer(s)) as well as a modification product thereof (e.g. second polymer obtained by incorporating C=C bonds in the polymer as the first polymer by a method such as chemical modification).

The alkyl (meth)acrylate can be selected among the alkyl (meth)acrylates exemplified as species usable as the polymer (PB)-forming monomers. Particularly preferable alkyl (meth)acrylates include n-butyl acrylate (BA), 2-ethylhexyl acrylate (2EHA) and isononyl acrylate. Other specific examples of alkyl (meth)acrylates that can be preferably used include n-butyl methacrylate (BMA), 2-ethylhexyl methacrylate (2EHMA) and isostearyl acrylate (iSTA). As the alkyl (meth)acrylate, solely one species or a combination of two or more species can be used.

Of the entire polymer (PD)-forming monomers, the ratio of alkyl (meth)acrylate is preferably about 40% by weight or higher. In some embodiments, the ratio of alkyl (meth) acrylate can be, for instance, 50% by weight or higher, 55% by weight or higher, or even 60% by weight or higher. From the standpoint of enhancing the layer B's cohesion, the alkyl (meth)acrylate content of the monomers is usually suitably 99.5% by weight or lower, possibly 95% by weight or lower, 85% by weight or lower, 75% by weight or lower, or even 70% by weight or lower.

Along with the alkyl (meth)acrylate, the polymer (PD)-forming monomers may further include other monomer(s) copolymerizable with the alkyl (meth)acrylate (copolymerizable monomer(s)). As the copolymerizable monomer(s), one, two or more species can be used, selected among the examples of species usable as the polymer (PB)-forming monomers.

When using such a copolymerizable monomer, its amount used is not particularly limited. In typical, it is suitably 0.01% by weight or more of the entire monomers forming the PSA composition. From the standpoint of better obtaining the effect of use of copolymerizable monomer(s), of the entire monomers, the amount of copolymerizable monomer(s) used (i.e. the weight fraction of copolymerizable monomer(s) in the entire monomers) can be 0.1% by weight or higher, or even 0.5% by weight or higher. In some embodiments, of the entire monomers, the amount of copolymerizable monomer used can be, for instance, 5% by weight or higher, 10% by weight or higher, 15% by weight or higher, 20% by weight or higher, 25% by weight or higher, or even 30% by weight or higher. From the standpoint of readily balancing the adhesive properties, of the entire monomers, the amount of copolymerizable monomer(s) used is usually suitably 60% by weight or lower, preferably 50% by weight or lower, or also possibly 45% by weight or lower.

In some embodiments, the monomers used in preparing the polymer (PD) may include a monomer having a nitrogen atom (or a "N-containing monomer" hereinafter). One favorable example of the N-containing monomer is a monomer having a N-containing ring (or a "N-hetero-ring-containing monomer" hereinafter). As the N-hetero-ring-containing monomer, it is possible to use the examples listed above as usable materials in preparing the polymer (PB). For instance, a N-vinyl cyclic amide represented by the formula (1) can be used. In particular, N-vinyl-2-pyrrolidone is preferable.

When using a N-containing monomer, its amount used is not particularly limited. For instance, of the entire monomers used in preparing the polymer (PD), it can be 1% by weight or higher, 2% by weight or higher, 3% by weight or higher, even 5% by weight or higher, or 7% by weight or higher. In an embodiment, the amount of N-containing monomer used can be 10% by weight or higher, 15% by weight or higher, or even 20% by weight or higher. Of the entire monomers, the amount of N-containing monomer used is, for instance, suitably 40% by weight or lower, possibly 35% by weight or lower, 30% by weight or lower, or even 25% by weight or lower. In another embodiment, of the entire monomers, the amount of N-containing monomer used can be, for instance, 20% by weight or lower, or even 15% by weight or lower.

In some embodiments, the monomers used in preparing the polymer (PD) may include a hydroxy group-containing monomer as the copolymerizable monomer. The use of hydroxy group-containing monomer allows suitable adjustment of the cohesive strength and density of crosslinks (e.g. crosslinks by isocyanate crosslinking agent) of the layer B-forming photo-crosslinkable PSA. When using a hydroxy group-containing monomer, its amount used is not particularly limited. For instance, of the entire monomers used in preparing the polymer (PD), it can be 0.01% by weight or higher, 0.1% by weight or higher, 0.5% by weight or higher, 1% by weight or higher, 5% by weight or higher, or even 10% by weight or higher. From the standpoint of inhibiting water absorption of the photo-crosslinkable PSA or the photo-crosslinked product thereof, in some embodiments, of the entire monomers, the amount of hydroxy group-containing monomer used is, for instance, suitably 40% by weight or lower, possibly 30% by weight or lower, or even 20% by weight or lower. In another embodiment, the amount of hydroxy group-containing monomer used can be 10% by weight or lower, or even 5% by weight or lower. Alternatively, as the copolymerizable monomers, hydroxy group-containing monomers may not be used.

In some embodiments, the ratio of carboxy group-containing monomer in the entire monomers used in preparing the polymer (PD) can be, for instance, 2% by weight or lower, 1% by weight or lower, or even 0.5% by weight or lower (e.g. below 0.1% by weight). The monomers may be essentially free of a carboxy group-containing monomer. Here, being essentially free of a carboxy group-containing monomer means that a carboxy group-containing monomer is not used at least intentionally. This may be advantageous from the standpoint of the anti-metal corrosion properties of the photo-crosslinkable PSA formed from the PSA composition and the photo-crosslinked product thereof.

In some embodiments, the monomers used in preparing the polymer (PD) may include, as the copolymerizable monomer, an alicyclic hydrocarbon group-containing (meth) acrylate. This can increase the PSA's cohesive strength and the post-photo-crosslinking peel strength. As the alicyclic hydrocarbon group-containing (meth)acrylate, it is possible to use the examples listed above as usable materials in preparing the polymer (PB). For instance, cyclohexyl acrylate and isobornyl acrylate can be preferably used. When using an alicyclic hydrocarbon group-containing (meth) acrylate, its amount used is not particularly limited. For instance, of the entire monomers used in preparing the polymer (PD), it can be 1% by weight or higher, 3% by weight or higher, or even 5% by weight or higher. In an embodiment, of the entire monomers, the amount of alicyclic hydrocarbon group-containing (meth)acrylate used can be 10% by weight or higher, or even 15% by weight or higher. The maximum amount of alicyclic hydrocarbon group-containing (meth)acrylate used is suitably about 40% by weight or lower, for instance, possibly 30% by weight or lower, or also 25% by weight or lower (e.g. 15% by weight or lower, or even 10% by weight or lower).

In some embodiments, the monomers used in preparing the polymer (PD) may include, as the copolymerizable monomer, an alkoxysilyl group-containing monomer. A typical example of the alkoxysilyl group-containing monomer is an ethylenically unsaturated compound having at least one (preferably two or more, e.g. two or three) alkoxysilyl group(s) per molecule. Specific examples thereof are as described earlier. For the alkoxysilyl group-containing monomer, solely one species or a combination of two or more species can be used. By using the alkoxysilyl group-containing monomer, a crosslinked structure formed by condensation reaction of silanol groups (silanol condensation) can be introduced into the photo-crosslinkable PSA.

When using an alkoxysilyl group-containing monomer, its amount used is not particularly limited. In some embodiments, of the entire monomers used in preparing the polymer (PD), the amount of alkoxysilyl group-containing monomer used is, for instance, possibly 0.005% by weight or higher, usually suitably 0.01% by weight or higher, also possibly 0.03% by weight or higher, or even 0.05% by weight or higher. From the standpoint of the surface conformity of the PSA sheet disclosed herein, of the entire monomers, the amount of alkoxysilyl group-containing monomer used is usually suitably 1.0% by weight or lower, possibly 0.5% by weight or lower, or even 0.1% by weight or lower.

The monomers used in preparing the polymer (PD) may include a polyfunctional monomer. As the polyfunctional monomer, it is possible to use the examples listed above as usable materials in preparing the polymer (PB). From the standpoint of the surface conformity of the PSA layer forming the PSA sheet, etc., in some embodiments, a bifunctional monomer can be preferably used as the polyfunctional monomer. The ratio of bifunctional monomer in the entire polyfunctional monomers used can be, for instance, 50% by weight or higher, 70% by weight or higher, 90% by weight or higher, or even 100% by weight.

When using a polyfunctional monomer, its amount used is not particularly limited. For instance, of the entire monomers used in preparing the polymer (PD), it can be 0.001% by weight or higher. From the standpoint of the ease of producing the PSA composition for forming the type-D layer B, etc., of the entire monomers used in preparing the polymer (PD), the amount of polyfunctional monomer used is usually suitably below 1.0% by weight, or preferably below 0.5% by weight. Polyfunctional monomers may not be used, either.

First Acrylic Polymer

The C=C-containing acrylic polymer can be a second polymer obtained by incorporating C=C bonds in a first acrylic polymer obtained by polymerizing monomers having a composition as described above.

The method for obtaining the first acrylic polymer having the monomer composition is not particularly limited. Various polymerization methods known as synthetic methods for acrylic polymers can be suitably employed, such as solution polymerization, emulsion polymerization, bulk polymerization and suspension polymerization. For instance, solution polymerization can be preferably employed. For the monomer supply method for solution polymerization, a suitable method can be employed among the all-at-once method where all the starting monomers are supplied in one portion, gradual supply method, portion-wise supply method, etc. The solvent for solution polymerization can be suitably selected among known or commonly used organic solvents such as toluene and ethyl acetate. The polymerization temperature can be suitably selected in accordance with the types of monomers, solvent and polymerization initiator used, etc. For instance, it can be about 20° C. to 120° C. (typically 40° C. to 80° C.).

In the polymerization, a known or commonly used photopolymerization initiator can be used in accordance with the polymerization method, polymerization conditions, etc. These polymerization initiators can be used solely as one species or in a combination of two or more species. The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but are not limited to, azo-based initiators such as 2,2'-azobisisobutyronitrile (AIBN), 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, 2,2'-azobis(N,N'-dimethyleneisobutylamidine), and 2,2'-azobis[N-(2-carboxyethyl)-2-methylpropionamidine] hydrate; persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; redox-based initiators such as the combination of a persulfate salt and sodium hydrogen sulfite, and the combination of a peroxide and sodium ascorbate. Favorable examples of the polymerization initiator include azo-based polymerization initiators.

The photopolymerization initiator can be used in a usual amount. For instance, it can be selected from the range of about 0.005 part to 1 part by weight (typically 0.01 part to 1 part by weight) to 100 parts by weight of the total monomer content.

In the polymerization, various kinds of heretofore known chain transfer agent can be used as necessary. For instance, one, two or more species can be used, selected among the various chain transfer agents exemplified as an optional component of the PSA composition for obtaining the type-B layer B. When using a chain transfer agent, its amount used can be selected to obtain a resultant having a desirable Mw and is not particularly limited. In typical, to 100 parts by weight of the monomers subjected to polymerization, for instance, it is suitably about 0.01 part to 1 part by weight, or preferably about 0.01 part to 0.2 part by weight. Chain transfer agents may not be used.

The glass transition temperature (Tg) of the first acrylic polymer is not particularly limited. From the standpoint of the PSA layer's surface conformity, the first acrylic polymer's Tg is usually suitably below 30° C., preferably below 20° C., possibly below 10° C., or even below 5° C. In some embodiments, the first acrylic polymer's Tg can be below 0° C., below −10° C., below −20° C., below −25° C., or even below −30° C. The first acrylic polymer's Tg is typically −80° C. or higher, for instance, possibly −70° C. or higher, −60° C. or higher, or even −55° C. or higher. From the standpoint of the photo-crosslinkable PSA's cohesion and post-photo-crosslinking deformation resistance (e.g. bond durability to adherends), in some embodiments, the first acrylic polymer's Tg is preferably −50° C. or higher, more preferably −45° C. or higher, possibly −40° C. or higher, −38° C. or higher, or even −35° C. or higher.

The method for incorporating C=C bonds in the first acrylic polymer is not particularly limited. For instance, it is preferable to employ a method where the first acrylic polymer having a functional group A incorporated by copolymerization is allowed to react with a compound having a C=C bond and a functional group B reactive towards the functional group A (i.e. a functional group B-containing unsaturated compound) without loss of the C=C bond. Examples of the combination of functional groups A and B include combinations of carboxy and epoxy groups, carboxy and aziridyl groups, and hydroxy and isocyanate groups. In particular, from the standpoint of the reaction traceability, the combination of hydroxy and isocyanate groups is preferable. From the standpoint of the polymer design, etc., in a particularly preferable combination, the first acrylic polymer has the hydroxy group and the compound has the isocyanate group.

The C=C-containing compound may have a functional group B reactive towards the functional group A as described above. Favorable examples of such a compound include the isocyanate group-containing monomers (isocyanate group-containing (N=C=O-containing) compounds) exemplified as copolymerizable monomers that can be used in polymerization of acrylic polymer. In particular, 2-(meth) acryloyloxyethyl isocyanate is more preferable. The isocyanate group in the C=C/N=C=O-containing compound reacts with a hydroxy group in the first acrylic polymer to form a bond (typically a urethane bond), favorably resulting in a C=C-containing acrylic polymer.

From the standpoint of the reactivity with the hydroxy group as the functional group A, the amount of isocyanate group-containing monomer used can be suitably selected in a range satisfying the molar ratio $M_A/M_B$. The amount of isocyanate group-containing monomer used to 100 parts by weight of the first acrylic polymer can be, for instance, 0.01 part by weight or higher, 0.05 part by weight or higher, 0.1 part by weight or higher, 0.2 part by weight or higher, or even 0.3 part by weight or higher. With increasing amount of the isocyanate group-containing used, the photo-crosslinking of the type-D layer B tends to bring about greater enhancement of deformation resistance. From the standpoint of the optical properties (increased transparency, reduced optical distortion, etc.) of the photo-crosslinked layer B, the amount of isocyanate group-containing monomer used to 100 parts by weight of the first acrylic polymer is usually suitably below 20 parts by weight, advantageously below 15 parts by weight, preferably below 10 parts by weight, or more preferably below 7 parts by weight. In some embodiments, the amount of isocyanate group-containing monomer used can be, for instance, below 5 parts by weight, below 3 parts by weight, below 2 parts by weight, or even below 1 part by weight.

Of all monomers forming the type-D layer B, the amount of isocyanate group-containing monomer used can be about 0.01% by weight or higher, 0.05% by weight or higher, 0.1% by weight or higher, 0.2% by weight or higher, or even 0.3% by weight or higher. Of all monomers forming the type-D layer B, the amount of isocyanate group-containing monomer used is suitably below 20% by weight, advantageously below 15% by weight, preferably below 10% by weight, or more preferably below 7% by weight. In some embodiments, the amount of isocyanate group-containing monomer used can be, for instance, below 5% by weight, below 3% by weight, below 2% by weight, or even below 1% by weight.

Crosslinking Agent

To the PSA composition, a known crosslinking agent can be added as necessary, such as an isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agent, hydrazine-based crosslinking agent and amine-based crosslinking agent. As the crosslinking agent, a peroxide can also be used. Among these crosslinking agents, solely one species or a combination of two or more species can be used. The photo-crosslinkable PSA formed from a PSA composition comprising a crosslinking agent preferably includes the crosslinking agent primarily in the crosslinked form. The use of crosslinking agent enables suitable adjustment of the cohesive strength of the photo-crosslinkable PSA, etc. In a water-dispersed PSA composition, it is preferable to use a water-soluble or water-dispersible crosslinking agent.

As the isocyanate-based crosslinking agent, a bifunctional or higher polyfunctional isocyanate compound can be used. Examples include aromatic isocyanates such as tolylene diisocyanate, xylene diisocyanate, polymethylene polyphenyl diisocyanate, tris (p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/ tolylene diisocyanate trimer adduct (trade name CORONATE L available from Tosoh Corporation), trimethylolpropane/hexamethylene diisocyanate trimer adduct (trade name CORONATE HL available from Tosoh Corporation), and isocyanurate of hexamethylene diisocyanate (trade name CORONATE HX available from Tosoh Corporation) and trimethylolpropane/xylylene diisocyanate adduct (product name TAKENATE D-110N available from Mitsui Chemicals, Inc.). In a water-dispersed PSA composition, it is preferable to use an isocyanate crosslinking agent that is soluble or dispersible in water. For instance, a water-soluble, water-dispersible or self-emulsifying isocyanate-based crosslinking agent can be preferably used. A so-called blocked-isocyanate-type of isocyanate crosslinking agent having a blocked isocyanate group can be preferably used.

As the epoxy-based crosslinking agent, a species having two or more epoxy groups per molecule can be used without particular limitations. A preferable epoxy-based crosslinking agent has 3 to 5 epoxy groups per molecule. Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercial epoxy-based crosslinking agents include product names TETRAD-X and TETRAD-C available from Mitsubishi Gas Chemical Co., Inc.; product name EPICLON CR-5L available from DIC Corp.; product name DENACOL EX-512 available from Nagase ChemteX Corporation; and product name TEPIC-G available from Nissan Chemical Industries, Ltd. In a water-dispersed PSA composition, it is preferable to use a water-soluble or water-dispersible epoxy-based crosslinking agent.

As the oxazoline-based crosslinking agent, a species having one or more oxazoline groups in one molecule can be used without particular limitations.

Examples of the aziridine-based crosslinking agent include trimethylolpropane tris[3-(1-aziridinyl)propionate] and trimethylolpropane tris[3-(1-(2-methyl) aziridinylpropionate)].

As the carbodiimide-based crosslinking agent, a low molecular weight compound or a high molecular weight compound having two or more carbodiimide groups can be used.

In some embodiments, a peroxide can also be used as the crosslinking agent. Examples of the peroxide include di(2-ethylhexyl) peroxydicarbonate, di(4-t-butylcyclohexyl) peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxyisobutyrate, and dibenzoyl peroxide. Among these, peroxides having particularly excellent crosslinking reaction efficiency include di(4-t-butylcyclohexyl) peroxydicarbonate, dilauroyl peroxide, and dibenzoyl peroxide. It is noted that when a peroxide is used as the polymerization initiator, the remaining peroxide unused in the polymerization reaction can be used for the crosslinking reaction. In this case, when the remaining peroxide is quantified and the proportion of peroxide is less than a prescribed amount, the peroxide can be added as necessary to obtain the prescribed amount. The peroxide can be quantified by the method described in Japanese Patent No. 4971517.

When using a crosslinking agent, its amount used (when using two or more kinds of crosslinking agents, their combined amount) is not particularly limited. From the standpoint of obtaining a PSA showing well-balanced adhesive properties such as adhesive strength and cohesive strength, the amount of crosslinking agent used to 100 parts by weight of the monomers forming the PSA composition is usually suitably about 5 parts by weight or lower, possibly 3 parts by weight or lower, 1 part by weight or lower, 0.50 part by weight or lower, 0.30 part by weight or lower, or even 0.20 part by weight or lower. The minimum amount of crosslinking agent used is not particularly limited as long as it is higher than 0 part by weight to 100 parts by weight of the monomers forming the PSA composition. In some embodiments, the amount of crosslinking agent used to 100 parts by weight of the monomers forming the PSA composition can be 0.001 part by weight or higher, 0.01 part by weight or higher, 0.05 part by weight or higher, or even 0.10 part by weight or higher.

Photoinitiator

The type-D layer B can include a photoinitiator for efficiently forming a crosslinked structure with C=C bonds by UV irradiation. As the photoinitiator, it is possible to use aforementioned ketal-based photoinitiator, acetophenone-based photoinitiator, benzoin ether-based photoinitiator, acylphosphine oxide-based photoinitiator, α-ketol-based photoinitiator, aromatic sulfonyl chloride-based photoinitiator, oxime ester-based photoinitiator, benzoin-based photoinitiator, benzyl-based photoinitiator, benzophenone-based photoinitiator, alkylphenone-based photoinitiator, thioxanthone-based photoinitiator, etc. For the photoinitiator, solely one species or a combination of two or more species can be used.

In some embodiments, as the photoinitiator included in the type-D layer B, it is preferable to use a species having a hydroxy group in the molecule. As such a hydroxy group-containing photoinitiator, a species having a hydroxy group can be preferably used among the aforementioned photoinitiators. Favorable examples include benzophenone derivatives, alkylphenone derivatives, and acetophenone derivatives.

Examples of benzophenone derivatives include o-acryloxybenzophenone, p-acryloxybenzophenone, o-methacryloxybenzophenone, p-methacryloxybenzophenone and p-(meth)acryloxyethoxybenzophenone. Benzophenone-4-carboxylic acid esters can also be used, such as 1,4-butanediol mono(meth)acrylate, 1,2-ethanediol mono(meth)acrylate and 1,8-octanediol mono(meth)acrylate. Examples of alkylphenone derivatives include 1-[4-(2-hydroxyethoxy)-phenyl]-2-hydroxy-2-methyl-1-propan-1-one and 2-hydroxy-1-{4-[4-(2-hydroxy-2-methyl-propionyl)-benzyl] phenyl}-2-methyl-propan-1-one. Examples of acetophenone derivatives include 1-hydroxycyclohexyl-phenyl-ketone. The photoinitiators can be used solely as one species or in a combination of two or more species. Among them, for their excellent curing rates and thick-film curability, 1-hydroxycyclohexyl-phenyl-ketone and 2-hydroxy-1-{4-[4-(2-hydroxy-2-methyl-propionyl)-benzyl]phenyl}-2-methyl-propan-1-one are preferable.

Favorable examples of alkylphenone-based photoinitiators include a benzylketal-based photoinitiator, hydroxyalkylphenone-based photoinitiator (typically α-hydroxyalkylphenone), hydroxyacetophenone-based photoinitiator (typically α-hydroxyacetophenone) and aminoalkylphenone-based photoinitiator (typically α-aminoalkylphenone). These can be used solely as one species or in a combination of two or more species. In particular, hydroxyalkylphenone-based photoinitiators and aminoalkylphenone-based photoinitiators are preferable. Specific examples of hydroxyalkylphenone-based photoinitiators include the aforementioned 2-hydroxy-1-{4-[4-(2-hydroxy-2-methyl-propionyl)-benzyl] phenyl}-2-methyl-propan-1-one. Specific examples of aminoalkylphenone-based photoinitiators include 2-benzyl-2-(dimethylamino)-1-(4-morpholinophenyl)-1-butanone.

Other preferable examples include acylphosphine oxide-based photoinitiators such as bis(2,4,6-trimethylbenzoyl) phenylphosphine oxide, bis(2,4,6-trimethylbenzoyl)-2,4-di-n-butoxyphenylphosphine oxide, 2,4,6-trimethylbenzoyldiphenylphosphine oxide and bis(2,6-dimethoxybenzoyl)-2,4,4-trimethylpentylphosphine oxide.

An oxime ester-based photoinitiator can also be preferably used, such as 1-[4-(phenylthio)phenyl]-1,2-octanedione 2-(o-benzoyloxime), 1-[9-ethyl-6-(2-methylbenzoyl)-9H-carbazole-3-yl] ethanone 1-(o-acetyloxime).

When the type-D layer B includes a photoinitiator, the amount of photoinitiator in the type-D layer B is not particularly limited and can be selected to suitably obtain desirable effects. In some embodiments, the photoinitiator content relative to 100 parts by weight of the type-D layer B-forming monomers is, for instance, possibly about 0.005 part by weight or higher, usually suitably 0.01 part by weight or higher, preferably 0.05 part by weight or higher, also possibly 0.10 part by weight or higher, 0.15 part by weight or higher, or even 0.20 part by weight or higher. With increasing photoinitiator content, the photocuring ability of the type-D layer B will increase. The photoinitiator content relative to 100 parts by weight of the type-D layer B-forming monomers is usually suitably 5 parts by weight or lower, preferably 2 parts by weight or lower, possibly 1 part by weight or lower, 0.7 part by weight or lower, or even 0.5 part by weight or lower. It is preferable that the photoinitiator content is not excessively high from the standpoint of the storage stability of the type-D layer B-containing PSA sheet (e.g. the ability to inhibit property changes associated with storage of the unused PSA sheet).

Radical Scavenger

From the standpoint of the storage stability, the type-D layer B may include a radical scavenger such as antioxidant. The radical scavenger is literally an agent serving to scavenge radicals in the PSA layer. Thus, before UV irradiation, it may inhibit addition of radicals to carbon-carbon double bonds in the type-D layer B. While the concept of radical scavenger disclosed herein may encompass anti-aging agent and photo-stabilizer, a typical example thereof is antioxidant. Examples of the antioxidant include various heretofore known antioxidants such as phenolic antioxidant, phosphorus-based (phosphite-based) antioxidant, sulfur-based antioxidant and amine-based antioxidant. For the antioxidant, solely one species or a combination of two or more species can be used.

The art disclosed herein can be implemented in an embodiment where the type-D layer B has a C=C-containing polymer (PD) and a photoinitiator. In this embodiment, from the standpoint of smoothly enhancing the deformation resistance by photo-crosslinking, it is preferable to limit the radical scavenger content of type-D layer B. The amount of radical scavenger (typically an antioxidant) in the type-D layer B is suitably about 3% by weight or lower, preferably about 1% by weight or less, more preferably about 0.5% by weight or less, or yet more preferably about 0.3% by weight or less (typically 0.1% by weight or less). The type-D layer B may be free of a radical scavenger (typically an antioxidant).

Other Optional Components

Where necessary, the PSA composition for forming the type-D layer B can include an aforementioned acrylic oligomer.

The PSA composition for forming the type-D layer B may include, as other optional components, various additives generally used in the field of PSA, such as tackifier resin, viscosity-adjusting agent (e.g. thickener), leveling agent, plasticizer, filler and colorant including pigment and dye. As for these various additives, heretofore known species can be used by typical methods.

(3) Shear Storage Modulus

In the PSA sheet disclosed herein, the photo-crosslinkable PSA forming the layer B of the PSA layer preferably has a shear storage modulus Ga' (kPa) higher than 1 kPa at 30° C. Hereinafter, the shear storage modulus Ga' may be referred to as "pre-photo-crosslinking room temperature (RT) modulus Ga'" or simply "RT modulus Ga'." From the standpoint of the cohesion of the photo-crosslinkable PSA or of the handing properties (e.g. ease of processing) of the PSA sheet having a PSA layer formed from the photo-crosslinkable PSA, etc., the RT modulus Ga' is preferably above 5 kPa, more preferably above 10 kPa, or possibly even above 15 kPa. From the standpoint of the conformity to the adherend surface structure, the RT modulus Ga' is usually suitably 500 kPa or lower, preferably 200 kPa or lower, or possibly even 100 kPa or lower. In some embodiments, the RT modulus Ga' can be below 50 kPa, or even below 30 kPa.

The RT modulus Ga' of the layer B-forming photo-crosslinkable PSA can be determined by dynamic viscoelastic analysis under the same conditions as for the pre-photo-crosslinking modulus Gb' described later in Examples. The RT modulus Ga' can be adjusted through the composition of the photo-crosslinkable PSA (e.g. in the type-B layer B, the BP equivalent and Mw of the polymer (PB), composition of polymer (PB)-forming monomers, the polymer (PB)'s weight fraction), etc.

The shear storage modulus at 80° C. of the photo-crosslinkable PSA forming the layer B of the PSA layer (i.e. the pre-photo-crosslinking modulus Gb') is not particularly limited. From the standpoint of the cohesion of photo-crosslinkable PSA and the handling properties (e.g. storability) of a PSA sheet having the photo-crosslinkable PSA, etc., the modulus Gb' is usually suitably above 3 kPa, preferably above 5 kPa, more preferably above 10 kPa, or possibly even above 15 kPa. In some embodiments, from the standpoint of the ease of processing the PSA sheet having the photo-crosslinkable PSA, etc., the modulus Gb' can be above 30 kPa, above 40 kPa, above 50 kPa, or even above 52 kPa. The PSA having such a modulus Gb' can be preferably used, for instance, as a PSA layer formed from the photo-crosslinkable PSA and having a thickness above 50 μm (above 70 μm or above 90 μm) or as a component of a PSA sheet having the PSA layer.

The modulus Gb' can be determined by the method described later in Examples. The modulus Gb' can be adjusted through the composition of the photo-crosslinkable PSA (e.g. in the type-B layer B, the BP equivalent and Mw of the polymer (PB), composition of polymer (PB)-forming monomers, the polymer (PB)'s weight fraction), etc.

No particular limitations are imposed on the 80° C. shear storage modulus Gc' (kPa) (i.e. post-photo-curing modulus GC) of the photo-crosslinked product obtained by UV-irradiating the photo-crosslinkable PSA using a high-pressure mercury lamp. From the standpoint of reducing cohesive failure of the joint formed of the photo-crosslinked product, the modulus Gc' is usually advantageously 15 kPa or higher, or preferably 25 kPa or higher. From the standpoint of increasing the bond durability to adherends (especially, e.g. highly outgassing adherends such as a polarizing plate), the modulus Gc' is advantageously 30 kPa or higher, preferably 35 kPa or higher, or more preferably 40 kPa or higher. In some embodiments, the modulus Gc' can be 45 kPa or higher, 50 kPa or higher, 55 kPa or higher, or even 60 kPa or higher. The modulus Gc' can be, for instance, 200 kPa or lower, 150 kPa or lower, or even 120 kPa or lower. From the standpoint of combining well-balanced bond durability to adherends and other properties (e.g. peel strength), the modulus Gc' is advantageously 100 kPa or lower, preferably 80 kPa or lower, possibly 70 kPa or lower, or even 65 kPa or lower. As for the photo-crosslinked product formed by photo-crosslinking following lamination of the photo-crosslinkable PSA on an adherend, with decreasing modulus Gc', the peel strength to the adherend tends to generally increase. In some embodiments, the modulus Gc' can be below 60 kPa, below 55 kPa, below 50 kPa, or even below 45 kPa.

More specifically, the modulus Gc' can be determined by the method described later in Examples. The modulus Gc' can be adjusted through the composition of the photo-crosslinkable PSA (e.g. in the type-B layer B, the BP equivalent and Mw of the polymer (PB), composition of polymer (PB)-forming monomers, the polymer (PB)'s weight fraction), etc.

No particular limitations are imposed on the relationship between the modulus Gb' of the layer B-forming photo-crosslinkable PSA and the modulus Gc' of the photo-crosslinked product. In typical, Gc' (kPa)−Gb' (kPa)>0 (kPa) is satisfied. ΔG' is, for instance, possibly 3 kPa or greater, preferably 5 kPa or greater, or more preferably 8 kPa or greater. The photo-crosslinkable PSA having ΔG' of 8 kPa or greater is likely to suitably bring about the deformation resistance-enhancing effect by photo-crosslinking. From the standpoint of obtaining greater effect of photo-crosslinking, in some embodiments, ΔG' can be 10 kPa or greater, 15 kPa or greater, 20 kPa or greater, 25 kPa or greater, or even 30 kPa or greater. The maximum ΔG' is not particularly limited. From the standpoint of combining well-balanced surface conformity at time of application to adherends and post-photo-crosslinking deformation resistance, ΔG' is usually suitably 150 kPa or less, preferably 100 kPa or less, 80 kPa or less, 65 kPa or less, 50 kPa or less, 40 kPa or less.

(4) Ratio of Polyfunctional Monomer

In some embodiments of the art disclosed herein, the layer B preferably comprises 40 μmol or less of a polyfunctional monomer having two or more ethylenically unsaturated groups (e.g. a polyfunctional monomer having a chemical formula-based molecular weight (formula weight) in the range of 150 to 1000 or preferably 200 to 700) per gram of layer B. In other words, the polyfunctional monomer content of layer B is preferably 40 μmol/g or less.

Polyfunctional monomers generally have higher mobility as compared with photo-crosslinkable polymers. Thus, in a multilayer PSA layer including layers A and B, when the layer B includes a polyfunctional monomer, between formation of the multilayer PSA layer and photo-crosslinking of the layer B, some of the polyfunctional monomer may migrate from the layer B to the outside (e.g. into the layer A, or further through the layer A to the surface thereof). This may cause a decline in storage stability of the PSA sheet.

In the art disclosed herein, because the layer B includes a photo-crosslinkable polymer, even when the polyfunctional monomer content of layer B is limited, the effect (e.g. enhancement of deformation resistance) of photo-crosslinking of layer B can be suitably obtained. It is preferable to limit the polyfunctional monomer content of layer B also from the standpoint of reducing the odor of the layer B-containing PSA layer (even of a PSA sheet comprising the PSA layer).

The polyfunctional monomer content of layer B refers to the amount of polyfunctional monomer in the layer B, with its ethylenically unsaturated group unreacted (typically not chemically bonded to other layer B components). Thus, the polyfunctional monomer after the ethylenically unsaturated group has reacted (the polyfunctional monomer residue already forming a crosslinked structure) is excluded from the polyfunctional monomer content of layer B, here.

In some embodiments, the polyfunctional monomer content of layer B is preferably 30 μmol/g or lower, more preferably 20 μmol/g or lower, yet more preferably 10 μmol/g, or possibly even 5 μmol/g or lower. The layer B according to a preferable embodiment is free of a polyfunctional monomer. The polyfunctional monomer-free layer B should be just free of a polyfunctional monomer having an unreacted ethylenically unsaturated group. The layer B may include a polyfunctional monomer residue already forming a crosslinked structure.

(5) Ratio of Hydrophilic Monomer

In some embodiments, in the layer B-forming monomers, the ratio of hydrophilic monomer is preferably set to a suitable range. The "hydrophilic monomer" here refers to a carboxy group-containing monomer, an acid anhydride group-containing monomer, a hydroxy group-containing monomer, an N-containing monomer (typically an amide group-containing monomer such as (meth)acrylamide, a monomer having a N-containing ring) or an alkoxy group-containing monomer (typically an alkoxyalkyl (meth)acrylate or an alkoxypolyalkylene glycol (meth)acrylate).

Of the entire monomers forming the layer B, the hydrophilic monomer content is, for instance, possibly 45% by weight or lower, usually preferably 40% by weight or lower, or possibly even 35% by weight or lower. From the standpoint of reducing the water absorption and enhancing the water resistance of the PSA layer, the hydrophilic monomer is preferably not used in excess in the layer B.

On the other hand, in view of the adhesion to a layer (e.g. layer A) adjacent to the layer B, it may be advantageous that the layer B comprises some hydrophilic monomer. The hydrophilic monomer content in the entire monomers forming the layer B can be, for instance, 1% by weight or lower. In some embodiments, the hydrophilic monomer content is preferably 2% by weight or higher, more preferably 5% by weight or higher, possibly 10% by weight or higher, or even 15% by weight or higher. In an embodiment where the layer B is placed in direct contact with a layer A formed from an aqueous PSA composition (e.g. a water-dispersed PSA composition), when directly applying an aqueous layer A-forming PSA composition to the layer B surface, it is preferable that the layer B comprises some hydrophilic monomer in view of facilitating application (e.g. reducing uneven application such as repelling and balding of the aqueous PSA composition, etc.). Especially, in an embodiment where the layer A has a relatively small thickness (e.g. less than 10 μm), the layer B preferably has some hydrophilic monomer content (e.g. 2% by weight or higher).

Layer A

In the art disclosed herein, the layer A forming the first surface of the PSA layer may be, for instance, a PSA layer formed comprising one, two or more species of PSA selected among various kinds of PSA such as acrylic PSA, rubber-based PSA (based on natural rubber, synthetic rubber, a mixture of these, etc.), silicone-based PSA, polyester-based PSA, urethane-based PSA, polyether-based PSA, polyamide-based PSA, and fluorine-based PSA. Here, the acrylic PSA refers to a PSA whose primary component is an acrylic polymer. The same applies to the rubber-based PSA and other PSA.

Acrylic PSA

From the standpoint of the transparency, weatherability, etc., in some embodiments, as the material forming the layer A, acrylic PSA can be preferably used.

For instance, a preferable acrylic PSA comprises an acrylic polymer formed from monomers including more than 50% by weight alkyl (meth)acrylate (preferably $C_{1-20}$ alkyl (meth)acrylate) as base polymer. For easy balancing of properties, the ratio of $C_{1-20}$ alkyl (meth)acrylate in the entire monomers (all monomers) can be, for instance, 55% by weight or higher, 60% by weight or higher, or even 70% by weight or higher. For the same reason, of the entire monomers, the ratio of $C_{1-20}$ alkyl (meth)acrylate can be, for instance, 99.9% by weight or less, 99.5% by weight or less, or even 99% by weight or less.

The alkyl (meth)acrylate can be selected among the examples of the (meth)acrylate usable as a monomer forming the polymer (PB). Particularly preferable alkyl (meth) acrylates include n-butyl acrylate (BA), 2-ethylhexyl acrylate (2EHA) and isononyl acrylate. Other specific examples of alkyl (meth)acrylates that can be preferably used include n-butyl methacrylate (BMA), 2-ethylhexyl methacrylate (2EHMA) and isostearyl acrylate (iSTA). As the alkyl (meth)acrylate, solely one species or a combination of two or more species can be used.

In some embodiments, the layer-A-forming monomers may include 40% (by weight) or more $C_{4-18}$ alkyl (meth) acrylate. According to such monomers including a relatively large amount of alkyl (meth)acrylate having an alkyl group with 4 or more carbon atoms at the ester terminus, a highly lipophilic acrylic polymer tends to be formed. The highly lipophilic acrylic polymer is likely to inhibit water absorption of layer A. The ratio of $C_{4-18}$ alkyl (meth)acrylate in the monomers can be, for instance, 60% by weight or higher, 70% by weight or higher, 75% by weight or higher, or even 80% by weight or higher. The monomers may include a $C_{6-18}$ alkyl (meth)acrylate up to an aforementioned minimum value (percentage).

From the standpoint of enhancing the cohesion of layer A to prevent cohesive failure, the ratio of $C_{4-18}$ alkyl (meth) acrylate in the monomers is suitably 99.5% by weight or lower, possibly 99% by weight or lower, 98% by weight or lower, or even 97% by weight or lower. From the standpoint of enhancing the cohesion of layer A, in some embodiments, the ratio of $C_{4-18}$ alkyl (meth)acrylate in the monomers is 95% by weight or lower, for instance, suitably 90% by weight or lower. In other embodiments, the ratio of $C_{4-18}$ alkyl (meth)acrylate in the monomers can be 85% by weight or lower, or even 75% by weight or lower. The monomers may include $C_{6-18}$ alkyl (meth)acrylate(s) up to an upper limit shown above.

Along with the alkyl (meth)acrylate, the layer A-forming monomers may include, as necessary, other monomer(s) (copolymerizable monomer(s)) that can be copolymerized with the alkyl (meth)acrylate. It is possible to use one, two or more species selected among those exemplified as species usable as the polymer (PB)-forming monomers.

When using such a copolymerizable monomer, its amount used is not particularly limited. It is suitably 0.01% by weight or more of the entire monomers forming the layer A. From the standpoint of better obtaining the effect of use of copolymerizable monomer, the amount of copolymerizable monomer used can be 0.1% by weight or more of the entire monomers, or even 0.5% by weight or more. From the standpoint of readily balancing the adhesive properties, the amount of copolymerizable monomer used is suitably 50% by weight or less of the entire monomers, or preferably 40% by weight or less.

In some embodiments, the layer A-forming monomers may include a N-containing monomer as the copolymerizable monomer. The use of N-containing monomer can increase the PSA's cohesive strength and preferably increase the post-crosslinking peel strength. One favorable example of the N-containing monomer is a N-hetero-ring-containing monomer. As the N-hetero-ring-containing monomer, it is possible to use the examples listed above as usable materials in preparing the polymer (PB). For instance, a N-vinyl cyclic amide represented by the formula (1) can be used. In particular, N-vinyl-2-pyrrolidone is preferable.

The amount of N-containing monomer (preferably a N-hetero-ring-containing monomer) used is not particularly limited. For instance, of the entire monomers forming the layer A, it can be 1% by weight or higher, 3% by weight or higher, even 5% by weight or higher, or 7% by weight or higher. In some embodiments, from the standpoint of increasing the adhesive strength, of the entire monomers, the amount of N-containing monomer used can be 10% by weight or higher, 15% by weight or higher, or even 20% by weight or higher. Of the entire monomers, the amount of N-containing monomer used is, for instance, suitably 40% by weight or lower, possibly 35% by weight or lower, 30% by weight or lower, or even 25% by weight or lower. In other embodiments, of the entire monomers, the amount of N-containing monomer used can be, for instance, 20% by weight or lower, or even 15% by weight or lower.

In some embodiments, the monomers used preferably include a carboxy group-containing monomer. Favorable examples of the carboxy group-containing monomer include acrylic acid (AA) and methacrylic acid (MAA). AA and MAA can be used together. When using both AA and MAA, their weight ratio (AA/MAA) is not particularly limited. For instance, it may range between about 0.1 and 10. In some embodiments, the weight ratio (AA/MAA) can be, for instance, about 0.3 or higher, or even about 0.5 or higher. The weight ratio (AA/MAA) can be, for instance, about 4 or lower, or even about 3 or lower.

The use of carboxy group-containing monomer helps quickly wet the layer A surface with an aqueous liquid such as water. This can help reduce the peel strength N2. The amount of carboxy group-containing monomer used can be, for instance, 0.05% by weight or more of the entire monomers, 0.1% by weight or more, 0.3% by weight or more, 0.5% by weight or more, or even 0.8% by weight or more. The ratio of carboxy group-containing monomer can be, for instance, 15% by weight or less, 10% by weight or less, 5% by weight or less, 4.5% by weight or less, 3.5% by weight or less, 3.0% by weight or less, or even 2.5% by weight or less. It is preferable that the carboxy group-containing monomer is not used excessively from the standpoint of preventing the water used in determining the peel strength N2 from being absorbed in the layer A resulting in a shortage of the water during the peeling.

In some embodiments, the monomers may include a hydroxy group-containing monomer. With the use of hydroxy group-containing monomer, the layer A's cohesive strength and crosslink density can be adjusted and the peel strength N0 can be increased. When using a hydroxy group-containing monomer, its amount used is not particularly limited. Of the entire monomers, it can be, for instance, 0.01% by weight or more, 0.1% by weight or more, 0.5% by weight or more, 1% by weight or more, 5% by weight or more, or even 10% by weight or more. From the standpoint of inhibiting excessive water diffusion into the layer A's bulk, in some embodiments, the amount of hydroxy group-containing monomer used is, for instance, suitably 40% by weight or less of the entire monomers; it can be 30% by weight or less, 20% by weight or less, 10% by weight or less, 5% by weight or less, or even 3% by weight or less. The art disclosed herein can be favorably implemented in an embodiment using essentially no hydroxy group-containing monomer as the monomer(s) for the layer A.

In some embodiments, the monomers may include an alkoxysilyl group-containing monomer. The alkoxysilyl group-containing monomer is an ethylenically unsaturated compound having at least one (preferably two or more, e.g. two or three) alkoxysilyl group per molecule. Specific examples thereof are as mentioned earlier. For the alkoxysilyl group-containing monomer, solely one species or a combination of two or more species can be used. With the use of alkoxysilyl group-containing monomer, a crosslinked structure can be introduced in the PSA layer (layer A) upon condensation reaction of the silanol group (silanol condensation). It is noted that the alkoxysilyl group-containing monomer can also be thought as the silane coupling agent described later.

In an embodiment where the layer-A-forming monomers include an alkoxysilyl group-containing monomer, the ratio of the alkoxysilyl group-containing monomer in the entire monomers can be, for instance, 0.005% by weight or higher; it is suitably 0.01% by weight or higher. From the standpoint of enhancing the tightness of adhesion to adherend, the ratio of the alkoxysilyl group-containing monomer can be, for instance, 0.5% by weight or less, 0.1% by weight or less, or even 0.05% by weight or less.

In some preferable embodiments, from the standpoint of inhibiting gelation, in the layer-A-forming monomers, the combined amount of alkoxyalkyl (meth)acrylate and alkoxypolyalkylene (meth)acrylate is limited to below 20% by weight. The combined amount of alkoxyalkyl (meth) acrylate and alkoxypolyalkylene (meth)acrylate is more preferably below 10% by weight, yet more preferably below 3% by weight, or particularly preferably below 1% by weight. In some embodiments, the monomers are essentially free of alkoxyalkyl (meth)acrylates and alkoxypolyalkylene (meth)acrylates (0 to 0.3% content by weight).

Likewise, the monomers forming the acrylic polymer in the layer A may include less than 20% (by weight) alkoxy group-containing monomer or may be essentially free thereof. The amount of alkoxy group-containing monomer in the monomers is preferably below 10% by weight, more preferably below 3% by weight, or yet more preferably below 1% by weight. In a particularly preferable embodiment, the monomers forming the acrylic polymer are essentially free of alkoxy group-containing monomers (0 to 0.3% content by weight).

In some preferable embodiments, in the layer-A-forming monomers, the ratio of hydrophilic monomers (i.e. carboxy group-containing monomer, acid anhydride group-containing monomer, hydroxy group-containing monomer, N-containing monomer and alkoxy group-containing monomer) is set in a suitable range. This can preferably bring about water-peeling properties. In this embodiment, the hydrophilic monomer content in the monomers of the acrylic polymer is suitably 40% by weight or less (e.g. 35% by weight or less), preferably 32% by weight or less, for instance, possibly 30% by weight or less, or even 28% by weight or less. While no particular limitations are imposed, of the layer-A-forming monomers, the hydrophilic monomer content can be 1% by weight or greater, 10% by weight or greater, or even 20% by weight or greater.

In some embodiments, the layer-A-forming monomers may include an alicyclic hydrocarbon group-containing (meth)acrylate. This can increase the PSA's cohesive strength and the post-photo-curing peel strength. As the alicyclic hydrocarbon group-containing (meth)acrylate, the aforementioned examples and the like can be used. For instance, cyclohexyl acrylate and isobornyl acrylate can be preferably used. When using an alicyclic hydrocarbon group-containing (meth)acrylate, its amount used is not particularly limited. For instance, of the entire monomers, it can be 1% by weight or greater, 3% by weight or greater, or 5% by weight or greater. In some embodiments, the amount of alicyclic hydrocarbon group-containing (meth)acrylate used can be 10% by weight or more, or even 15% by weight or more of the entire monomers. The maximum amount of alicyclic hydrocarbon group-containing (meth)acrylate used is suitably about 40% by weight or less, for instance, possibly 30% by weight or less, or also 25% by weight or less (e.g. 15% by weight or less, or even 10% by weight or less).

The composition of layer-A-forming monomers can be selected so that glass transition temperature (Tg) determined by the aforementioned Fox equation based on the monomer composition is about −75° C. or higher and −10° C. or lower. In some embodiments, the Tg of the polymer (e.g. acrylic polymer, typically an acrylic polymer) is suitably −20° C. or lower, preferably −30° C. or lower, more preferably −40° C. or lower, or yet more preferably −50° C. or lower, for instance, possibly −55° C. or lower. With decreasing Tg of the polymer, the tightness of adhesion to the substrate layer and the adhesion to the adherend generally tend to improve. The layer A tightly adhered to the substrate layer is likely to inhibit penetration of water into the interface between the substrate layer and the layer A when the PSA layer is not to be peeled. This can be advantageous from the standpoint of increasing the water resistance of the PSA sheet. From the standpoint of readily increasing the peel strength N0, the polymer's Tg can be, for instance, −70° C. or higher, or even −65° C. or higher. In other embodiments, the Tg can be, for instance, −60° C. or higher, −50° C. or higher, −45° C. or higher, or even −40° C. or higher.

While no particular limitations are imposed, the polymer (e.g. acrylic polymer, typically an acrylic polymer) in the layer A of the PSA sheet disclosed herein preferably has an SP value of 23.0 $(MJ/m^3)^{1/2}$ or lower. When a hydrophilicity enhancer described later is included, the PSA comprising a polymer having such an SP value may preferably obtain sufficient adhesive strength and excellent water-peeling properties. The SP value is more preferably 21.0 $(MJ/m^3)^{1/2}$ or lower (e.g. 20.0 $(MJ/m^3)^{1/2}$ or lower). The minimum SP value is not particularly limited. For instance, it is possibly about 10.0 $(MJ/m^3)^{1/2}$ or higher, suitably about 15.0 $(MJ/m^3)^{1/2}$ or higher, or preferably 18.0 $(MJ/m^3)^{1/2}$ or higher.

The SP value of the polymer can be determined according to the calculation method by Fedors (reference: POLYMER ENG. & SCI., vol. 14, issue 2 (1974), pp 148-154), that is, the equation:

$$SP\ value\ \delta = (\Sigma \Delta e / \Sigma \Delta v)^{1/2}$$

(In the equation, Δe is the vaporization energy of each atom or an atomic group at 25° C. and Δv is the molar volume of the atom or the atomic group at the same temperature)

The polymer having such an SP value can be obtained by suitably deciding on a monomer composition based on common technical knowledge of a skilled person.

The layer A in the PSA sheet disclosed herein can be formed using a PSA composition (or "PSA composition A" hereinafter) that includes monomers having an aforementioned composition in a polymer form, in a non-polymerized form (i.e. a form where polymerizable functional groups are unreacted), or as a mixture of these. The PSA composition A may exist in various forms such as a water-dispersed PSA composition, solvent-based PSA composition, active energy ray-curable PSA composition and hot-melt PSA composition.

In the polymerization, a known or commonly used thermal polymerization initiator or photopolymerization initiator can be used in accordance with the polymerization method and polymerization conditions. These polymerization initiators can be used solely as one species or in a combination of two or more species.

As the thermal polymerization initiator, it is possible to use the azo-based polymerization initiators, peroxide-based polymerization initiators, a redox-based polymerization initiators by combination of a peroxide and a reducing agent, substituted ethane-based polymerization initiators and the like exemplified as polymerization initiators usable in the polymerization to obtain the first acrylic polymer regarding the polymer (PD). In particular, azo-based polymerization initiators are preferable. Thermal polymerization can be preferably carried out at a temperature of, for instance, about 20° C. to 100° C. (typically 40° C. to 80° C.).

The photopolymerization initiator is not particularly limited. It is possible to use the examples of the photoinitiator possibly included in the type-D layer B, such as ketal-based photoinitiators, acetophenone-based photoinitiators, benzoin ether-based photoinitiators, acylphosphine oxide-based photoinitiators, α-ketol photoinitiators, aromatic sulphonyl chloride-based photoinitiators, photoactive oxime-based photoinitiators, benzoin-based photoinitiators, benzylic photoinitiators, benzophenone-based photoinitiators, and thioxanthone-based photoinitiators.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. For instance, one, two or more species can be used, selected among the various chain transfer agent exemplified as an optional component of the PSA composition that can be used for forming the type-B layer B. When using a chain transfer agent, its amount used is not particularly limited and can be selected to obtain a resultant having a desirable Mw. In typical, to 100 parts by weight of monomers to be polymerized, it is suitably, for instance, about 0.01 part to 1 part by weight, or more preferably about 0.01 part to 0.2 part by weight. Chain transfer agents may not be used, either.

The molecular weight of the polymer (e.g. acrylic polymer, typically an acrylic polymer) obtained by suitably employing the aforementioned various polymerization methods is not particularly limited and can be selected in a range suited for required properties. The polymer may suitably have a weight average molecular weight (Mw) of about $10 \times 10^4$ or higher. From the standpoint of combining well-balanced cohesive strength and adhesive strength, it is preferably above $30 \times 10^4$. From the standpoint of obtaining good bonding reliability even in a high temperature environment, the polymer according to some embodiments preferably has a Mw of $40 \times 10^4$ or higher (typically about $50 \times 10^4$ or higher, e.g. about $55 \times 10^4$ or higher). The maximum Mw of the polymer can be about $500 \times 10^4$ or lower (e.g. about $150 \times 10^4$ or lower). The Mw can also be about $75 \times 10^4$ or lower.

The PSA sheet according to some embodiments has a layer A formed from a water-dispersed PSA composition. Typical examples of the water-dispersed PSA composition include an emulsion-based PSA composition. The emulsion-based PSA composition typically comprises a polymerization product of monomers and an additive used as necessary.

Emulsion polymerization of the monomers is usually carried out in the presence of an emulsifier. The emulsifier used in the emulsion polymerization is not particularly limited; known anionic emulsifiers, nonionic emulsifiers and the like can be used. These emulsifiers can be used singly as one species or in a combination of two or more species.

Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of enhancing the water resistance or increasing the transparency of the PSA layer (layer A), in some embodiments, the amount of emulsifier used is suitably 10 parts by weight or less to 100 parts by weight of the monomers, preferably 5 parts by weight or less, or possibly even 3 parts by weight or less. It is noted that the emulsifier used here for emulsion polymerization can also serve as a hydrophilicity enhance in the layer A.

By emulsion polymerization, a polymerization reaction mixture is obtained as an emulsion in which the polymerization product (polymer) of the monomers is dispersed in water. The water-dispersed PSA composition used for forming the layer A can be preferably produced using the polymerization reaction mixture.

In some preferable embodiments, the layer A may be formed from a solvent-based PSA composition. This can be advantageous from the standpoint of the PSA layer's water resistance and optical properties. The solvent-based PSA composition typically includes a solution polymerization product of the monomers as well as additives used as necessary. The solvent (polymerization solvent) used for the solution polymerization can be suitably selected among heretofore known organic solvents. For instance, it is possible to use one species of solvent or a mixture of two or more solvents, selected among aromatic compounds (typically aromatic hydrocarbons) such as toluene; esters such as ethyl acetate and butyl acetate; aliphatic or alicyclic hydrocarbons such as hexane and cyclohexane; halogenated alkanes such as 1,2-dichloroethane; lower alcohols such as isopropanol (e.g. monohydric alcohols having 1 to 4 carbon atoms); ethers such as tert-butyl methyl ether; and ketones such as methyl ethyl ketone. Solution polymerization gives the polymerization reaction mixture in a form where the polymerization product of the monomers is dissolved in a polymerization solvent. The solvent-based PSA composition used for forming the layer A can be preferably produced using the polymerization reaction mixture.

In some preferable embodiments, the layer A may be formed from an active energy ray-curable PSA composition. A favorable example of the active energy ray-curable PSA composition is a photocurable PSA composition. The photocurable PSA composition has an advantage of being able to easily form even a thick PSA layer. In particular, a UV ray-curable PSA composition is preferable. It is advantageous to use a photo-curable PSA in view of optical properties as well.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV ray, etc. (typically in the presence of a photoinitiator); radioactive ray polymerization carried out by irradiating radioactive rays such as β rays, γ rays, etc.; and the like. In particular, photopolymerization is preferable.

The photocurable PSA composition according to a preferable embodiment comprises a partial polymer (partial polymerization product) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less, or preferably about 60% by weight or less. From the standpoint of the ease of preparing the PSA composition containing the partial polymer, the ease of coating, etc., the monomer conversion is suitably about 50% by weight or less, or preferably about 40% by weight or less (e.g. about 35% by weight or less). The minimum monomer conversion is not particularly limited. It is typically about 1% by weight or greater, or suitably about 5% by weight or greater.

The PSA composition containing a partial polymer of the monomers can be obtained by partially polymerizing a monomer mixture containing the entire amount of the monomers used for preparing the PSA composition by a suitable polymerization method (e.g. a photopolymerization method). The PSA composition containing a partial polymer of the monomers can be a mixture of a partially or fully polymerized product of a part of the monomers used for preparing the PSA composition, and remaining monomers or a partial polymer thereof. As used herein, the "fully polymerized product" indicates that the monomer conversion is above 95% by weight.

In the partial polymer-containing PSA composition, other components (e.g. photoinitiator, polyfunctional monomer, crosslinking agent, hydrophilicity enhancer, etc.) used as necessary can be added. The method of adding such other components is not particularly limited. For instance, it can be included in the monomer mixture in advance or added to the partial polymer as well.

Crosslinking Agent

In the layer A, a crosslinking agent can be used as necessary. In other words, the PSA composition for forming the layer A may include a crosslinking agent as necessary. The crosslinking agent is included in the layer A, typically in a crosslinked form. The layer A formed from a crosslinking agent-containing PSA composition typically includes a polymer (e.g. an acrylic polymer) crosslinked by the crosslinking agent. For instance, the layer A can be a PSA layer comprising an acrylic polymer crosslinked by a crosslinking agent. The use of crosslinking agent allows suitable adjustment of the layer A's cohesive strength.

The type of crosslinking agent is not particularly limited. Among heretofore known crosslinking agents, it can be selected in accordance with, for instance, the composition of the PSA composition so that the crosslinking agent produces suitable crosslinking function in the resulting PSA layer. Examples of usable crosslinking agents include an isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agent, hydrazine-based crosslinking agent and amine-based crosslinking agent. As the crosslinking agent, a peroxide can also be used. Among these crosslinking agents, solely one species or a combination of two or more species can be used.

Specific examples of the crosslinking agent usable in the PSA composition for forming the layer A are generally the same as the aforementioned specific examples of the crosslinking agent usable in the PSA composition for forming the type-D layer B. Thus, redundant details are omitted. In a water-dispersed PSA composition, it is preferable to use a water-soluble or water-dispersible crosslinking agent.

To allow an aforementioned crosslinking reaction to proceed effectively, a crosslinking catalyst may be used. Examples of the crosslinking catalyst include metal-based crosslinking catalysts such as tetra-n-butyl titanate, tetraisopropyl titanate, ferric acetylacetonate, butyltin oxide, and dioctyltin dilaurate. In particular, a tin-based crosslinking catalyst such as dioctyltin dilaurate is preferable. The amount of crosslinking catalyst used is not particularly limited. To 100 parts by weight of the monomers (e.g. monomers of acrylic polymer) in the PSA composition A, the amount of crosslinking catalyst used can be, for instance, about 0.0001 part or greater by weight, about 0.001 part or greater by weight, or about 0.005 part by weight or greater by weight; and about 1 part by weight or less, about 0.1 part by weight or less, about 0.05 part by weight or less, etc.

When desired, the PSA composition used for forming the layer A can include, as a crosslinking retarder, a compound that exhibits keto-enol tautomerism. For instance, in a PSA composition including an isocyanate-based crosslinking agent or a PSA composition usable upon addition of isocyanate-based crosslinking agent, it is preferable to use a compound that exhibits keto-enol tautomerism. This can bring about the effect of extending a pot life of the PSA composition.

As the compound exhibiting keto-enol tautomerism, various β-dicarbonyl compounds can be used. Specific examples include β-diketones such as acetylacetone and 2,4-hexanedione; acetoacetates such as methyl acetoacetate and ethyl acetoacetate; propionylacetates such as ethyl propionylacetate; isobutyrylacetates such as ethyl isobutyrylacetate; and malonates such as methyl malonate and ethyl malonate. Particularly favorable compounds include acetylacetone and acetoacetates. For the keto-enol tautomerizing compound, solely one species or a combination of two or more species can be used.

The amount of the keto-enol tautomerizing compound used to 100 parts by weight of the monomers (e.g. monomers of acrylic polymer) in the PSA composition is, for instance, possibly 0.1 part by weight or greater and 20 parts by weight or less, suitably 0.5 part by weight or greater and 15 parts by weight or less, for instance, possibly 1 part by weight or greater and 10 parts by weight or less, or even 1 part by weight or greater and 5 parts by weight or less.

Hydrophilicity Enhancer

When desirable, the layer A in the art disclosed herein can include a hydrophilicity enhancer. With the layer A including the hydrophilicity enhancer, the peel strength can be effectively reduced, using an aqueous liquid such as water. While reasons for this are not limited to particular interpretation, it is presumed that in general, the hydrophilic enhancer is likely to be unevenly distributed on the layer A surface due to the presence of a hydrophilic region; and this effectively increase the hydrophilicity of the layer A surface, thereby effectively reducing the peel strength when the layer A comes in contact with water.

As the hydrophilicity enhancer, in view of facile preparation of the PSA composition, etc., it is preferable to use a species that is liquid at room temperature (about 25° C.). These hydrophilicity enhancers can be used solely as one species or in a combination of two or more species.

In some embodiments, as the hydrophilicity enhancer, at least one species of compound A can be used, selected between a surfactant and a compound having a polyoxyalkylene backbone. As the surfactant and the compound having a polyoxyalkylene backbone, one, two or more species can be used among known surfactants and compounds having polyoxyalkylene backbones without particular limitations. It is needless to say that among the surfactants, there are compounds having polyoxyalkylene backbones, and the reverse is true as well.

As for the surfactant possibly used as the compound A, known nonionic surfactant, anionic surfactant, cationic surfactant and the like can be used. Among them, nonionic surfactant is preferable. As the surfactant, solely one species or a combination of two or more species can be used.

Examples of the nonionic surfactant include polyoxyethylene alkyl ethers such as polyoxyethylene lauryl ether, polyoxyethylene cetyl ether, polyoxyethylene stearyl ether and polyoxyethylene oleyl ether; polyoxyethylene alkyl phenyl ethers such as polyoxyethylene octyl phenyl ether and polyoxyethylene nonyl phenyl ether; sorbitan fatty acid esters such as sorbitan monolaurate, sorbitan monopalmitate, sorbitan monostearate and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate and polyoxyethylene sorbitan trioleate; polyoxyethylene glyceryl ether fatty acid esters; and polyoxyethylene-polyoxypropylene block polymers. Among these nonionic surfactants, solely one species or a combination of two or more species can be used.

Examples of the anionic surfactant include alkyl benzene sulfonates such as nonyl benzene sulfonate and dodecyl benzene sulfonate (e.g. sodium dodecyl benzene sulfonate); alkyl sulfates such as lauryl sulfate (e.g. sodium lauryl sulfate, ammonium lauryl sulfate) and octadecyl sulfate; fatty acid salts; polyether sulfates including polyoxyethylene alkyl ether sulfates (e.g. sodium polyoxyethylene alkyl ether sulfate) such as polyoxyethylene octadecyl ether sulfate and polyoxyethylene lauryl ether sulfate, polyoxyethylene alkyl phenyl ether sulfates (e.g. ammonium polyoxyethylene alkyl phenyl ether sulfate, sodium polyoxyethylene alkyl phenyl ether sulfate) such as polyoxyethylene lauryl phenyl ether sulfate, and polyoxyethylene styrenated phenyl ether sulfate; polyoxyethylene alkyl ether phosphoric acid esters such as polyoxyethylene stearyl ether phosphoric acid ester and polyoxyethylene lauryl ether phosphoric acid ester; polyoxyethylene alkyl ether phosphates such as sodium salts and potassium salts of the polyoxyethylene alkyl ether phosphoric acid esters; sulfosuccinates such as lauryl sulfosuccinate, polyoxyethylene lauryl sulfosuccinate (e.g. sodium polyoxyethylene alkyl sulfosuccinate); and polyoxyethylene alkyl ether acetates. When the anionic surfactant is in a salt form, the salt can be, for instance, a metal salt (preferably a monovalent metal salt) such as sodium salt, potassium salt, calcium salt and magnesium salt; ammonium salt; or amine salt. For the anionic surfactant, solely one species or a combination of two or more species can be used.

In some embodiments, for instance, an anionic surfactant having at least one —POH group, —COH group or —SOH group can be preferably used. Among them, surfactants having —POH groups are preferable. Such a surfactant typically includes a phosphoric acid ester structure; and it can be, for instance a phosphoric acid monoester (ROP($=$O)(OH)$_2$ wherein R is a monovalent organic group), a phosphoric acid diester ((RO)$_2$P($=$O)OH wherein R is the same or different monovalent organic group(s)), or a mixture including both a monoester and a diester. Favorable examples of the POH group-containing surfactant include polyoxyethylene alkyl ether phosphoric acid ester. The number of carbon atoms of the alkyl group in the polyoxyethylene alkyl ether phosphoric acid ester can be, for instance, 6 to 20, 8 to 20, 10 to 20, 12 to 20, or even 14 to 20.

Examples of the cationic surfactant include polyether amines such as polyoxyethylene lauryl amine and polyoxyethylene stearyl amine. For the cationic surfactant, solely one species or a combination of two or more species can be used.

As the compound having a polyoxyalkylene backbone that can be used as the compound A, it is possible to use, for instance, polyalkylene glycols such as polyethylene glycol (PEG) and polypropylene glycol (PPG); polyethers containing polyoxyethylene units; polyethers containing polyoxypropylene units; compounds containing oxyethylene units and oxypropylene units (the sequence of these units may be random or blocked); and derivatives of these. Among the aforementioned surfactants, a compound having a polyoxyalkylene backbone can be used as well. These can be used solely as one species or in a combination of two or more species. Among them, it is preferable to use a compound containing a polyoxyethylene backbone (or a polyoxyethylene segment). PEG is more preferable.

The molecular weight (chemical formula weight) of the polyoxyalkylene backbone-containing compound (e.g. polyethylene glycol) is not particularly limited. For instance, it is suitably lower than 1000. In view of the ease of preparation of PSA composition, it is preferably about 600 or lower (e.g. 500 or lower). The minimum molecular weight of the polyoxyalkylene backbone-containing compound (e.g. polyethylene glycol) is not particularly limited. A preferably used species has a molecular weight of about 100 or higher (e.g. about 200 or higher, or even about 300 or higher).

Other examples of the hydrophilicity enhancer include water-soluble polymers such as polyvinyl alcohol, polyvinyl pyrrolidone and polyacrylic acid. For the water-soluble polymer, solely one species or a combination of two or more species can be used. In the art disclosed herein, as the hydrophilicity enhancer, it is possible to use one, two or more species of compound A; one, two or more species of water-soluble polymer; or a combination of these.

The HLB of the hydrophilicity enhancer is not particularly limited. For instance, it can be 3 or greater, approximately 6 or greater is appropriate, and may be 8 or greater (e.g. 9 or greater). In a preferable embodiment, the hydrophilicity enhancer has an HLB of 10 or greater. This tends to preferably bring about water-peeling properties. The HLB is more preferably 11 or greater, yet more preferably 12 or greater, or particularly preferably 13 or greater (e.g. 14 or greater). When the layer A includes a hydrophilicity enhancer (typically a surfactant) having an HLB in these ranges, water-peeling properties can be more effectively exhibited. The maximum HLB is 20 or less, for instance, possibly 18 or less, 16 or less, or even 15 or less.

HLB in this Description is hydrophile-lipophile balance by Griffin, and the value indicates the degree of affinity of a surfactant to water and oil, and the ratio between hydrophilicity and lipophilicity is represented by a numerical value between 0 and 20. HLB is defined in J. Soc. Cosmetic Chemists, 1, 311 (1949) by W. C. Griffin; "Surfactant Handbook" by Koshitami Takahashi, Yoshiro Namba, Motoo Koike and Masao Kobayashi, 3rd edition, Kogaku Tosho Publishing, Nov. 25, 1972, p 179-182; and the like. A hydrophilicity enhancer having such HLB can be selected based on technical common knowledge of those skilled in the art, taking into account these reference documents as necessary.

Such a hydrophilicity enhancer is preferably included in a free state in the layer A. As the hydrophilicity enhancer, from the standpoint of the ease of preparing the PSA composition, a species that exits as liquid at room temperature (about 25° C.) is preferably used.

The hydrophilicity enhancer-containing layer A is typically formed from a PSA composition comprising a hydrophilicity enhancer. The PSA composition can be a water-dispersed PSA composition, solvent-based PSA composition, active energy ray-curable PSA composition, or hot-melt PSA composition. In some preferable embodiments, the hydrophilicity enhancer-containing layer A can be formed from a photocurable or solvent-based PSA composition. In such a layer A, the effect of addition of hydrophilicity enhancer can be preferably obtained. The layer A can be photo-crosslinkable.

The hydrophilicity enhancer content in the layer A is not particularly limited. It can be selected so that the effect of the use of hydrophilicity enhancer is suitably obtained. In some embodiments, the hydrophilicity enhancer content can be, for instance, 0.001 part by weight or greater to 100 parts by weight of the monomers forming the polymer (e.g. acrylic polymer) in the layer A. It is suitably 0.01 part by weight or greater, 0.03 part by weight or greater, 0.07 part by weight or greater, or even 0.1 part by weight or greater. In some preferable embodiments, the hydrophilicity enhancer content can be, for instance, 0.2 part by weight or greater with respect to 100 parts by weight of the monomers. From the standpoint of obtaining greater effect, it can be 0.5 part by weight or greater, 1.0 part by weight or greater, or even 1.5 parts by weight or greater. From the standpoint of inhibiting excessive diffusion of water into the bulk of the layer A, in some embodiments, the hydrophilicity enhancer content can be, for instance, 20 parts by weight or less to 100 parts by weight of the monomers. It is suitably 10 parts by weight or less, preferably 5 parts by weight or less, or possibly 3 parts by weight or less. It is preferable that the hydrophilicity enhancer content is not in large excess in view of increasing the layer A's transparency as well. For instance, in some embodiments, the hydrophilicity enhancer content to 100 parts by weight of the monomers can be below 2 parts by weight, below 1 part by weight, below 0.7 part by weight, below 0.3 part by weight, or even below 0.2 part by weight. A hydrophilicity enhancer having an HLB of 10 or greater tends to exhibit good water-peeling properties even when used in a small amount.

Tackifier Resin

The layer A may comprise a tackifier resin. Examples of the tackifier resin include rosin-based tackifier resins, rosin derivative tackifier resins, petroleum-based tackifier resins, terpene-based tackifier resins, phenolic tackifier resins, and ketone-based tackifier resins. These can be used singly as one species or in a combination of two or more species.

Examples of the rosin-based tackifier resin include rosins such as gum rosin, wood rosin and tall oil rosin as well as stabilized rosins (e.g. stabilized rosins obtained by disproportionation or hydrogenation of the rosins), polymerized rosins (e.g. multimers, typically dimers, of the rosins) and modified rosins (e.g. unsaturated acid-modified rosins obtained by modification with an unsaturated acid such as maleic acid, fumaric acid or (meth)acrylic acid).

Examples of the rosin derivative tackifier resin include esterification products of the rosin-based tackifier resins (e.g. rosin esters such as stabilized rosin esters and polymerized rosin esters), phenol modification products of the rosin-based resins (phenol-modified rosins) and their esterification products (phenol-modified rosin esters).

Examples of the petroleum-based tackifier resin include aliphatic petroleum resins, aromatic petroleum resins, copolymeric petroleum resins, alicyclic petroleum resins and their hydrogenation products.

Examples of the terpene-based tackifier resin include α-pinene resins, β-pinene resins, aromatic group-modified terpene-based resins, and terpene-phenol resins.

Examples of the ketone-based tackifier resin include ketone-based resins resulting from condensation of ketones (e.g. aliphatic ketones such as methyl ethyl ketone, methyl isobutyl ketone, acetophenone, etc.; alicyclic ketones such as cyclohexanone, methyl cyclohexanone, etc.) with formaldehyde.

In some embodiments, as the tackifier resin, one, two or more species can be preferably selected and used among a rosin-based tackifier resin, rosin derivative tackifier resin and terpene-phenol resin. Among them, a rosin derivative tackifier resin is preferable. Favorable examples include rosin esters such as stabilized rosin ester and polymerized rosin ester.

In a water-dispersed PSA composition, it is preferable to use a water-dispersed tackifier resin in which the tackifier resin as described above is dispersed in water. For instance, a water dispersion of the acrylic polymer and a water-dispersed tackifier resin can be mixed to easily prepare a PSA composition that includes these components at a desirable ratio. In some embodiments, from the standpoint of concerns to environmental health, etc., as the water-dispersed tackifier resin, a species essentially free of at least an aromatic hydrocarbon-based solvent can be preferably used. It is more preferable to use a water-dispersed tackifier resin essentially free of an aromatic hydrocarbon-based solvent and other organic solvents.

Examples of commercial products of rosin ester-containing water-dispersed tackifier resins include trade names SUPER ESTER E-720, SUPER ESTER E-730-55 and SUPER ESTER E-865NT available from Arakawa Chemical Industries, Ltd.; and trade names HARIESTER SK-90D, HARIESTER SK-70D, HARIESTER SK-70E and NEO-TALL 115E available from Harima Chemicals Group, Inc. Commercial products of terpene-phenol resin (possibly in a form of water-dispersed terpene-phenol resin) include TAMANOL E-100, TAMANOL E-200 and TAMANOL E-200NT available from Arakawa Chemical Industries, Ltd.

The softening point of the tackifier resin is not particularly limited. From the standpoint of inhibiting a decrease in cohesive strength of the PSA layer (layer A), it is usually preferable to use a tackifier resin having a softening point of 80° C. or higher. The softening point of the tackifier resin can be 90° C. or higher, 100° C. or higher, 110° C. or higher, or even 120° C. or higher. A tackifier resin having a softening point of 130° C. or higher, or 140° C. or higher can be used as well. From the standpoint of the transparency, the tightness of adhesion to the substrate layer, the adhesion to adherend, etc., it is preferable to use a tackifier resin having a softening point of 200° C. or lower, or 180° C. or lower. As the softening point of a tackifier resin as referred to herein, the nominal value given in a reference or catalog can be used. If no nominal value is available, the softening point of the tackifier resin can be determined based on the softening point test method (ring and ball method) specified in JIS K5902 or JIS K2207.

From the standpoint of favorably obtaining the effect of its use, the amount of tackifier resin used is suitably 1 part by weight or greater to 100 parts by weight of the monomers forming the polymer included in the layer A; it can be 5 parts by weight or greater, 10 parts by weight or greater, 15 parts by weight or greater, 20 parts by weight or greater, or even 25 parts by weight or greater. From the standpoint of combining well-balanced cohesion and tightness of adhesion to adherend, the amount of tackifier resin used to 100 parts by weight of the monomers can be, for instance, 70 parts by weight or less, 50 parts by weight or less, or even 40 parts by weight or less. Alternatively, the layer A can be essentially free of a tackifier resin.

Silane Coupling Agent

In some embodiments, the layer A can include a silane coupling agent. The use of the silane coupling agent can increase the peel strength of the PSA sheet to an adherend (e.g. a glass plate). For the silane coupling agent, solely one species or a combination of two or more species can be used. The layer A comprising a silane coupling agent can be favorably formed, using a PSA composition comprising the silane coupling agent. In such a PSA composition, from the standpoint of inhibiting gelation, the silane coupling agent is preferably included in a free state in the PSA composition. In some embodiments, the silane coupling agent can be included in a free state in the layer A. The silane coupling agent included in such a free state in the layer A can effectively help increase the peel strength. It is noted that the term "in a free state" here indicates that the silane coupling agent is not chemically bonded to other component(s) of the layer A or the PSA composition used for forming the layer A.

Examples of the silane coupling agent include silicon compounds having an epoxy structure such as 3-glycidoxypropyltrimethoxysilane, 3-glycidoxypropylmethyldimethoxysilane and 2-(3,4-epoxycyclohexyl) ethyltrimethoxysilane; amino group-containing silicon compounds such as 3-aminopropyltrimethoxysilane, N-(2-aminoethyl)3-aminopropyltrimethoxysilane and N-(2-aminoethyl) 3-aminopropylmethyldimethoxysilane; 3-chloropropyltrimethoxysilane; acetoacetyl group-containing trimethoxysilane; (meth) acrylate group-containing silane coupling agents such as 3-acryloxypropyltrimethoxysilane, and 3-methacryloxypropyltriethoxysilane; and isocyanate group-containing silane coupling agents such as 3-isocyanatopropyltriethoxysilane. Particularly preferable examples include 3-glycidoxypropyltrimethoxysilane and acetoacetyl group-containing trimethoxysilane.

The amount of silane coupling agent used can be selected so that desirable effect is obtained by the use, and is not particularly limited. In some embodiments, the silane coupling agent can be used in an amount of, for instance, 0.001 part by weight or greater to 100 parts by weight of the monomers forming the polymer included in the layer A. From the standpoint of obtaining greater effect, it can be 0.005 part by weight or greater, 0.01 part by weight or greater, or even 0.015 part by weight or greater. From the standpoint of enhancing the tightness of adhesion to the substrate layer, in some embodiments, the amount of silane coupling agent used can be, for instance, 3 parts by weight or less, 1 part by weight or less, or even 0.5 part by weight or less, relative to 100 parts by weight of the monomers forming the layer A.

In an embodiment where the monomers used include an alkoxysilyl group-containing monomer, the alkoxysilyl group-containing monomer can be used as part or all of the silane coupling agent in the layer A.

In some embodiments, the layer A may include a compound T that is not an aforementioned coupling agent and has an alkoxysilyl group and a hydrophobic moiety in the molecule. Here, the alkoxysilyl group is selected from the group consisting of a dimethoxysilyl group, trimethoxysilyl group, diethoxysilyl group and triethoxysilyl group. The alkoxysilyl group hydrolyzes to form a silanol group which reacts with a hydroxy group on the adherend's surface. Thus, the alkoxysilyl group is a precursor of the group that reacts with the hydroxy group. With the layer A including a compound T, the reaction or interaction between the hydroxy group on an adherend and the silanol group can increase the peel strength of the PSA sheet to the adherend. The hydrophobic moiety of the compound T generally has higher compatibility with the layer A's base polymer (e.g. an acrylic polymer) as compared with the alkoxysilyl group. By selecting a hydrophobic moiety, the distribution and mobility of the compound T in the layer A can be adjusted, and the increase in water-peel strength. Thus, the compound T can be useful as a release-adjusting agent having impact on the bonding and water-peeling properties between the layer A and adherend.

Examples of the hydrophobic moiety may include a hydrocarbon group, hydrocarbon group having a cyclic ether bond, hydrocarbon group having a carbonyl group, hydrocarbon group having an ester bond and fluorinated products of these. The hydrocarbon groups in these examples can be, for instance, alkyl groups, cycloalkyl groups, aryl groups, alkyl cycloalkyl groups, aralkyl groups, etc. When the hydrocarbon group is an alkyl group, the number of carbon atoms in the alkyl group is preferably 6 or higher, or more preferably 8 or higher. The number of carbon atoms in the alkyl group can be, for instance, 32 or lower, 28 or lower, 24 or lower, or even 20 or lower. For instance, a $C_{8-18}$ alkyltrialkoxysilane can be used as the compound T. Non-limiting examples of the $C_{8-18}$ alkyltrialkoxysilane include octyltrimethoxysilane, octyltriethoxysilane, decyltrimethoxysilane, decyltriethoxysilane, hexadecyltrimethoxysilane and hexadecyltriethoxysilane. The number of carbon atoms in the cycloalkyl group, aryl group, alkylcycloalkyl group and aralkyl group can be, for instance, about 6 to 20.

For the compound T, solely one species or a combination of two or more species can be used. A silane coupling agent and a compound T can be used together as well.

Acrylic Oligomer

The layer A may include an acrylic oligomer. As the acrylic oligomer included in the layer A, a species can be suitably selected and used among the same examples listed above as a component that can be included in the layer B.

When the layer A includes an acrylic oligomer, its amount included is not particularly limited. It can be selected so as to obtain desirable effects. The amount of acrylic oligomer used can be, for instance, 0.01% by weight or more of the total layer-A-forming monomer content. From the standpoint of obtaining greater effect, it may be 0.05% by weight or greater, 0.1% by weight or greater, or even 0.2% by weight or greater. From the standpoint of the transparency of the PSA layer, etc., the amount of acrylic oligomer used is usually suitably less than 50% by weight of the total layer-A-forming monomer content, preferably less than 30% by weight, more preferably 25% by weight or less, possibly 10% by weight or less, 5% by weight or less, 1% by weight or less, or even 0.5% by weight or less. Acrylic oligomers may not be used, either.

The PSA composition used for forming the layer A may contain, as necessary, an acid or a base (aqueous ammonia, etc.) used for pH adjustment and so on. Examples of other optional components that can be contained in the composition include various additives generally used in the field of PSA compositions, such as viscosity-adjusting agent (e.g. thickener), leveling agent, plasticizer, filler, colorant including pigment and dye, etc., stabilizing agent, preservative, anti-aging agent, and so on. With respect to these various additives, those heretofore known can be used according to typical methods. Since these do not particularly characterize the present invention, details are omitted.

PSA Sheet

The PSA layer constituting the PSA sheet disclosed herein has a multilayer structure including layers A and B. The PSA layer having such a multilayer structure can be prepared by adhering pre-formed PSA sublayers together. Alternatively, it can be prepared by applying a PSA composition for forming a second PSA sublayer (e.g. layer A) onto a pre-formed first PSA sublayer (e.g. layer B) and allowing it to cure to form the second PSA layer.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a substrate, as the method for providing a PSA layer onto the substrate, it is possible to use a direct method where the PSA composition is directly provided to the substrate or a transfer method where a PSA layer formed on a release face is transferred to the substrate.

In the PSA sheet disclosed herein, the thickness of the PSA layer is not particularly limited. It can be, for instance, about 3 μm to 2000 μm. From the standpoint of the tightness of adhesion to adherend such as surface conformity (e.g. contour conformity), in some embodiments, the thickness of the PSA layer is, for instance, possibly 5 μm or greater, suitably 10 μm or greater, preferably 20 μm or greater, or more preferably 30 μm or greater. The thickness of the PSA layer can also be 50 μm or greater, greater than 50 μm, 70 μm or greater, 100 μm or greater, or even 120 μm or greater. From the standpoint of preventing the occurrence of leftover adhesive residue due to cohesive failure of the PSA layer, in some embodiments, the thickness of the PSA layer can be, for instance, 1000 μm or less, 700 μm or less, 500 μm or less, 300 μm or less, even 200 μm or less, or 170 μm or less. The art disclosed herein can also be favorably implemented in an embodiment of a PSA sheet whose PSA layer has a thickness of 130 μm or less, 90 μm or less, or 60 μm or less (or 40 μm or less). In a preferable embodiment, the PSA layer's thickness can be, for instance, 10 μm or greater and 500 μm or less.

The PSA layer's thickness refers to the thickness from the first face (i.e. the layer A side surface) of the PSA layer through the reverse face of the PSA layer. From the standpoint of the surface conformity, the PSA layer disclosed herein is preferably a multilayer body free of a non-PSA layer (e.g. resin film).

The layer A forming the PSA layer can have a thickness of, for instance, 50 μm or less, 45 μm or less, 35 μm or less, 25 μm or less, or even 20 μm or less. From the standpoint of helping suitably obtain the effect of photo-crosslinking properties (e.g. combining pre-photo-crosslinking surface conformity and post-photo-crosslinking bonding reliability) of the layer B formed on the layer A's backside, in some embodiments, the layer A has a thickness of advantageously 15 μm or less, preferably 10 μm or less, or more preferably less than 10 μm, for instance, 7 μm or less. Especially, in an embodiment having a layer A formed from a water-dispersed PSA composition or in an embodiment where the layer A includes a hydrophilicity enhancer, it is preferable that the layer A's thickness is not excessively large from the standpoint of improving the PSA layer's water resistance reliability, transparency, etc. From the standpoint of facilitating the layer A formation and helping suitably obtain the layer A's effect (e.g. providing or improving water-peeling properties), the layer A's thickness is usually suitably 0.5 μm or greater, possibly 1 μm or greater, 2 μm or greater, or even 3 μm or greater.

The thickness of the layer B forming a PSA layer can be, for instance, 5 μm or greater, 10 μm or greater, or even 20 μm or greater. From the standpoint of the PSA layer's pre-photo-crosslinking surface conformity (e.g. contour conformity), etc., in some embodiments, the layer B's thickness is advantageously 30 μm or greater, preferably 50 μm or greater, possibly 70 μm or greater, or even 100 μm or greater. From the standpoint of the layer B's ease of formation, cohesion and photo-crosslinking properties, the layer B's thickness can be, for instance, 700 μm or less, 500 μm or less, 300 μm or less, 200 μm or less, or even 170 μm or less.

In some embodiments, from the standpoint of helping suitably obtain the layer A's effect, the thickness ratio of layer A in the entire PSA layer can be, for instance, 0.1% or higher, 0.5% or higher, 1% or higher, or even 2% or higher. From the standpoint of the PSA layer's surface conformity before the layer B is photo-crosslinked, etc., in some embodiments, the thickness ratio of layer A in the entire PSA layer is suitably 90% or lower, preferably 70% or lower, more preferably 50% or lower, possibly 25% or lower, 10% or lower, or even 5% or lower.

Photo-Crosslinking Treatment

The PSA sheet disclosed herein is constituted to obtain greater deformation resistance upon photo-crosslinking of the photo-crosslinkable polymer in the layer B forming the PSA layer. The layer B can be photo-crosslinked by irradiation of active energy rays. The conditions of active energy ray irradiation can be set so that the layer B's photo-crosslinking can suitably proceed. As for the PSA sheet having a type-B layer B-containing PSA layer, it is preferable to irradiate UV rays including a BP-excitation wavelength component (e.g. a <300 nm wavelength component).

In the art disclosed herein, as the light source used in the UV irradiation treatment (photo-crosslinking treatment) performed when testing the performance and properties such as peel strength N0 and N2, shear storage modulus, gel fraction and bond durability, a high-pressure mercury lamp (e.g. at a dose of 300 mW/cm$^2$) can be used. The UV-irradiating time can be selected so that the photo-crosslinking reaction proceeds sufficiently. For instance, the UV irradiation treatment can be carried out to a cumulative dose of about 1000 mJ/cm$^2$ to 20000 mJ/cm$^2$.

When testing the properties or performance of the type-B layer B-containing PSA sheet, the UV irradiation treatment can be carried out to a cumulative dose of 10000 mJ/cm$^2$, using a high-pressure mercury lamp having an illuminance of 300 mW/cm$^2$ (determined with an industrial UV checker available from Topcon Corporation, trade name UVR-T1 with light detector model number UD-T25).

When testing the properties or performance of the type-D layer B-containing PSA sheet, the UV irradiation treatment can be carried out to a cumulative dose of 3000 mJ/cm$^2$, using a high-pressure mercury lamp having an illuminance of 300 mW/cm$^2$ (determined with an industrial UV checker available from Topcon Corporation, trade name UVR-T1 with light detector model number UD-T36).

Peel Strength N0

In some embodiments of the PSA sheet disclosed herein, the peel strength N0 determined according to the aforementioned measurement procedure (more specifically, determined by the method described later in Examples) is, for instance, possibly about 1.5 N/10 mm or greater, or preferably about 2.0 N/10 mm or greater. From the standpoint of increasing the bonding reliability, the peel strength is, for instance, preferably about 2.2 N/10 mm or greater, or more preferably about 2.5 N/10 mm or greater. In the PSA sheet according to an embodiment, the peel strength can be about 3.0 N/10 mm or greater, about 4.0 N/10 mm or greater, about 5.0 N/10 mm or greater, or even about 6.0 N/10 mm or greater. The maximum peel strength is not particularly limited. For instance, it can be 25 N/10 mm or less, 20N/10 mm or less, 15 N/10 mm or less, or even 10 N/10 mm or less.

Peel Strength N2

In some embodiments of the PSA sheet disclosed herein, the peel strength N2 determined according to the aforementioned measurement procedure (more specifically, determined by the method described later in Examples) can be, for instance, less than about 1.5 N/10 mm. From the standpoint of the reworkability using water-peeling, the peel strength N2 can be, for instance, about 1.2 N/10 mm or less, less than 1.0 N/10 mm, less than 0.8 N/10 mm, or even less than 0.5 N/10 mm.

Water-Peel Strength Reduction Rate

In some embodiments of the PSA sheet disclosed herein, the PSA sheet may have a water-peel strength reduction rate of, for instance, about 40% or higher, determined based on the peel strength N0 and peel strength N2 by the next equation:

$$\text{Water-peel strength reduction rate (\%)}=(1-(N2/N0))\times 100$$

With the PSA sheet having a high water-peel strength reduction rate, by using aqueous liquid such as water for removal, the stress exerted on the adherend during removal can be significantly reduced. For instance, with a small amount of aqueous liquid introduced into the interface between the PSA sheet and adherend, the peel strength of the PSA sheet to the adherend can be greatly lowered. This property helps combine properties to reduce displacement and lifting of the PSA sheet adhered to the adherend and good reworkability. In some embodiments, the water-peel strength reduction rate is suitably 50% or higher, preferably 60% or higher, for instance, possibly 70% or higher, 75% or higher, 80% or higher, 85% or higher, or even 90% or higher. The water-peel strength reduction rate is theoretically 100% or lower and typically below 100%.

Haze Value

In the art disclosed herein, the haze value of the PSA sheet (possibly formed of a PSA layer) is suitably about 10% or lower, or possibly about 5% or lower (e.g. about 3% or lower). In some embodiments, the haze value of the PSA sheet is preferably 1.0% or lower. Such a highly transparent PSA sheet is suitable for optical applications requiring high optical transparency. The PSA sheet's haze value can be below 1.0%, below 0.7%, or even 0.5% or lower (e.g. 0 to 0.5%).

Here, the "haze value" refers to the ratio of diffused light transmittance to total light transmittance when the analytical sample is irradiated with visible light. It is also called the cloudiness value. The haze value can be expressed by the next equation:

$$Th(\%)=Td/Tt\times 100$$

In the equation, Th is the haze value (%), Td is the diffused light transmittance, and Tt is the total light transmittance.

The haze value can be determined, using a haze meter (e.g. MR-100 available from Murakami Color Research Laboratory Co., Ltd.). The haze value can be adjusted by selecting, for instance, certain composition, thickness and so on for the PSA layer.

Substrate

The PSA sheet according to some embodiments may be in a form of substrate-supported PSA sheet including a substrate bonded to the PSA layer. The material of substrate is not particularly limited and can be suitably selected in accordance with the purpose and application of the PSA sheet. Non-limiting examples of the substrate that may be used include plastic films (resin films) including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. The substrate may be formed of a composite of these materials. Examples of the substrate having such a composite structure include a substrate having a layered structure of metal foil and plastic film, and a plastic sheet reinforced with inorganic fibers such as glass cloth.

As the substrate of the PSA sheet disclosed herein, various kinds of film (or support film, hereinafter) can be preferably used. The support film can be a porous film such as a foam film and a non-woven fabric sheet, a non-porous film, or a film having a layered structure of porous and non-porous layers. In some embodiment, a preferable support film comprises a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g. a three-layer structure).

Examples of the resin material forming the resin film include resins such as polyester; polyolefin; polycycloolefin derived from a monomer having an aliphatic ring structure such as a norbornene structure; polyamide (PA) such as nylon 6, nylon 66 and partially aromatic polyamide; polyimide (PI) such as colorless and transparent polyimide (CPI); polyamide-imide (PAI); polyether ether ketone (PEEK); polyether sulfone (PES); polyphenylene sulfide (PPS); polycarbonate (PC); polyurethane (PU); ethylene-vinyl acetate copolymers (EVA); polyvinyl alcohol (PVA); polystyrene; ABS resin; polyvinyl chloride; polyvinylidene chloride; fluororesin such as polytetrafluoroethylene (PTFE); acrylic resin such as polymethyl methacrylate; cellulose-based polymer such as diacetyl cellulose and triacetyl cellulose (TAC); vinyl butyral-based polymer; arylate-based polymer; polyoxymethylene-based polymer; and epoxy-based polymer. The resin film may be formed from a resin material containing one species of such resin alone or a resin material in which two or more species are blended. The resin film may be non-stretched or stretched (e.g. uniaxially stretched or biaxially stretched).

Favorable examples of the resin material forming the resin film include polyester resins, PPS resins, polyolefin resins and polyimide resins. Here, the polyester resin refers to a resin containing more than 50% polyester by weight. Similarly, the PPS resin refers to a resin containing more than 50% PPS by weight, the polyolefin resin refers to a resin containing more than 50% polyolefin by weight, and the polyimide resin refers to a resin containing more than 50% polyimide by weight.

As the polyester resin, it is typical to use a polyester-based resin whose primary component is a polyester obtainable by polycondensation of a dicarboxylic acid and a diol. Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used as the substrate include PET film, PEN film, PPS film, PEEK film, CPI film, CPP film and OPP film. Preferable examples in view of the strength include PET film, PEN film, PPS film, PEEK film and CPI film. From the standpoint of the availability, size stability, optical properties, etc., preferable examples include PET film, CPI film and TAC film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The substrate may be substantially formed from such resin film. Alternatively, the substrate may include a secondary layer in addition to the resin film. Examples of the secondary layer include a layer for adjusting optical properties (such as a colored layer and an antireflection layer), a print layer and laminate layer to provide a desirable appearance to the substrate or to the PSA sheet, a treated surface layer such as an antistatic layer, a primer layer, and a release layer. The substrate can also be an optical member (e.g. optical film) described later.

The thickness of the substrate is not particularly limited and can be suitably selected in accordance with the purpose and application of the PSA sheet. The substrate's thickness is usually suitably, for instance, 1000 μm or less, 500 μm or less, 100 μm or less, 70 μm or less, 50 μm or less, 25 μm or less, 10 μm or less, or even 5 μm or less. With decreasing thickness of the substrate, the PSA sheet's flexibility and conformability to surface structures of adherends tend to improve. From the standpoint of the ease of handling, processing and so on, the substrate's thickness can be, for instance, 2 μm or greater, greater than 5 μm, or even greater than 10 μm. In some embodiments, the substrate's thickness can be, for instance, 20 μm or greater, 35 μm or greater, or even 55 μm or greater.

Of the substrate, the face on the side to be bonded to the PSA layer may be subjected as necessary to a heretofore known surface treatment such as corona discharge treatment, plasma treatment, UV irradiation, acid treatment, alkali treatment, primer coating, and antistatic treatment. These surface treatments may increase the tightness of adhesion between the substrate and the PSA layer, that is, the anchoring of the PSA layer to the substrate. The composition of the primer is not particularly limited and can be suitably selected among known species. The thickness of the primer layer is not particularly limited and is usually suitably about 0.01 µm to 1 µm, or preferably about 0.1 µm to 1 µm.

Of the substrate, the backside (or the face on the reverse side of the side to be bonded to the PSA layer) may be subjected as necessary to a heretofore known surface treatment such as release treatment, treatment to enhance bonding ability or adhesiveness, and antistatic treatment. For instance, by treating the backside of the substrate with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

Method for Producing Laminate

The PSA sheet disclosed herein can be preferably used in an embodiment where a PSA layer (typically, the layer A-side PSA layer) is layered on (laminated to) a member as the adherend and the layer B of the PSA layer is then photo-crosslinked. This can result in a laminate in which the PSA layer is reliably bonded to the adherend. Thus, this Description provides a laminate production method comprising the following steps in the following order: applying a PSA sheet disclosed herein to an adherend, and irradiating the PSA sheet with active energy rays to cause photo-crosslinking of the layer B in the PSA layer.

The layer B can be photo-crosslinked by irradiation of active energy rays. The conditions of active energy ray irradiation can be set so that the layer B's photo-crosslinking can suitably proceed. As for the PSA sheet having a type-B layer B-containing PSA layer, it is preferable to irradiate UV rays including a BP-excitation wavelength component (e.g. a <300 nm wavelength component).

The PSA sheet disclosed herein can be used in an embodiment where a PSA layer (typically, the layer A-side PSA layer) is layered on (laminated to) a surface having contours. Before the layer B is photo-crosslinked, the PSA layer in the PSA sheet may show good surface conformity (contour conformity) to an adherend surface having a contour (protrusion). After the PSA layer is laminated, the layer B of the PSA layer can be photo-crosslinked to form a highly reliable bond. The contour can be of a print layer provided to the adherend surface. The contour can have a height of, for instance, 5 µm or greater, 10 µm or greater, 20 µm or greater, or even 30 µm or greater. The height of the contour is, for instance, possibly 100 µm or less, or preferably 70 µm or less.

Water Contact Angle

The PSA sheet disclosed herein can be preferably used in an embodiment where it is applied to a surface about as hydrophilic as having a contact angle with distilled water of about, for instance, 60° or less, or preferably 50° or less. In some embodiments, the contact angle of the bonding face can be, for instance, 45° or less, 40° or less, 35° or less, or even 30° or less. A small contact angle of the bonding face facilitates water to wet and spread over the bonding face and the PSA sheet tends to have greater water-peeling properties. This is preferable from the standpoint of facilitating reworking of application of the PSA sheet to the bonding face to prepare the PSA sheet-bearing member. On such a highly hydrophilic surface, for instance, in an embodiment using a compound S as peel strength enhancer, the effect of the compound S to increase the bonding reliability (e.g. reliable water resistance) can be preferably obtained.

If the contact angle of the bonding face is equal to or smaller than any of the aforementioned angles at least around when the PSA sheet is applied (e.g. 30 minutes before application), the contact angle up to the prescribed degrees may produce the rework facilitation effect. The minimum contact angle is theoretically 0°. In some embodiments, the contact angle of the bonding face may be greater than 0°, 1° or greater, 3° or greater, or even 5° or greater.

The contact angle of the member with distilled water is determined as follows: In an environment at 23° C. and 50% RH (measurement atmosphere), measurement is carried by a drop method, using a contact angle meter (available from Kyowa Interface Science Co., Ltd.; product name DMo-501, control box DMC-2, control/analysis software FAMAS (version 5.0.30)). The amount of distilled water dropped is 2 µL. From an image taken at 5 seconds after distilled water is dropped, the contact angle is determined by the Θ/2 method (conducted 5 times).

The bonding face of the member may be hydrophilized to reduce the contact angle with distilled water. The hydrophilization treatment can be, for instance, a treatment that contributes to an increase in hydrophilicity, such as corona treatment, plasma treatment, and treatment to form a hydrophilic layer. The systems and treatment conditions employed for the corona treatment or plasma treatment can be selected so as to obtain a bonding face that shows a desirable contact angle based on heretofore known techniques.

The hydrophilic layer-forming treatment can be a treatment to form a hydrophilic coating layer. The hydrophilic coating layer can be formed by a typical method with a coating agent suitably selected among known species to obtain a bonding face that shows a desirable contact angle. The hydrophilic coating layer may have a thickness of, for instance, 0.01 µm or greater, 0.05 µm or greater, or even 0.1 µm or greater; and, for instance, 10 µm or less, 5 µm or less, or even 2 µm or less.

The hydrophilic layer-forming treatment can be a treatment to form a hydrophilic layer comprising an inorganic material. With the inorganic material in the hydrophilic layer, good water-peeling properties are readily obtained. As the inorganic material, a material capable of forming a hydrophilic surface is used among various metal materials including elements and alloys of transition metals and metalloids as well as inorganic compounds such as inorganic oxides. As the inorganic material, solely one species or a combination of two or more species can be used. Favorable examples of the inorganic material include oxides (inorganic oxides, typically metal oxides) such as titanium oxide, zinc oxide, magnesium oxide, aluminum oxide, silicon oxide, cerium oxide, chromium oxide, zirconium oxide, manganese oxide, zinc oxide, iron oxide, tin oxide and niobium oxide. Among them, as preferable inorganic materials, inorganic oxides such as silicon oxide are used. In addition to the inorganic material, the hydrophilic layer may include or may be free of various organic materials including organic high molecular weight compounds usable as coating agents and binders.

The amount of inorganic material (e.g. an inorganic oxide such as silicon oxide) in the hydrophilic layer can be a suitable amount that can bring about a target hydrophilic surface and is not limited to a specific range. For instance, the inorganic material content of hydrophilic layer can be about 30% by weight or higher, suitably about 50% by weight or higher (e.g. above 50% by weight), or possibly even about 70% by weight or higher. In some preferable embodiments, the inorganic material content of hydrophilic layer is about 90% to 100% by weight (e.g. about 95% by weight or higher).

In some preferable embodiments, as the inorganic material, an inorganic oxide is used, such as silicon oxide (typically a silicon oxide represented by $SiO_X$, or silicon dioxide represented by $SiO_2$). The ratio of inorganic oxide (typically silicon oxide) in the inorganic material can correspond to a suitable ratio that brings about a target hydrophilic surface and is not limited to a specific range. For instance, it can be about 30% by weight or higher, suitably about 50% by weight or higher (e.g. above 50% by weight), or possibly even about 70% by weight or higher. In some preferable embodiments, the ratio of inorganic oxide (typically silicon oxide) in the inorganic material is about 90% to 100% by weight (e.g. about 95% by weight or higher).

The method for forming the hydrophilic layer is not particularly limited. A suitable method can be employed in accordance with the purpose, thickness, etc. For instance, a layer of the inorganic material formed by a known film formation method such as vacuum vapor deposition, sputtering or plating can be used as the hydrophilic layer. When using an inorganic compound as the inorganic material, various deposition methods can be used. For instance, it is possible to employ physical vapor deposition (PVD) such as vacuum vapor deposition, sputtering and ion plating as well as chemical vapor deposition (CVD) such as atomic layer deposition. To form a coating layer comprising an inorganic polymer such as polysiloxane, among known coating agents, a species capable of forming a surface that shows a desirable water contact angle can be selected and used by a typical method.

Peeling Method

This Description provides a method for peeling a PSA sheet adhered to an adherend. The peeling method is favorable as the method for peeling a PSA sheet disclosed herein.

The peeling method include a water-peel step of peeling the PSA sheet from the adherend, in a state where an aqueous liquid exits at the interface between the adherend and the PSA sheet at the peel front line, with the aqueous liquid allowed to further enter the interface in conformity as the peel front line moves. Here, the peel front line refers to where the PSA sheet starts to separate from the adherend when peeling of the PSA sheet from the adherend is allowed to proceed. According to the water peel step, the PSA sheet can be peeled from the adherend with effective use of the aqueous liquid. As the aqueous liquid, water or a mixed solvent primarily comprising water with a small amount of an additive as necessary can be used. As for other solvents forming the mixed solvent besides water, a lower alcohol (e.g. ethanol), lower ketone (e.g. acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is particularly preferable to use water as the aqueous liquid. The water is not particularly limited. For instance, distilled water, ion-exchanged water, tap water or the like can be used in view of the purity, availability, etc., required for the application.

In some embodiments, the peeling method can be preferably practiced in an embodiment where the aqueous liquid is supplied onto the adherend near an outer edge of the PSA sheet adhered to the adherend; and after the aqueous liquid is allowed, through the outer edge, to enter the interface between the PSA sheet and the adherend, peeling of the PSA sheet is allowed to proceed without a new supply of water (i.e. by using only the aqueous liquid supplied onto the adherend before the peel initiation). In other embodiments, the peeling method can be preferably practiced in an embodiment such that while a segment (typically, a segment of an outer edge) of the PSA sheet adhered to the adherend has lifted from the adherend, the aqueous water is supplied to where the remaining portion of the PSA sheet starts to separate from the adherend and peeling of the PSA sheet is allowed to proceed without a new supply of water. During the water-peel step, if the water entering the interface between the PSA sheet and the adherend following the movement of the peel front line runs out in the middle of peeling, additional water may be supplied intermittently or continuously after the start of the water-peel step. For instance, in cases where the adherend absorbs water, the aqueous liquid tends to remain on the post-peel adherend surface or the adhesive face, etc., it may be preferable to employ the embodiment where additional water is supplied after the start of the water-peel step.

The amount of aqueous liquid supplied before the start of peeling is not particularly limited as long as the aqueous liquid can be introduced to the interface between the PSA sheet and the adherend. The amount of the aqueous liquid can be, for instance, 5 μL or greater, usually 10 μL or greater, or even 20 μL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less. By reducing the amount of the aqueous liquid, it is possible to omit or simplify removal of the aqueous liquid by drying, wiping, etc., after the PSA sheet is peeled off.

At the start of peeling, the procedure for allowing the aqueous liquid to enter the PSA sheet/adherend interface through an edge of the PSA sheet can be carried out, for instance, by ways of: inserting the tip of a tool such as cutting knife or needle into the interface at the edge of the PSA sheet; scratching the edge and lifting an end of the PSA sheet with a sort of hook or fingernail; lifting an end of the PSA sheet by sticking a sort of PSA tape or sucker to the PSA sheet's backside near the edge, and so on. By thus forcing the aqueous liquid to enter the interface through the edge of the PSA sheet, it is possible to efficiently form a state having the aqueous liquid at the interface between the adherend and the PSA sheet. Good water-peeling properties following the peel initiation with a procedure of forced entry of the aqueous liquid into the interface to trigger peeling can be favorably combined with highly reliable water resistance obtainable in the absence of such procedure. It is noted that the peel-initiating operation can also be employed, before the aqueous liquid is supplied, as an operation to intentionally allow a segment (typically, a segment of an outer edge) of the PSA sheet adhered to the adherend to lift from the adherend.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA sheet at a tensile speed of at least 20 mm/min, for instance, when the peel angle is 180°. The speed for moving the peeling front line can be, for instance, 50 mm/min or higher, 150 mm/min or higher, 300 mm/min or higher, or 500 mm/min or higher.

According to the peeling method disclosed herein, the PSA sheet is peeled off from the adherend while allowing the aqueous liquid to enter the interface; and this can bring about good water-peeling properties even at a relatively high peeling speed. The maximum speed at which the peel front line moves is not particularly limited. The speed at which the peel front line moves can be, for instance, 1000 mm/min or lower.

The peeling method disclosed herein can be practiced, for instance, in an embodiment where the peeling area of PSA sheet per 10 µL volume of aqueous liquid (e.g. water) used in the method is, for instance, 50 cm$^2$ or larger, or preferably 100 cm$^2$ or larger.

The peeling method disclosed herein can be preferably applied to peeling of a PSA sheet adhered to a non-water-absorbing smooth surface such as a glass plate, a metal plate and a resin plate. The peeling method disclosed herein can be preferably employed as a method for peeling a PSA sheet from an aforementioned optical member. In particular, it is suitable as a method for peeling a PSA sheet adhered on a polarizing plate (which may be hydrophilized over the face to which the PSA sheet is adhered) as well as a glass plate, such as alkaline glass and non-alkaline glass.

Applications

The application of the PSA sheet disclosed herein is not particularly limited and it can be used in various applications. For instance, the PSA sheet disclosed herein can be used for purposes such as fixing, bonding, shaping, decorating, protecting, and supporting a member of various products. The material forming at least the surface of the member can be, for instance, glass such as alkaline glass and non-alkaline glass; metals such as stainless steel (SUS) and aluminum; ceramic materials such as alumina and silica; resin materials such as acrylic resin, ABS resin, polycarbonate resin, polystyrene resin and colorless and transparent polyimide resin. The member may be of, for instance, various portable devices, automobiles, home electric appliance, etc. The member's face to which the PSA sheet is applied can be a coated surface formed with an acrylic paint or a paint based on polyester, alkyd, melamine, urethane, acid/epoxy crosslinking, or their composite (e.g. acrylic melamine paint, alkyd melamine paint); or a plated surface of a galvanized steel sheet, etc. The member can be a support film (e.g. resin film) exemplified as the possible material for the substrate. The PSA sheet disclosed herein can be, for instance, a component of a PSA sheet-bearing member in which such a member is bonded to one face of a PSA layer.

An example of preferable applications is an optical application. More specifically, for instance, the PSA sheet disclosed herein can be preferably used as an optical PSA sheet used for bonding optical members (for optical member bonding) or for manufacturing a product (optical product) in which the optical members are used.

The optical member refers to a member having optical properties (e.g. polarizability, light refractivity, light scattering properties, light reflectivity, light transmission, light absorption, light diffraction, optical rotation, visibility, etc.). The optical member is not particularly limited as long as it has optical properties. Examples include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti-fouling film, photochromic film, light control film, transparent conductive film (ITO film), design film, decorative film, surface protection plate, prism, lens, color filter, transparent substrate, and laminates of these (or collectively referred to as "functional films"). The "plate" and "film" individually encompass forms of plate, film, sheet, etc. For instance, the "polarizing film" encompasses a "polarizing plate", "polarizing sheet" and the like.

Examples of the display device include a liquid crystal display device, organic EL (electroluminescence) display device, PDP (plasma display panel), and electronic paper. It can be preferably applied, especially when an expensive member is included, such as a foldable display device and a display device installed in a vehicle. Examples of the input device include a touch panel.

While no particular limitations are imposed, examples of the optical member include members (e.g. members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of a display device or an input device.

There are no particular limitations to how optical members are bonded using the PSA sheet disclosed herein. Examples of a possible embodiment include (1) optical members are bonded to each other via the PSA sheet disclosed herein, (2) an optical member is bonded to a non-optical member via the PSA sheet disclosed herein, and (3) the PSA sheet disclosed herein is in an embodiment including an optical member and is bonded to an optical or non-optical member. In the embodiment (3), the optical member-containing PSA sheet can be, for instance, a PSA sheet whose substrate is the optical member (e.g. optical film). Such a PSA sheet including an optical member as the substrate can be thought as an adhesive optical member (e.g. adhesive optical film). When the PSA sheet disclosed herein has a substrate and the functional film is used as the substrate, the PSA sheet disclosed herein can also be thought as "adhesive functional film" having the PSA layer disclosed herein on at least one face of the functional film.

The PSA sheet disclosed herein can be preferably used in an embodiment where it is applied to a non-water-absorbing smooth surface, for instance, a glass plate, metal plate and resin plate. In particular, it is suitable as a PSA sheet used by applying to a polarizing plate and a glass plate such as alkaline and non-alkaline glass. The polarizing plate may be subjected over the face to which the PSA sheet is applied to hydrophilization treatment (corona treatment, plasma treatment, hydrophilic layer formation, etc.).

Several working examples related to the present invention are described below, but these specific examples are not to limit the present invention. In the description below, "parts" and "%" are by weight unless otherwise specified.

Preparation of PSA Compositions

PSA Composition A-1

In 100 parts of ion-exchanged water, were mixed and emulsified 85 parts of 2EHA, 13 parts of methyl acrylate (MA), 1.2 parts of AA, 0.8 part of MAA, 0.02 part of 3-methacryloxypropyltrimethoxysilane (KBM-503 available from Shin-Etsu Chemical Co., Ltd.), 0.048 part of a chain transfer agent (t-dodecyl mercaptan) and 2.0 part of emulsifier (LATEML E-118B available from Kao Corporation) to prepare an aqueous emulsion of the monomer mixture (monomer emulsion).

Into a reaction vessel equipped with a condenser, nitrogen inlet, thermometer and stirrer, was placed the monomer emulsion. While nitrogen gas is introduced, the resulting mixture was allowed to stir at room temperature for at least one hour. Subsequently, the system was heated to 60° C. and was added 0.1 part of 2,2'-azobis[N-(2-carboxyethyl)-2-methylpropionamidine] hydrate (VA-057 available from Wako Pure Chemical Industries, Ltd.) as polymerization initiator. The reaction was carried out at 60° C. for 6 hours to obtain a water dispersion of acrylic polymer. To this water dispersion, relative to 100 parts of acrylic polymer therein, was added 10 parts (non-volatiles) of tackifier resin emulsion (SUPER ESTER E-865NT available from Arakawa Chemical Industries, Ltd.; a water dispersion of polymerized rosin ester having a softening point of 160° C.). Using 10% aqueous ammonia, the pH was adjusted to about 7.5 to prepare an emulsion-based PSA composition A-1.

PSA Composition B-1

Were mixed 60 parts of side-chain-BP-containing acrylic copolymer (product name acResin UV3532 available from BASF Corporation), Tg: −60° C., Mw: 25×10$^4$, BP equivalent: 10 mg/g), 30 parts of 2-ethylhexyl acrylate (2EHA), 10 parts of N-vinyl-2-pyrrolidone (NVP), 0.2 part of 1,6-hexanediol diacrylate (HDDA) and 0.15 part of photoinitiator p1 (product name OMNIRAD 651 available from IGM Regins) having an absorption peak in the wavelength range between 300 nm and 500 nm to prepare a UV curable PSA composition B-1 for forming a photo-crosslinkable PSA. The PSA composition B-1 had a viscosity of 2.4 Pa·s (BH viscometer, No. 5 rotor, 10 rpm, measurement temperature 30° C.) and an organic solvent content below 1% by weight.

PSA Composition B-2

Were mixed 30 parts of side-chain-BP-containing acrylic copolymer (product name acResin UV3532 available from BASF Corporation), 38 parts of 2EHA, 4 parts of NVP, 28 parts of isobornyl acrylate (IBXA), 0.04 part of HDDA, 0.08 part of 3-acryloxypropyl methoxysilane (product name KBM-5103 available from Shin-Etsu Silicone) and 0.2 part of photoinitiator p2 (product name OMNIRAD 184 available from IGM Regins) having an absorption peak in the wavelength range between 300 nm and 500 nm to prepare a UV curable PSA composition B-2 for forming a photo-crosslinkable PSA. The PSA composition B-2 had a viscosity of 0.4 Pa·s (BH viscometer, No. 5 rotor, 10 rpm, measurement temperature 30° C.) and an organic solvent content below 1% by weight.

PSA Composition B-3

Into a reaction vessel equipped with a condenser, nitrogen inlet, thermometer and stirrer, were placed 60 parts of n-butyl acrylate (BA), 6 parts of cyclohexyl acrylate (CHA), 18 parts of N-vinyl-2-pyrrolidone (NVP), 1 part of isostearyl acrylate (iSTA) and 15 parts of 4-hydroxybutyl acrylate (4HBA) as monomers, 0.085 part of α-thioglycerol as chain transfer agent and 122 parts of ethyl acetate as polymerization solvent. To this, was added 0.2 part of 2,2'-azobisisobutyronitrile (AIBN). Under a nitrogen atmosphere, solution polymerization was carried out to obtain a polymer P1 solution. Polymer P1 had a weight average molecular weight (Mw) of 30×10$^4$. The polymer P1's Tg is −33° C., determined from the composition of the monomers.

To the polymer P1 solution, per 100 parts of polymer P1 in the solution, were added 0.5 part of 2-methacryloyloxyethyl isocyanate (MOI) and 0.0025 part of dibutyltin dilaurate. Under the atmosphere, the mixture was allowed to stir at 50° C. for 7 hours and addition reaction of MOI to the polymer P1 was carried out to obtain a solution of C=C-containing polymer P2.

To the polymer P2 solution, per 100 parts of polymer P2 in the solution, were added 0.2 part (by non-volatiles) of isocyanate-based crosslinking agent (trimethylolpropane/xylylene diisocyanate adduct; TAKENATE D110N available from Mitsui Chemicals, Inc.; 75% non-volatiles by mass), 0.01 part of dioctyltin dilaurate, 3 parts of acetyl acetone and 0.2 part of photoinitiator p2 (OMNIRAD 184) and evenly mixed to prepare a solvent-based PSA composition B-3.

PSA Composition B-4

Into a reaction vessel equipped with a condenser, nitrogen inlet, thermometer and stirrer, were placed 64.5 parts of BA, 6 parts of cyclohexyl acrylate (CHA), 9.6 parts of NVP, 5 parts of isostearyl acrylate (iSTA) and 14.9 parts of 4-hydroxybutyl acrylate (4HBA) as monomers, 0.07 part of α-thioglycerol as chain transfer agent and 122 parts of ethyl acetate as polymerization solvent. To this, was added 0.2 part of 2,2'-azobisisobutyronitrile (AIBN). Under a nitrogen atmosphere, solution polymerization was carried out to obtain a solution containing an acrylic polymer of Mw 60×10$^4$.

To the acrylic polymer solution obtained above, per 100 parts of the monomers used for preparing the solution, were added 0.09 part (non-volatiles) of isocyanate-based crosslinking agent (trimethylolpropane/xylylene diisocyanate adduct; TAKENATE D-110N available from Mitsui Chemicals, Inc.; 75% NV by mass), 0.4 part of acrylic oligomer, 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of dipentaerythritol hexaacrylate (DPHA) as polyfunctional monomer, and 0.22 part of photoinitiator (OMNIRAD 184); and uniformly mixed to prepare a solvent-based PSA composition B-4.

The acrylic oligomer used above was synthesized by the method shown below.

Synthesis of Acrylic Oligomer

Into a 4-necked flask, were placed 100 parts of toluene, 60 parts of dicyclopentanyl methacrylate (DCPMA) (product name FA-513M available from Hitachi Chemical Co., Ltd.), 40 parts of methyl methacrylate (MMA) and 3.5 parts of α-thioglycerol as chain transfer agent. Under a nitrogen atmosphere, the reaction mixture was allowed to stir at 70° C. for one hour and 0.2 part of AIBN was added as thermal polymerization initiator. The reaction was carried out at 70° C. for 2 hours and then at 80° C. for 2 hours. Subsequently, the reaction mixture was placed under an atmosphere at a temperature of 130° C. to dry and remove toluene, chain transfer agent and unreacted monomers, whereby an acrylic oligomer in a solid state was obtained. This acrylic oligomer had a Tg of 144° C. and a Mw of 4300.

Preparation of PSA Sheets

EXAMPLE 1

To a 38 µm thick release film R1 (MRF #38 available from Mitsubishi Plastics, Inc.) having a release face on one side of polyester film, PSA composition B-1 was applied and covered to block air with a release film R2 (MRE #38 available from Mitsubishi Plastics, Inc.) having a release face on one side of polyester film. Using a black light (product name FL15BL available from Toshiba Corporation), one side of the laminate was UV-irradiated at a dose of 5 mW/cm$^2$ to a cumulative dose of 800 mJ/cm$^2$. By this, was obtained a photo-crosslinkable PSA b-1 (cured PSA composition B-1) as a 150 µm thick PSA layer (layer B) placed between release films R1 and R2.

The irradiance value of the blacklight was measured with an industrial UV checker (available from Topcon Corporation, trade name UVR-T1 with light detector model number UD-T36) with peak sensitivity at 350 nm in wavelength.

Subsequently, release film R2 was removed from the PSA layer. Onto the exposed PSA layer (layer B), was directly applied the PSA composition A-1 and allowed to dry at 120° C. for 3 minutes to form a 5 µm thick PSA layer (layer A). To the layer A surface, was adhered the release face of release film R2. In this manner, was prepared a two-layer PSA layer (substrate-free PSA sheet) with the layers A and B laminated in direct contact. Of the substrate-free PSA sheet, the layer A-side and layer B-side faces are protected with release films R2 and R1, respectively.

EXAMPLE 2

In place of PSA composition B-1, was used PSA composition B-2. Otherwise in the same manner as Example 1, was obtained a photo-crosslinkable PSA b-2 (cured PSA composition B-2) as a 150 µm thick PSA layer (layer B) placed between release films R1 and R2. Onto the PSA layer (layer B), was directly applied the PSA composition A-1 and allowed to dry at 120° C. for 3 minutes to form a 5 µm thick PSA layer (layer A). To the layer A, was adhered the release face of release film R2. In this manner, was prepared a two-layer PSA layer (substrate-free PSA sheet) with the layers A and B laminated in direct contact. By the aforementioned method, VOC emissions of layers B prepared in Examples 1 and 2 were determined to be both 500 µg/g or lower.

EXAMPLE 3

To the release face of release film R1 (MRF #38 available from Mitsubishi Plastics, Inc.), was applied the PSA composition B-3 and allowed to dry at 130° C. for 2 minutes to form a 150 µm thick PSA layer. Onto this PSA layer (layer B), was directly applied the PSA composition A-1 and allowed to dry at 120° C. for 3 minutes to form a 5 µm thick PSA layer (layer A). To the layer A, was adhered the release face of release film R2. In this manner, was prepared a two-layer PSA layer (substrate-free PSA sheet) with the layers A and B laminated in direct contact.

EXAMPLE 4

Using the PSA composition B-4 in place of the PSA composition B-3, but otherwise in the same manner as Example 3, was prepared a 150 µm thick PSA layer. Onto this PSA layer (layer B), was directly applied the PSA composition A-1 and allowed to dry at 120° C. for 3 minutes to form a 5 µm thick PSA layer (layer A). To the layer A, was adhered the release face of release film R2. In this manner, was prepared a two-layer PSA layer (substrate-free PSA sheet) with the layers A and B laminated in direct contact.

Preparation of Laminates

The layer A side of the substrate-free PSA sheet according to each Example was press-bonded to a corona-treated polarizing plate with a 2 kg roller moved back and forth once. Subsequently, to the layer B side of the PSA sheet, was adhered 25 µm thick polyethylene terephthalate (PET) film. This was autoclaved (50° C., 0.5 MPa, 15 min) and then UV-irradiated over the PET film side, using a high-pressure mercury lamp (product name H3000L/22N available from Toshiba Corporation) to cause photo-crosslinking of the layer B in the PSA layer. In this manner, was prepared a laminate formed of PET film/PSA layer (layer B/layer A)/polarizing plate.

UV irradiation conditions were as follows: in Examples 1 and 2, at a dose of 300 mW/cm$^2$ (value determined with an industrial UV checker available from Topcon Corporation, product name UVR-T1 with light detector model number UD-T25) to a cumulative dose of 10000 mJ/cm$^2$; in Examples 3 and 4, at a dose of 300 nW/cm$^2$ (value determined with an industrial UV checker available from Topcon Corporation, product name UVR-T1 with light detector model number UD-T36) to a cumulative dose of 3000 mJ/cm$^2$.

Measurement and Evaluation

In the following, all UV irradiation was performed using a high-pressure mercury lamp (product name H3000L/22N available from Toshiba Corporation). UV irradiation conditions were as follows: in Examples 1 and 2, at a dose of 300 mW/cm$^2$ (value determined with an industrial UV checker available from Topcon Corporation, product name UVR-T1 with light detector model number UD-T25) to a cumulative dose of 10000 mJ/cm$^2$; in Examples 3 and 4, at a dose of 300 nW/cm$^2$ (value determined with an industrial UV checker available from Topcon Corporation, product name UVR-T1 with light detector model number UD-T36) to a cumulative dose of 3000 mJ/cm$^2$.

In the following, as the corona-treated polarizing plate, was used a polarizing plate (product name REGQ-HC3 available from Nitto Denko Corporation, 92 µm thick) after corona treatment on one face. In particular, in the corona treatment, the polarizing plate was sent once through a table-type surface corona treatment system (model name AGF-012 available from KASUGA) at an output setting of 3 (showing 0.17 kW) with the table speed gauge at 20 (equivalent to 3 m/min in speed). The corona-treated polarizing plate surface had a water contact angle of 6°.

(1) Measurement of Peel Strength N0

Pre-Storage

The substrate-free PSA sheet according to each Example was cut to a 10 mm wide, 100 mm long size to prepare a test piece. In an environment at 23° C. and 50% RH, the adhesive face (the layer A side of the PSA layer) of the test piece was press-bonded to the corona-treated polarizing plate with a 2 kg rubber roller moved back and forth once. Subsequently, the layer B side of the test piece was adhered to 25 µm thick corona-treated PET film. This was autoclaved (50° C., 0.5 MPa, 15 min) and then UV-irradiated over the PET film side under the above conditions.

Subsequently, in the environment at 23° C. and 50% RH, using a tensile tester (universal tensile/compression testing machine, system name Tensile and Compression Testing Machine, TCM-1 kNB available from Minebea Co., Ltd.), at a tensile speed of 300 mm/min at a peel angle of 180°, while the test piece was peeled from the polarizing plate, the peel strength was measured. Three measurements were taken. Table 1 shows their mean value.

Post-Storage

The substrate-free PSA sheet according to each Example was stored for 5 days in an environment at 40° C., with the layer A-side and layer B-side surfaces protected with release films R2 and R1, respectively. Using the post-storage substrate-free PSA sheet, in the same manner as for the pre-storage substrate-free PSA sheet, the peel strength N0 was determined. The results are shown in Table 1.

(2) Measurement of Peel Strength N2

Pre-Storage

In the measurement of peel strength N0, in the process of peeling the PSA sheet from the polarizing plate, 20 µL of distilled water was supplied to the peel interface where the test piece started to separate from the polarizing plate and the peel strength after the distilled water supply was determined. The measurement was taken for every measurement of peel strength N0 (i.e. three times). Table 1 shows their mean value.

Here, each test piece was successively measured for peel strength N0 and N2; however, different test pieces may be used for measurements of peel strength N0 and N2. For instance, when there is a difficulty in obtaining a sufficiently long test piece to perform successive measurements, etc., measurements can be taken with different test pieces.

Post-Storage

The substrate-free PSA sheet according to each Example was stored for 5 days in an environment at 40° C., with the layer A-side and layer B-side surfaces protected with release films R2 and R1, respectively. Using the post-storage substrate-free PSA sheet, in the same manner as for the pre-storage substrate-free PSA sheet, the peel strength N2 was determined. The results are shown in Table 1.

(3) Determination of Pre-Photo-Crosslinking Modulus Gb'

The layer B prepared in each Example was folded up to a thickness of about 1.5 mm and a disc of 7.9 mm diameter was punched out to prepare a measurement sample. The measurement sample was placed between parallel plates; and while applying a shear strain at a frequency of 1 Hz using a rheometer (ARES available from Rheometric Scientific), dynamic viscoelastic analysis was carried out in the shear mode over a temperature range of −70° C. to 150° C. at a heating rate of 5° C./min to determine the 80° C. shear storage modulus Gb'. The results are shown in Table 1.

(4) Determination of Post-Photo-Crosslinking Modulus Gc'

While between release films R1 and R2, the layer B prepared in each Example was UV-irradiated over one face under the above conditions to cause photo-crosslinking. Subsequently, release films R1 and R2 were removed and the layer B was folded up to a thickness of about 1.5 mm and a disc of 7.9 mm diameter was punched out to prepare a measurement sample. Dynamic viscoelastic analysis was conducted on this measurement sample in the same manner as for the measurement of pre-photo-crosslinking modulus Gb' to determine the 80° C. shear storage modulus Gc'. The results are shown in Table 1.

(5) Durability Test

To one face of a polarizing plate (product name REGQ-HC3 available from Nitto Denko Corporation, 92 µm thick), using 15 µm thick PSA, was adhered aluminum foil (product name NIPPAKU FOIL available from Mitsubishi Aluminum Co., Ltd., 12 µm thick). The resultant was used as the adherend bonded to one face of a substrate-free PSA sheet.

The substrate-free PSA sheet according to each Example was cut to a 60 mm×120 mm size while still having release liners R1 and R2. Release film R2 was then removed. The exposed adhesive face (the layer A side of the PSA layer) was adhered to the polarizing plate-side surface of the adherend with a handheld roller. Release liner R1 was then removed from the PSA. The exposed adhesive face (the layer B side of the PSA layer) was adhered to a glass plate (product name MICRO SLIDE GLASS, item #S available from Matsunami Glass Ind., Ltd.; 1.3 mm thick, 0.1% haze, wet frosted). In this manner, was obtained a laminate formed of a glass plate/PSA layer (layer B/layer A)/polarizing plate.

The laminate was autoclaved (50° C., 0.5 MPa, 15 min) and then UV-irradiated over the glass plate side under the above conditions to obtain a durability test sample.

The test sample was stored in an environment at 85° C. for 24 hours. Subsequently, in an environment at 23° C. and 50% RH, the sample was visually inspected for formation of air bubbles in the interface between the layer A and the polarizing plate and the durability was evaluated based on two standards shown below. The results are shown in the column headed "Bond durability" in Table 1. It is noted that in the PSA sheet according to either Example, absolutely no bubbles were found immediately after preparation of the durability test sample.

E (Excellent): air bubble formation not observed (excellent bond durability).

P (Poor): air bubble formation observed (poor bond durability).

TABLE 1

|  |  | Ex. 1 | Ex. 2 | Ex. 3 | Ex. 4 |
|---|---|---|---|---|---|
| PSA composition | Layer A | A-1 | A-1 | A-1 | A-1 |
|  | Layer B | B-1 | B-2 | B-3 | B-4 |
| Peel strength N0 (N/10 mm) | Initial | 2.5 | 4.8 | 6.6 | 5.3 |
|  | After stored at 40° C., 5 days | 2.4 | 5.0 | 6.1 | 6.7 |
| Peel strength N2 (N/10 mm) | Initial | 0.4 | 0.3 | 0.2 | 2.6 |
|  | After stored at 40° C., 5 days | 0.4 | 0.2 | 0.7 | 4.9 |

TABLE 1-continued

|  |  | Ex. 1 | Ex. 2 | Ex. 3 | Ex. 4 |
|---|---|---|---|---|---|
| Reduction rate of water-peel force (%) | Initial | 84.0 | 93.8 | 97.0 | 50.9 |
|  | After stored at 40° C., 5 days | 83.3 | 96.0 | 88.5 | 26.9 |
| Shear storage modulus at 80° C., 1 Hz (kPa) | Pre-photo-crosslinking (Gb') | 18.9 | 54.6 | 64.8 | 34.8 |
|  | Post-photo-crosslinking (Gc') | 51.0 | 63.7 | 128.0 | 88.4 |
|  | ΔG' | 32.1 | 9.1 | 63.2 | 53.6 |
| Polyfunctional monomer content of layer B (μmol/g) |  | 0 | 0 | 0 | 47 |
| Bond durability |  | E | E | E | E |

As shown in Table 3, with respect to the PSA sheets of Examples 1 to 3, the photo-crosslinking increased the layer B's shear storage modulus Gb' and good bond durability was shown. The PSA sheets of Examples 1 to 3 showed good storage stability, thereby showing excellent water-peeling properties both before and after storage.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1, 2 PSA sheets
20 substrate
20A first face
20B second face (backside)
30, 31 release liners
70 optical member
110 PSA layer
110A first surface (adhesive face)
112 layer A
114 layer B
200 PSA sheet-bearing member

The invention claimed is:

1. A pressure-sensitive adhesive sheet having a pressure-sensitive adhesive layer, wherein
the pressure-sensitive adhesive layer has a multilayer structure comprising a layer A forming one face of the pressure-sensitive adhesive layer and a layer B placed on a backside of the layer A, and
the layer B is a photo-crosslinkable pressure-sensitive adhesive layer comprising a photo-crosslinkable polymer as a base polymer.

2. The pressure-sensitive adhesive sheet according to claim 1, wherein the layer B comprises, as the photo-crosslinkable polymer, a polymer (PB) having side-chain benzophenone structures.

3. The pressure-sensitive adhesive sheet according to claim 1, wherein the layer B comprises, as the photo-crosslinkable polymer, a polymer (PD) having carbon-carbon double bonds.

4. The pressure-sensitive adhesive sheet according to claim 1, wherein the layer B comprises 40 μmol/g or less of a polyfunctional monomer having two or more ethylenically unsaturated groups.

5. The pressure-sensitive adhesive sheet according to claim 1, wherein the layer A comprises a hydrophilicity enhancer.

6. The pressure-sensitive adhesive sheet according to claim 1, having a 40% or higher reduction rate of water-peel force, determined from peel strength N0 and N2 by the next equation:

Reduction rate of water-peel force (%)=(1−(N2/N0))×100 wherein the peel strength N0 and N2 are determined by the following procedures:

[procedure for measuring peel strength N0]
the layer A side of the pressure-sensitive adhesive sheet is press-bonded to a corona-treated polarizing plate with a 2 kg rubber roller moved back and forth once;
subsequently, the resultant is autoclaved (50° C., 0.5 MPa, 15 min) and then UV-irradiated using a high-pressure mercury lamp;
then, in the atmosphere at 25° C., at a tensile speed of 300 mm/min at a peel angle of 180°, the pressure-sensitive adhesive sheet is peeled from the polarizing plate, and the peel strength during this is recorded as peel strength N0; and

[procedure for measuring peel strength N2]
in the measurement of peel strength N0, in the process of peeling the pressure-sensitive adhesive sheet from the polarizing plate, 20 μL of distilled water is supplied to where the pressure-sensitive adhesive sheet starts to separate from the polarizing plate, and the peel strength after the distilled water supply is recorded as peel strength N2.

7. The pressure-sensitive adhesive sheet according to claim 6, having a peel strength N0 of 1.5 N/10 mm or greater.

8. The pressure-sensitive adhesive sheet according to claim 1, wherein the pressure-sensitive adhesive layer has a thickness of 10 μm or greater and 500 μm or less.

9. The pressure-sensitive adhesive sheet according to claim 1, wherein the layer A has a thickness of 2 μm or greater and less than 10 μm.

10. The pressure-sensitive adhesive sheet according to claim 1, wherein the photo-crosslinkable polymer comprises more than 50% by weight of alkyl (meth) acrylates as constituent monomers.

* * * * *